United States Patent
Snyder

(10) Patent No.: US 10,899,477 B2
(45) Date of Patent: Jan. 26, 2021

(54) IN-SPACE MANUFACTURING AND ASSEMBLY OF SPACECRAFT DEVICE AND TECHNIQUES

(71) Applicant: MADE IN SPACE, INC., Moffett Field, CA (US)

(72) Inventor: Michael Snyder, Mountain View, CA (US)

(73) Assignee: MADE IN SPACE, INC., Moffett Field, CA (US)

(*) Notice: Subject to any disclaimer, the term of this patent is extended or adjusted under 35 U.S.C. 154(b) by 825 days.

(21) Appl. No.: 15/227,630

(22) Filed: Aug. 3, 2016

(65) Prior Publication Data
US 2017/0036783 A1 Feb. 9, 2017

Related U.S. Application Data

(60) Provisional application No. 62/200,568, filed on Aug. 3, 2015.

(51) Int. Cl.
*H01Q 17/00* (2006.01)
*B64G 1/10* (2006.01)
(Continued)

(52) U.S. Cl.
CPC .......... *B64G 1/1078* (2013.01); *B22F 3/1055* (2013.01); *B23K 5/18* (2013.01);
(Continued)

(58) Field of Classification Search
CPC ... B29C 64/106; B29C 64/386; B22F 3/1055; B64G 1/002; B64G 1/1078; B23K 5/18;
(Continued)

(56) References Cited

U.S. PATENT DOCUMENTS 6,425,829 B1 * 7/2002 Julien ................. B21K 1/56
411/909
6,575,548 B1 6/2003 Corrigan et al.
(Continued)

FOREIGN PATENT DOCUMENTS

| EP | 2885124 | 2/2014 |
|---|---|---|
| JP | 2009013395 | 1/2009 |

(Continued)

OTHER PUBLICATIONS

Rousek et al., "Sinterhab," ACTA Astronautica, vol. 74, Feb. 1, 2012, pp. 98-111, ISSN: 0094-5765, DOI: 10.1016/J.ACTAASTRO.2011.10.009.

(Continued)

*Primary Examiner* — Paul D Kim
(74) *Attorney, Agent, or Firm* — Terry M. Sanks, Esq.; Beusse Sanks, PLLC

(57) ABSTRACT

A system for producing an object is disclosed including a build device having a build area and a material bonding component to receive portions of a material that are used to produce the object, at least one gripper within the build area to contact the object to provide support and to provide for at least one of a heat sink for the object, a cold sink for the object, and electrical dissipation path from the object, and a movement mechanism to move the build device relative to the object to position the build device at a position to further produce the object. Another system and methods are also disclosed.

29 Claims, 47 Drawing Sheets

(51) Int. Cl.

| | |
|---|---|
| *B33Y 40/00* | (2020.01) |
| *B33Y 10/00* | (2015.01) |
| *B33Y 30/00* | (2015.01) |
| *B33Y 80/00* | (2015.01) |
| *B33Y 50/02* | (2015.01) |
| *B33Y 70/00* | (2020.01) |
| *B22F 3/105* | (2006.01) |
| *B23K 5/18* | (2006.01) |
| *B23K 9/04* | (2006.01) |
| *B23K 11/00* | (2006.01) |
| *B29C 64/386* | (2017.01) |
| *B23K 15/00* | (2006.01) |
| *B23K 26/342* | (2014.01) |
| *B23K 37/04* | (2006.01) |
| *B29C 64/106* | (2017.01) |
| *B23K 10/02* | (2006.01) |
| *B64G 1/66* | (2006.01) |
| *B64G 1/52* | (2006.01) |
| *B64G 1/26* | (2006.01) |
| *B64G 1/50* | (2006.01) |
| *B64G 4/00* | (2006.01) |
| *B64G 99/00* | (2009.01) |
| *B29L 31/30* | (2006.01) |

(52) U.S. Cl.
CPC ............ *B23K 9/044* (2013.01); *B23K 10/027* (2013.01); *B23K 11/0013* (2013.01); *B23K 15/0086* (2013.01); *B23K 15/0093* (2013.01); *B23K 26/342* (2015.10); *B23K 37/0408* (2013.01); *B23K 37/0461* (2013.01); *B29C 64/106* (2017.08); *B29C 64/386* (2017.08); *B33Y 10/00* (2014.12); *B33Y 30/00* (2014.12); *B33Y 40/00* (2014.12); *B33Y 50/02* (2014.12); *B33Y 70/00* (2014.12); *B33Y 80/00* (2014.12); *B64G 1/10* (2013.01); *B64G 1/26* (2013.01); *B64G 1/503* (2013.01); *B64G 1/52* (2013.01); *B64G 1/66* (2013.01); *B64G 4/00* (2013.01); *B64G 9/00* (2013.01); *B22F 2003/1056* (2013.01); *B29L 2031/3097* (2013.01); *Y02P 10/295* (2015.11)

(58) Field of Classification Search
CPC .. B23K 9/044; B23K 10/027; B23K 11/0013; B23K 15/0086; B23K 15/0093; B23K 26/342; B23K 37/0408; B23K 37/0461; B33Y 10/00; B33Y 30/00
See application file for complete search history.

(56) References Cited

U.S. PATENT DOCUMENTS

| | | | | |
|---|---|---|---|---|
| 7,003,872 | B2* | 2/2006 | Mimura | H05K 13/0413 |
| | | | | 29/832 |
| 7,168,935 | B1 | 1/2007 | Taminger et al. | |
| 8,196,294 | B2* | 6/2012 | Kino | H05K 13/0452 |
| | | | | 29/832 |
| 8,328,498 | B2* | 12/2012 | Higashida | H05K 13/0452 |
| | | | | 414/749.4 |
| 2001/0030383 | A1 | 10/2001 | Swanson et al. | |
| 2003/0235635 | A1 | 12/2003 | Fong et al. | |
| 2004/0035542 | A1 | 2/2004 | Ederer et al. | |
| 2004/0216503 | A1 | 11/2004 | Butscher et al. | |
| 2005/0071997 | A1* | 4/2005 | Oyama | H05K 13/0812 |
| | | | | 29/832 |
| 2005/0117306 | A1* | 6/2005 | Lee | H01L 23/4093 |
| | | | | 361/719 |
| 2005/0194401 | A1 | 9/2005 | Khoshnevis | |
| 2008/0147232 | A1* | 6/2008 | Kuribayashi | H05K 13/08 |
| | | | | 700/160 |
| 2008/0150192 | A1 | 6/2008 | Perret et al. | |
| 2009/0208577 | A1 | 8/2009 | Xu et al. | |
| 2009/0267269 | A1 | 10/2009 | Lim et al. | |
| 2013/0209600 | A1 | 8/2013 | Tow | |
| 2013/0319265 | A1 | 12/2013 | Tanaka et al. | |
| 2014/0020814 | A1 | 1/2014 | Druke et al. | |
| 2014/0074274 | A1 | 3/2014 | Douglas et al. | |
| 2014/0291886 | A1 | 10/2014 | Mark et al. | |
| 2015/0030381 | A1* | 1/2015 | Gregg | B23K 31/02 |
| | | | | 156/160 |
| 2015/0076732 | A1 | 3/2015 | Kemmer et al. | |
| 2015/0108687 | A1 | 4/2015 | Snyder et al. | |
| 2015/0210408 | A1 | 7/2015 | Dunn et al. | |
| 2017/0036783 | A1 | 2/2017 | Snyder | |

FOREIGN PATENT DOCUMENTS

| | | |
|---|---|---|
| KR | 1020070054857 | 5/2007 |
| RU | 2317229 | 2/2008 |
| RU | 2395784 | 7/2010 |
| RU | 2444716 | 3/2012 |

OTHER PUBLICATIONS

International Search Report, dated Apr. 2, 2019.
International Search Report, dated Jun. 2, 2020.

* cited by examiner

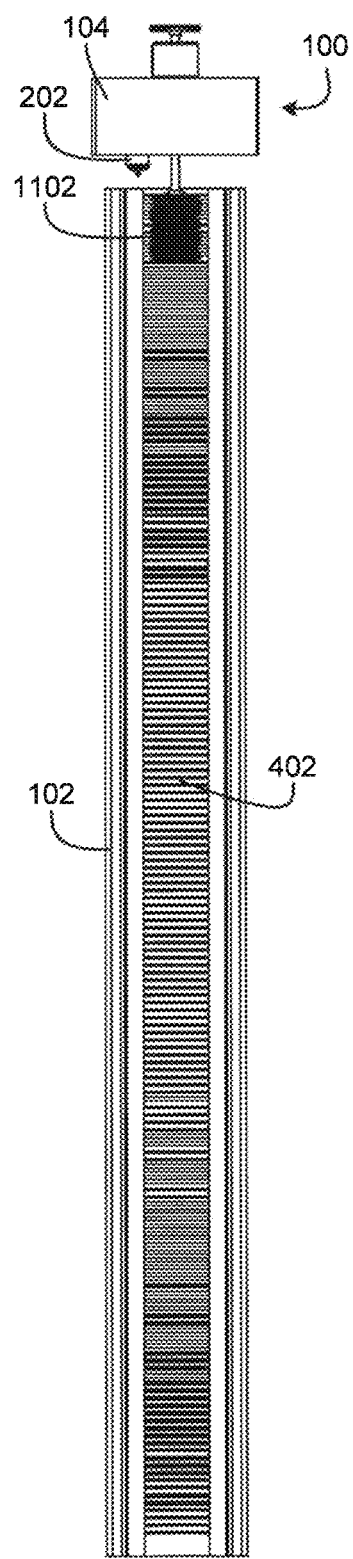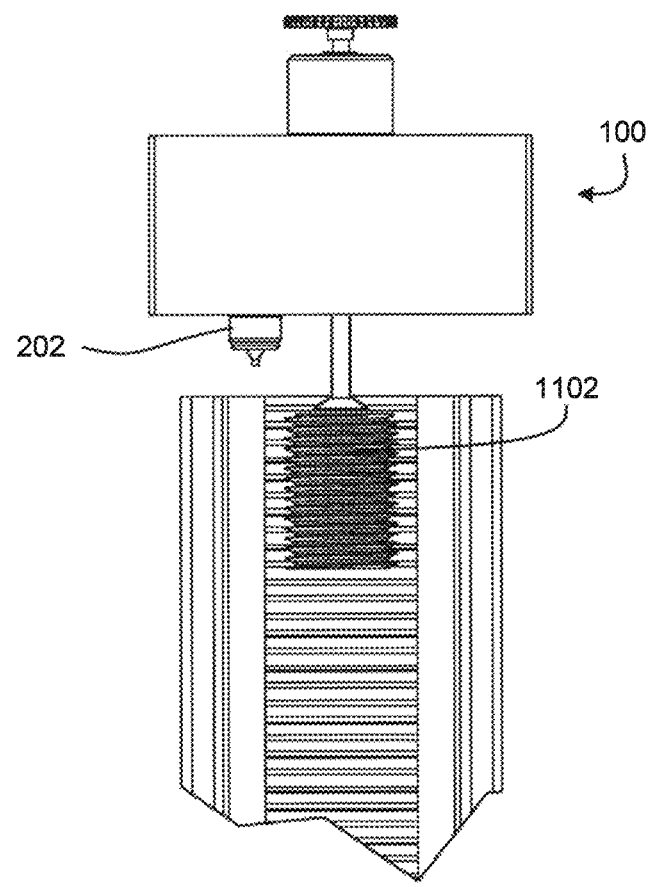
FIG. 11A
FIG. 11B

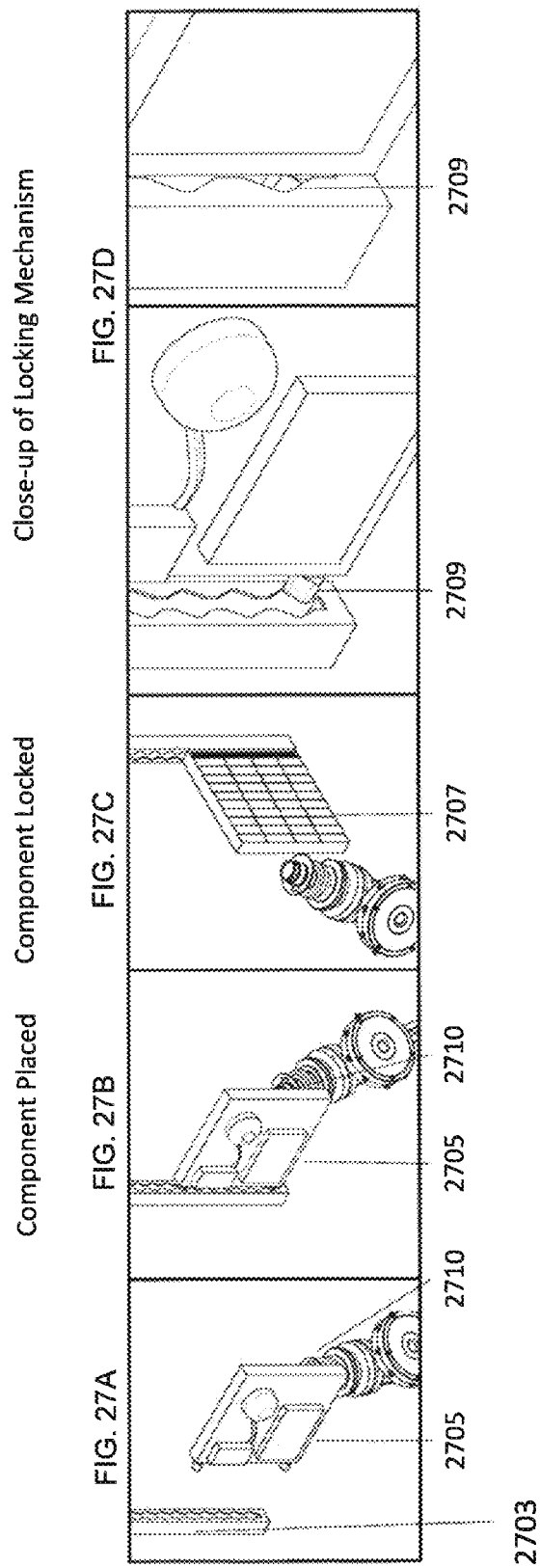

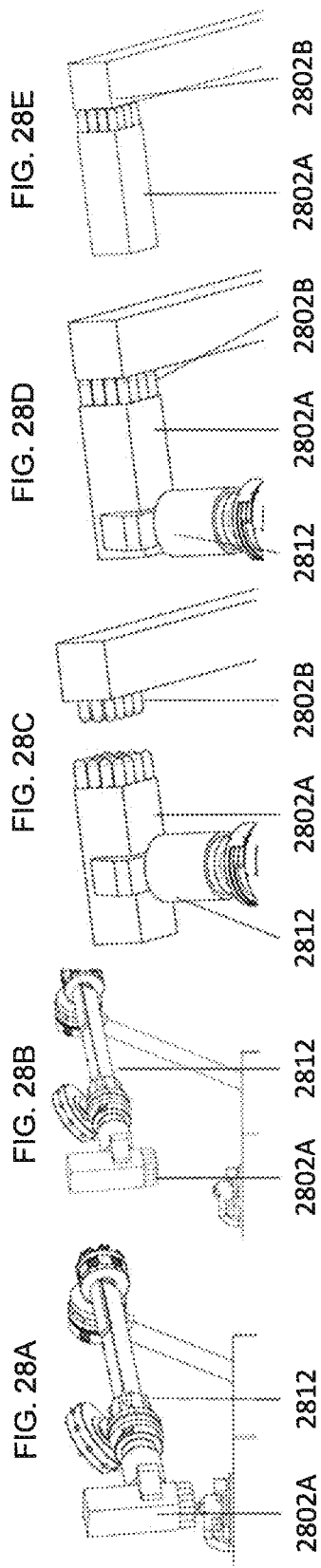

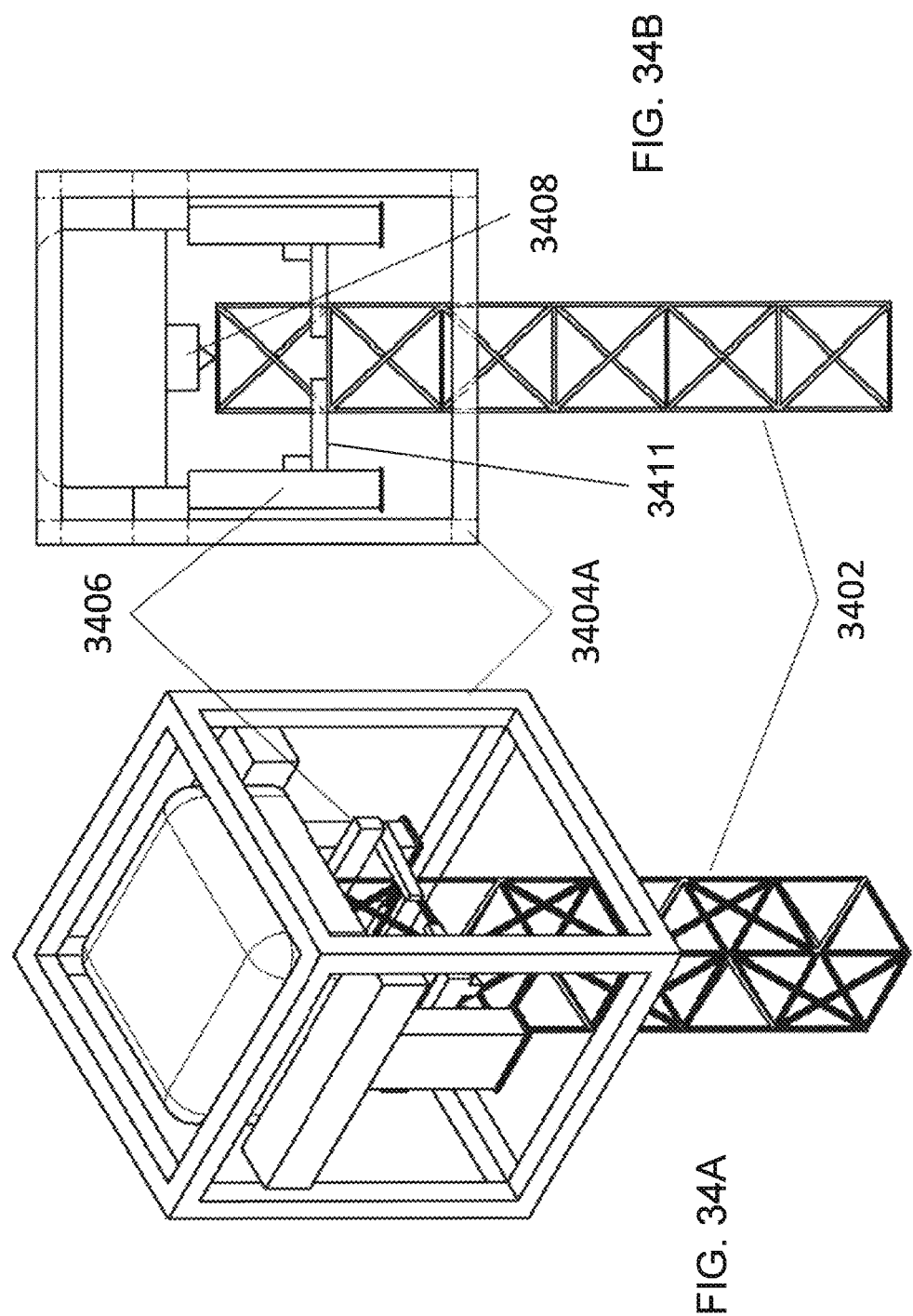

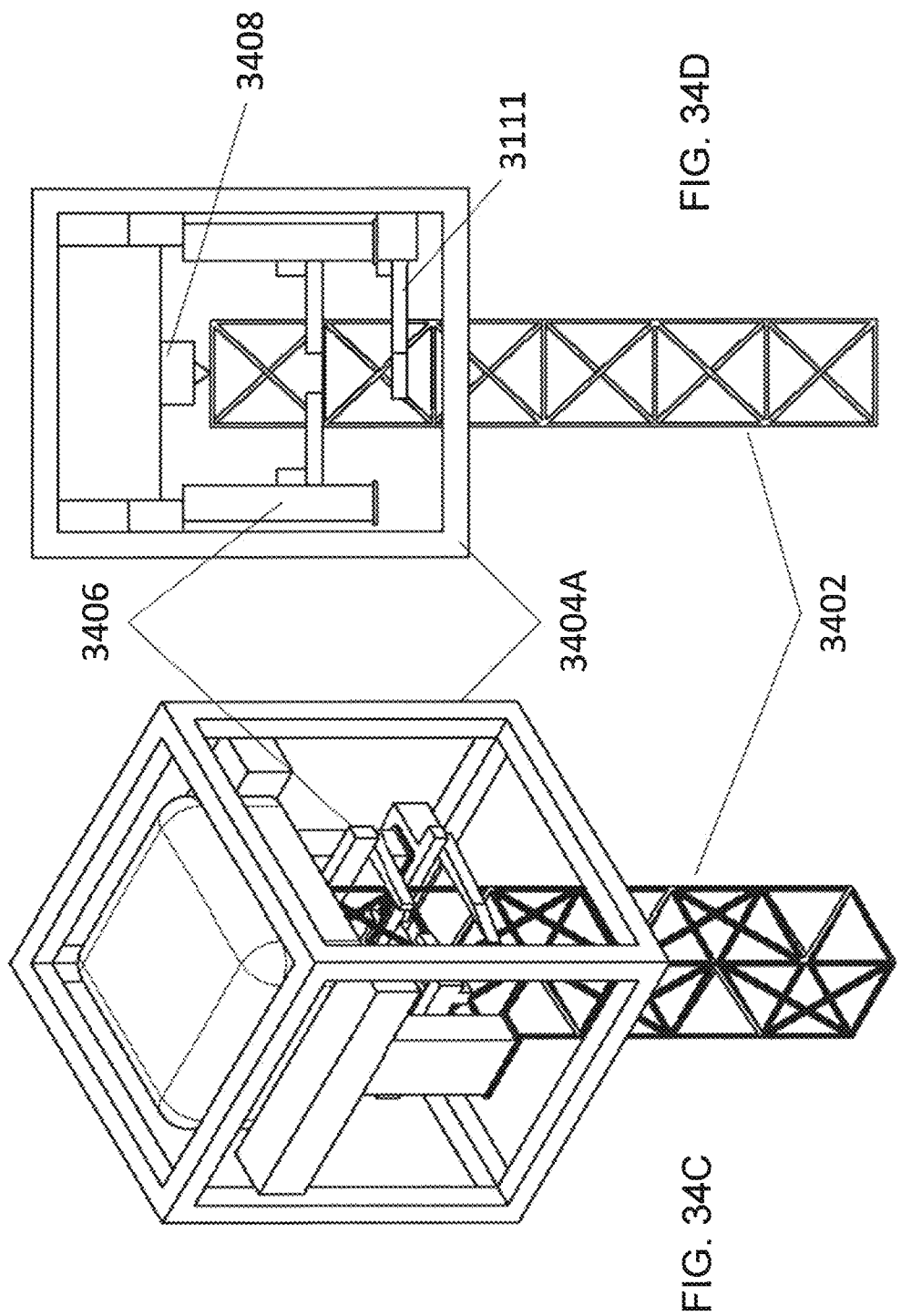

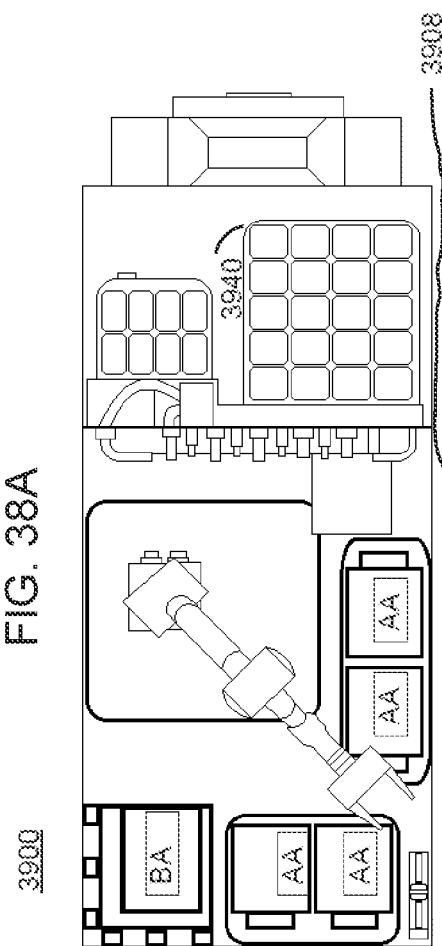
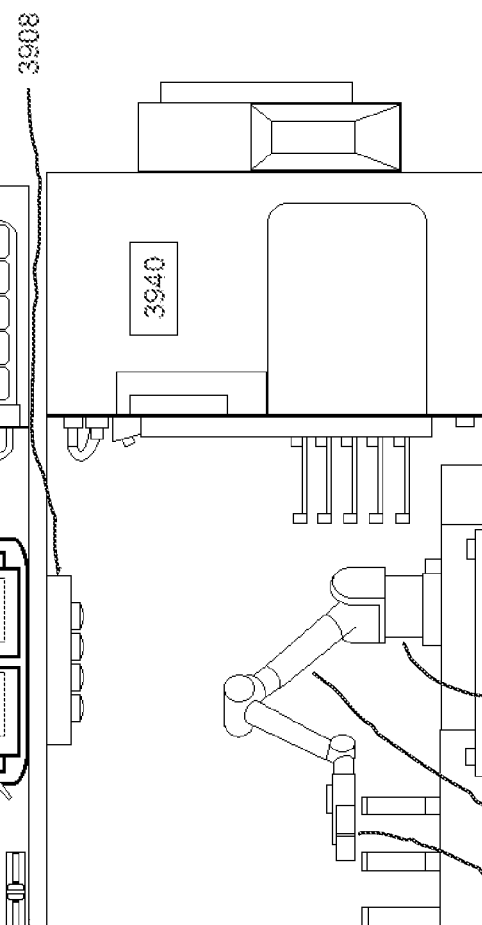
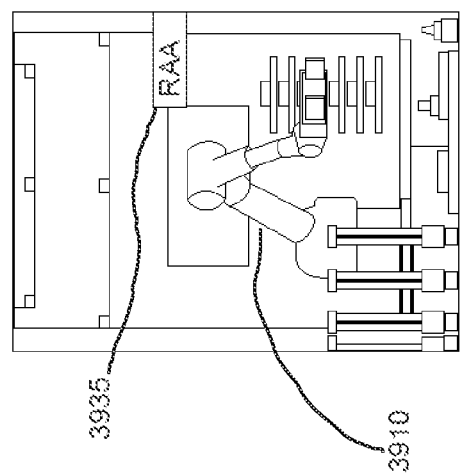
FIG. 38A
FIG. 38B
FIG. 38C

IN-SPACE MANUFACTURING AND ASSEMBLY OF SPACECRAFT DEVICE AND TECHNIQUES

CROSS-REFERENCE TO RELATED APPLICATIONS

This application claims the benefit of U.S. Provisional Application No. 62/200,568 filed Aug. 3, 2015, and incorporated herein by reference in their entirety.

FIELD OF THE DISCLOSURE

The present disclosure generally relates to manufacturing, and more particularly to additive manufacturing of spacecraft devices in space.

BACKGROUND

Additive manufacturing processes sequentially bond materials together in order to form the completed part. Creation of the part is computer controlled and produces the part according to three-dimensional representations of the desired part or other part creation instructions. Material, also known as "feedstock," may be bonded together via fusing layers or other small portions of material together.

Many current additive manufacturing techniques produce parts of limited size. The size of the part produced is constrained by the build volume of the additive manufacturing device. The build volume is the area in which the additive manufacturing device may create a part. A build volume is often defined in an XY plane by the area in which the additive manufacturing device may deposit or otherwise bond feedstock in forming the desired part. For example, in fused deposition modeling devices, the XY plane is defined by the lateral movement in the XY plane of the extruder which creates layers of the desired part. The initial layer is deposited onto a build platform or tray and subsequent layers are attached. The build volume is limited in the Z-direction by the maximum relative distance achievable between the build platform and the extruder or other bonding device. In some additive manufacturing devices, the build platform is connected to a z-axis step motor and moves as the part is created. In other devices, the extruder moves in the z-axis in addition to the x- and y-axes.

The size of the build volume is an inherent limitation of current additive manufacturing devices. Because this is a given volume, a continuous part can never grow larger than the build volume of a given machine. This poses a severely limiting problem where no object can be produced larger than the machine that is creating it. Today's additive manufacturing machines are growing print volume size in order to accommodate larger parts, but still there is an inevitable size limit on these machines. For instance, no additive manufacturing machine could be conceivably large enough to build an entire sky-scraper within its build volume; the machine would be far too large.

The size constraint placed on all additive manufacturing machines is a bottleneck. It severely limits the possible objects that could be built without any post machining to create the final part or structure.

Processes, such as those described in U.S. patent application Ser. No. 14/020,658 to Douglas, A., et al., have been created which produce large parts by dividing the desired part design into subparts which may be produced via additive manufacturing devices having limited build volumes. Connection features are added to each subpart design, enabling subparts to be connected together after production.

Spacecraft are highly limited by both launch volume and mass. When a spacecraft is deployed from earth it undergoes significant forces which can cause systems to become non-operational once in space.

Given the foregoing, additive manufacturing devices which produce spacecraft devices in space are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Embodiments relate to a system and method for assembling a spacecraft such as a satellite in space. A system comprises a build device having a build area and a material bonding component to receive portions of a material that are used to produce the object, at least one gripper within the build area to contact the object to provide support and to provide for at least one of a heat sink for the object. The system also comprises a cold sink for the object, and electrical dissipation path from the object. The system further comprises a movement mechanism to move the build device relative to the object to position the build device at a position to further produce the object.

A method comprising building, by an extended structure additive manufacturing (ESAMM) device, at least one of a spacecraft part and structure using an additive manufacturing material according to at least one schematic in at least one of a space environment, a microgravity environment, and a nautical environment. The method further comprises at least one of dissipating heat, dissipating cold and conducting electricity away from the at least one of a spacecraft part and structure using at least one gripper that is a part of the ESAMM device and is in contact with the at least one of a spacecraft part and structure. The method also comprises inspecting the at least one of a spacecraft part and structure while manufacturing. The method further comprises assembling and integrating, by the ESAMM device, the at least one of a spacecraft part and structure, with at least one of an electronic assembly and a component accessory to form a system of the spacecraft.

One method comprises building, by an extended structure additive manufacturing (ESAMM) device, at least one of a spacecraft part and structure using an additive manufacturing material according to at least one schematic in at least one of a space environment, a microgravity environment, and a nautical environment. The method further comprises at least one of dissipating heat, dissipating cold and conducting electricity away from the at least one of a spacecraft part and structure using at least one gripper that is a part of the ESAMM device and is in contact with the at least one of a spacecraft part and structure. The method also comprises inspecting, by the ESAMM device, the at least one of a spacecraft part and structure while manufacturing, and assembling and integrating, by the ESAMM device, the at least one of a spacecraft part and structure, with at least one of an electronic assembly and a component accessory to form a system of the spacecraft.

Another method comprises applying a first layer of a material from a material bonding component to produce an object in a first direction, and applying a second layer of the material from the material bonding component to produce the object in a second direction.

Another method comprises creating an object with a material extruded from a material bonding component that is a part of a build device with an unlimited build area in at least one direction where the object is built, and attaching at least one dampening mechanism to the object being built at a responsive location on the object as the object is built.

Another system comprises a build device having a build area and a material bonding component to receive portions of a material that are used to produce the object. The system also comprises at least one contacting device in physical contact with the object during at least a portion of object production, the contracting device providing for at least one of a heat sink for the object, a cold sink for the object, and electrical dissipation path from the object. The system further comprises a movement mechanism to move the build device relative to the object to position the build device at a position to further produce the object.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIGS. 11A and 11B are views of an extended structure additive manufacturing device comprising worm gears and producing a part having guide topography, according to an aspect of the present disclosure.

FIGS. 27A-27D illustrate views of a printed structure, the structure grabbed, locked in position and a close up of the locked position, according to aspects of the present disclosure.

FIGS. 28A-28E are perspective views of a mated printed structures, being fitted together, according to aspects of the present disclosure.

FIGS. 34A-34D is a part manufactured in space, according to aspects of the present disclosure.

FIGS. 38A-38C is an internal view of extended structure additive manufacturing device, according to aspects of the present disclosure.

DETAILED DESCRIPTION

Figure 1:
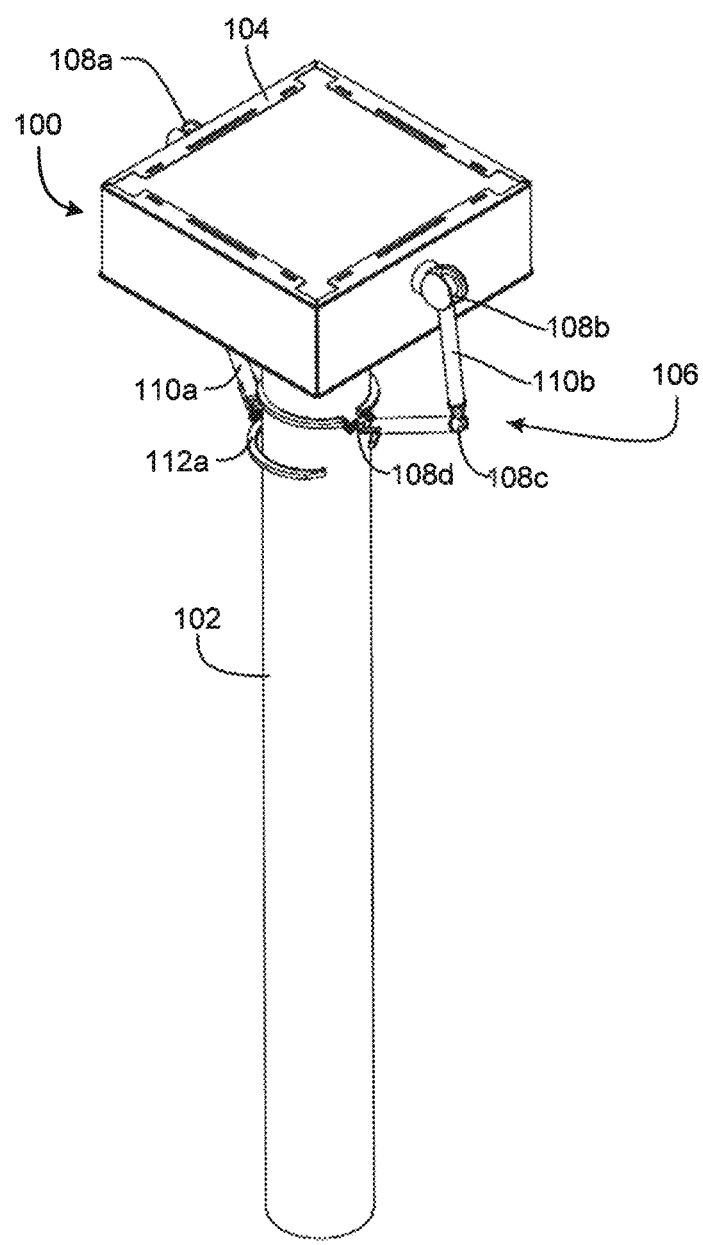
FIG. 1 is a perspective view of an extended structure additive manufacturing device producing an extended part, according to an aspect of the present disclosure.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The present disclosure is directed apparatus, systems, and methods which enable additive manufacturing of large continuous structures. Such structures may be constructed without providing a build volume larger than the structure being produced. In various aspects, devices in accordance with the present disclosure may function in environments such as, but not limited to, space environments, microgravity environments, terrestrial environments, free fall environments, nautical environments, variable force environments, other controlled environments, weightless environment, and the like. Devices in accordance with the present disclosure may create desired parts as objects, structures, expendable parts, replacement parts, experimental objects, make-shift repairs, portions of any of the foregoing, and the like. Instructions for the production of such parts may be pre-programmed within the device, provided by a local computing device (e.g., a computing device on a space station containing the additive manufacturing device), transmitted from a remote location (e.g., received from a remote server, received from a computing device on another celestial body or spacecraft), or received or generated at another location apparent to those skilled in the relevant art(s) after reading the description herein.

Extended structure additive manufacturing devices and the associated methods disclosed herein have many applications for building large structures, parts, and objects. It can be used to build any object greater than a typical machine's build volume. Such applications include, but are not limited to creating: beams for the construction of buildings; infrastructure of large skyscrapers; large antenna and communication devices; generative designed structures created specifically for their intended use; large structures in space; conduit and piping for building construction, including pipes with 90° turns; fuselages or portions thereof (e.g., aircraft fuselages); vehicle chassis and frame; portions of ships, submarines and the like; pressure vessels; and other large and small objects.

When creating a structure in space, several challenges and opportunities arise. In general, creating a structure in space is preferable to building that structure on earth and transporting it to space for final assembly. By creating the structure in space, that structure is not subject to the stresses of gravity, the vibration and additional acceleration forces from launch, and therefore it requires far less mass and overbuilding. The part may weigh far less and take up far less payload volume as a result.

Large-scale parts cannot be achieved simply by transporting the equivalent of a modern additive fabrication machine into space due to the "build volume" constraints. Devices in accordance with the present disclosure may be used to build large parts, continuous structures and other objects in space. Examples of potential space-based applications include building: large structures; mega structures; space stations; space-based solar power infrastructure; satellite components; docking stations; fuel depots; asteroid mining infrastructure; spacecraft (manned or unmanned); planetary body development infrastructure; generative designed structures; created specifically for their intended use; larger than deployable stiff beams and trusses; or portions of any of the foregoing.

Devices in accordance with the present disclosure enable production of continuous parts larger than any given build volume. With the extended structure additive manufacturing method, either the device or the part being created moves as it builds a three-dimensional part. During creation, the part being built extends beyond the build area. The device can move by interfacing with worm gears, wheels, propulsion, or other known methods of traversing.

Satellites and other spacecraft manufactured at least in part from raw materials and prefabricated components may provide a substantial advantage to overall system design and mission execution. Devices in accordance with the present disclosure can manufacture structures of indefinite length while attaching and embedding components along the way. This methodology allows for optimal packing efficiency and mass usage in a launched payload.

Devices in accordance with the present disclosure are configured to build, assemble, and/or inspect a spacecraft or portion of spacecraft. The device uses additive manufacturing, specifically extended structure additive manufacturing machine technologies and robotic manipulation, as well as structural and electrical mechanisms. Such devices may be configured to repair and modify existing spacecraft in space. Inspection of constructed structures and assembled components occurs via inspection devices integrated into or communicating with the device.

Various devices in accordance with the present disclosure may function in a pressurized environment (e.g., within a spacecraft), in a space environment, on a celestial body, while being exposed solar radiation, large thermal extremes and gradients, atomic oxygen and the like.

Figure 2:
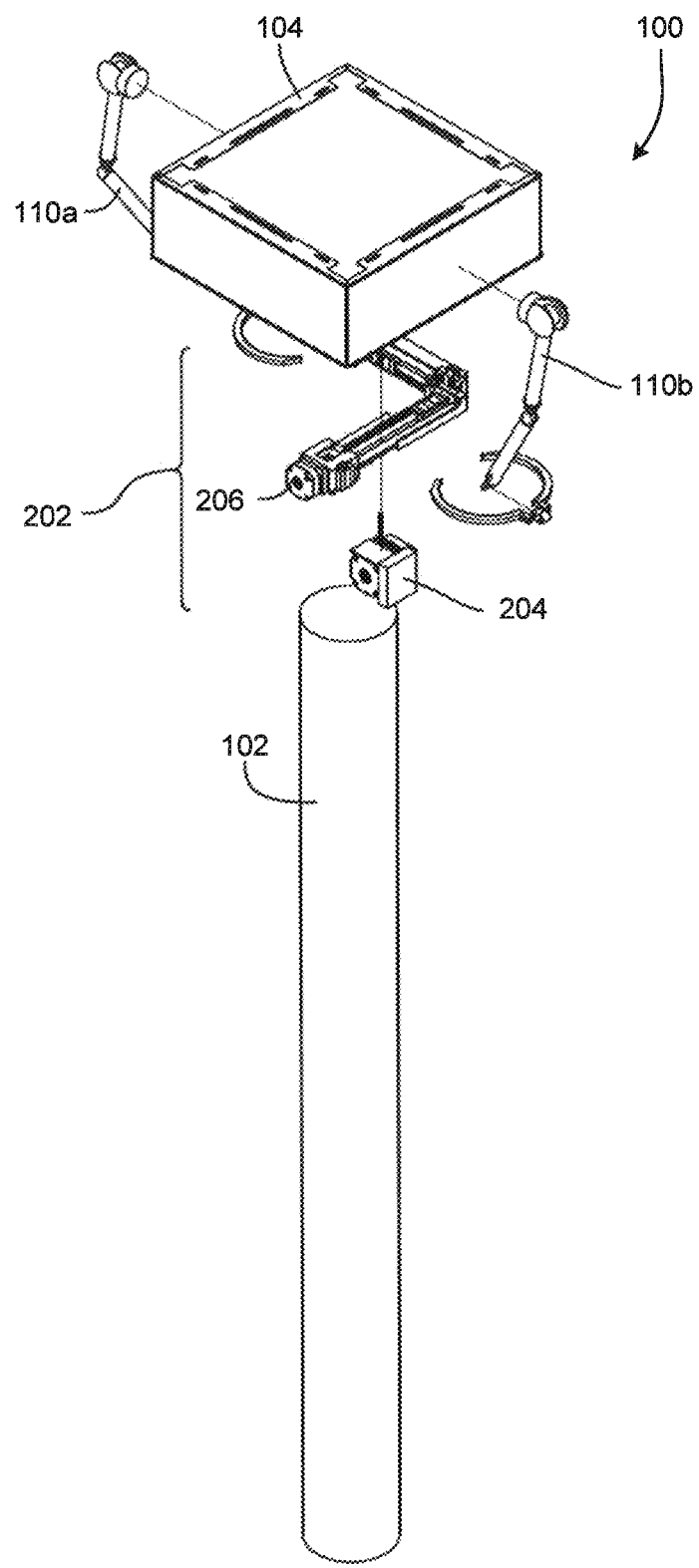
FIG. 2 is an exploded perspective view of an extended structure additive manufacturing device producing an extended part, according to an aspect of the present disclosure.
Figure 3:
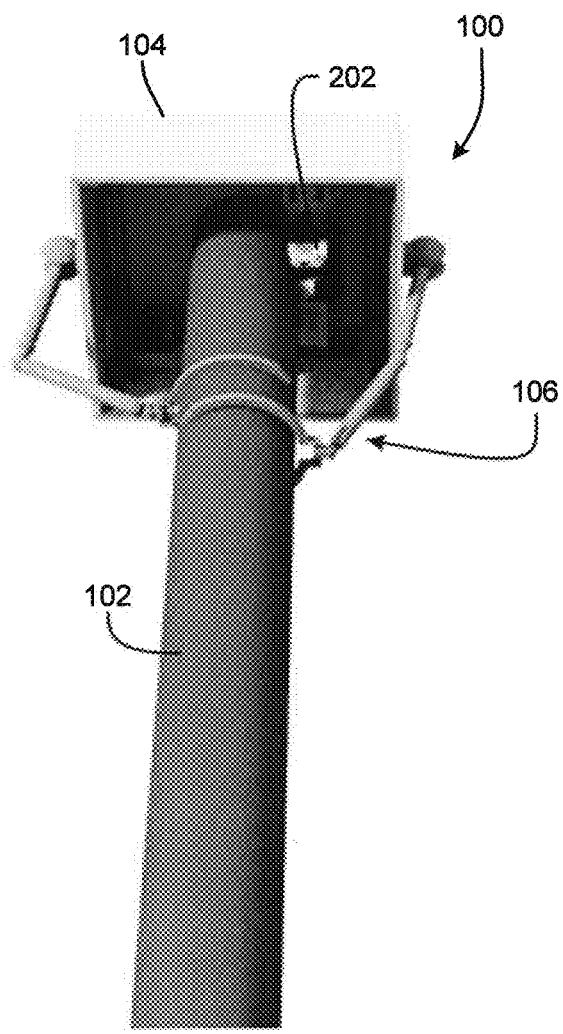
FIG. 3 is a bottom perspective view of an extended structure additive manufacturing device producing an extended part and showing the material bonding system, according to an aspect of the present disclosure.

Referring now to FIGS. 1-3, various views of an extended structure additive manufacturing device 100 which is producing a part 102, according to various aspects of the present disclosure, are shown.

The term "part" may be used herein to refer to objects created in whole or in part by extended structure additive manufacturing devices disclosed herein. Such objects may be continuous structures which extend away from the material bonding component as they are created. Example structures, such as beams or supports, may be generally linear in profile. Other structures, such as a pressure vessel, communications array, conduit, or portions of a spacecraft may have more complex or irregular profiles.

Extended structure additive manufacturing device 100 (sometimes referred to as "ESAMM" device) may have a body and/or a frame 104, material bonding system 202, and a movement mechanism 106 configured to move the additive manufacturing device relative to the part during part creation. Material bonding system 202 may include a movable material bonding component 204 connected to a material bonding component positioning system 206 such as the traverse shown in FIG. 2. Positioning system 206 moves material bonding component 204 within device 100. In various aspects, material bonding system 202 includes multiple material bonding components 204 moveable via one or more positioning systems or via portions of movement mechanism.

In an aspect, positioning system 206 is a traverse system. Traverse system 206 physically interfaces with and is supported by frame 104. The traverse system may include multiple linear actuators oriented in one or more axes. Each linear actuator includes a stepper motor connected to a gear box which rotates a screw-driven linear rail. A carriage is connected for movement to the rail, enabling precise positioning of the carriage and attached components such as other linear actuators and material bonding component 204.

In some aspects, positioning system 206 is omitted and movement mechanism 106 positions material bonding component 204.

Frame 104 may be a single piece such as a casting or molding, or frame 104 may be formed of multiple pieces. Frame 104 may include multiple portions housing modular and/or interchangeable components (e.g., control electronics modules, feedstock modules, and the like). In some aspects, frame 104 is a monocoque structure.

Material bonding system 202 may be part of an additive manufacturing device that has stationary parts secured to or part of the frame 104 as well as one or more movable parts used to print materials such as material bonding component 204, so that material bonding component 204 may move relative to frame 104. Material bonding component 204 may be an extruder which melts received feedstock, such as a polymer filament, and places, via positioning system 206 and movement mechanism 106, melted filament in order to create the desired part. Material bonding component 204 may comprise a selective laser sintering (SLS) mechanism or direct metal laser sintering mechanism (for which the movable portion may be part of a scanner system that is part of device 100). In some aspects, material bonding component 204 may be a welding device such as an electric arc welder, an energy beam welder, an oxy-fuel or gas welder, a resistance welder, or a solid state welder. In other aspects, the material bonding component 204 may be a stereolithography device, an inkjet head, a cladding head, a concrete or other solidifying material deposition device, or any other device apparent to those skilled in the relevant art(s) after reading the description herein. Where multiple material bonding components 204 are utilized, such multiple material bonding components 204 may bond or otherwise deposit different materials or have different characteristics (e.g., different resolutions).

A conventional printer has a print volume that is defined by the range of movement of the print-head. Device 100 enables continuous part creation outside of the print volume defined by the printer, thereby providing an expanded area available for creating part 102 that is not found in conventional additive manufacturing machines.

During part 102 creation, device 100 moves relative to part 102 and vice versa via movement mechanism 106. Movement mechanism 106 may be any one or more of various propulsion mechanisms. One such propulsion mechanism is a movable engagement mechanism, such as one or more fixed or movable arms 110. Arms 110 may be rigid or articulated with one or more joints 108 such as hinges and/or ball-joints. Arm 110 may include gripping claws 112 or other portions which may interface and/or stabilize part 102. In other aspects, movement mechanism 106 may include rollers, movable tracks, worms, wheels (including cog wheels such as gears, pinions, and wheels with ball rollers), or directable thrusters such as a small jet or rocket thruster). The drive for such movement mechanisms 106 may be mechanical and/or electrical (such as via motor and optional gearbox and/or cables and pulleys; rack and pinion) and/or hydraulic (such as via hydraulic fluids and pistons connected to movable portions). Movement mechanism 106 may be e.g., mechanical and/or chemical (as in a rocket).

Extended stricture additive manufacturing device 100 may additively construct part 102 beneath it. When device 100 reaches the extent of the conventional "build volume" defined by material bonding system 202, however, device 100 actually "climbs" part 100 being constructed and/or moves the structure outside of the ESAMM's traditional "build volume." Therefore, the ESAMM is able to create an additional, continuous, sequential portion of part 102, thereby generating part 102 substantially larger than device where desired.

As the printed portion of part 102 grows larger and/or longer, device 100 may climb or otherwise maneuver along part 102 at a necessary pace so that material bonding system 202 remains at the correct distance to part 102. In some aspects, material bonding component 204 is coupled or decoupled from the movement mechanism 106. Decoupling would enable device 100 to have variable levels of adjustment, allowing more accuracy to the bonding surface (e.g., the print surface) than movement mechanism 106 would otherwise allow. For example, where movement mechanism 106 allows for large steps (1 mm, 1 cm, 1 m, etc. depending on application) in a z-axis, material bonding system 202 may include traverse 206 which moves material bonding component 204 in the given z-axis in finer steps (10, 20, 100 microns, etc. depending on application). In this fashion, device 100 may create several layers of part 102 without repositioning part 102 via movement mechanism.

As a result, very complex structures could be created this way, irrespective of the limitations imposed by length, many more conventional fabrication technologies, or gravitational pull.

In an aspect, movement mechanism 106 may include arms 110 having robotic manipulators such as claws 112. Arms 110 may have up to 6 degrees of freedom with the help of electromechanical devices such as servo motors along each arm 110. In other aspects arms 110 may have more of fewer degrees of freedom. Arms 110 are used to position actuating gripping mechanisms (claw 112) to grab ahold of the created part 102 and robotically maneuver relative to part 102. The manipulators and arms 110 can range in size, quantity, and position to achieve the same type of climbing movement along a manufactured item as well as structures that already exist that need to be manufactured on.

In other aspects, arm 110 includes a gripping foot. The gripping foot may have an adhesive applied thereon, have a high friction contact surface, be deformable, include electrostatic adhesion elements, vacuum or other suction attachment elements, or the like in order to attach to part 102 in the desired manner.

In other aspects, arms 110 include devices which facilitate climbing part 102 in a similar fashion to recreational, Earth-based climbing. Devices include modules which tap into part 102 using an anchor for a hold while maneuvering, creating anchors along part 102 to use in place of post manufacturing anchor integration/use. Picks and other surface drilling devices can be used also to "bite" in a surface to allow maneuvering.

In various aspects, device 100 includes or is connected to one or more feedstock sources. Feedstock is any material or combination of materials suitable for the production of a part. Feedstock may be plastic, metal, organic material, inorganic materials or combinations of such materials. As will be apparent to those skilled in the relevant art(s) after reading the description herein, materials such as acrylonitrile butadiene styrene (ABS), polycarbonate (PC), polylactic acid (KA), high density polyethylene (HDPE), polyphenylsulfone (PPSU), soldering wire, polymer matrix composites, polyether ether keytone (PEEK), bismuth, aluminum, titanium, tin, ceramics, glass, carbon fiber, and the like may be used to produce desired parts via additive manufacturing. In some aspects, feedstock is in the appropriate state, shape, size, and/or other physical characteristic suitable for utilization by the material bonding component.

Feedstock may be produced from asteroid regolith, regolith of other celestial bodies, from space debris, from trash, from obsolete parts, and the like. In some aspects, feedstock is a polymer filament containing metal powder. In another aspect, feedstock is a polymer containing carbon nanotubes, fibers, or the like. In yet another aspect, feedstock is a resin, a resin containing a filler, binder, and/or powder, or the like. Feedstock may be a liquid or a combination of materials having different physical states (e.g., a solid and a liquid).

In some aspects, device 100 includes control electronics mounted within or on to frame 104. Control electronics may operate portions of device 100 and/or receive operational commands from other sources via mechanisms apparent to those skilled in the relevant art(s) after reading the description herein.

Although part 102 shown in FIGS. 1-3 is a linear beam, device 100 may be utilized to produce parts 102 having non-linear profiles. For example, device 100 may produce a dish-shaped part 102 of any desired size (e.g., 10 meters, 100 meters, 1 or more kilometers). Device 100 may produce complex structures such as a lattice, a pressure vessel, a spacecraft module, and the like.

In some aspects, the print area may be angled relative to previously created layers of part 102. This is one manner of creating a curved portion of part 102. Device 100 may be oriented in this fashion and spiral inward, creating a dish or other circular structure. As will be apparent to those skilled in the relevant art(s) after reading the description herein, device may be oriented in other manners or create portions of part 102 in other ways in order to create the desired linear or non-linear structure of part 102.

Figures 4A, 4B:
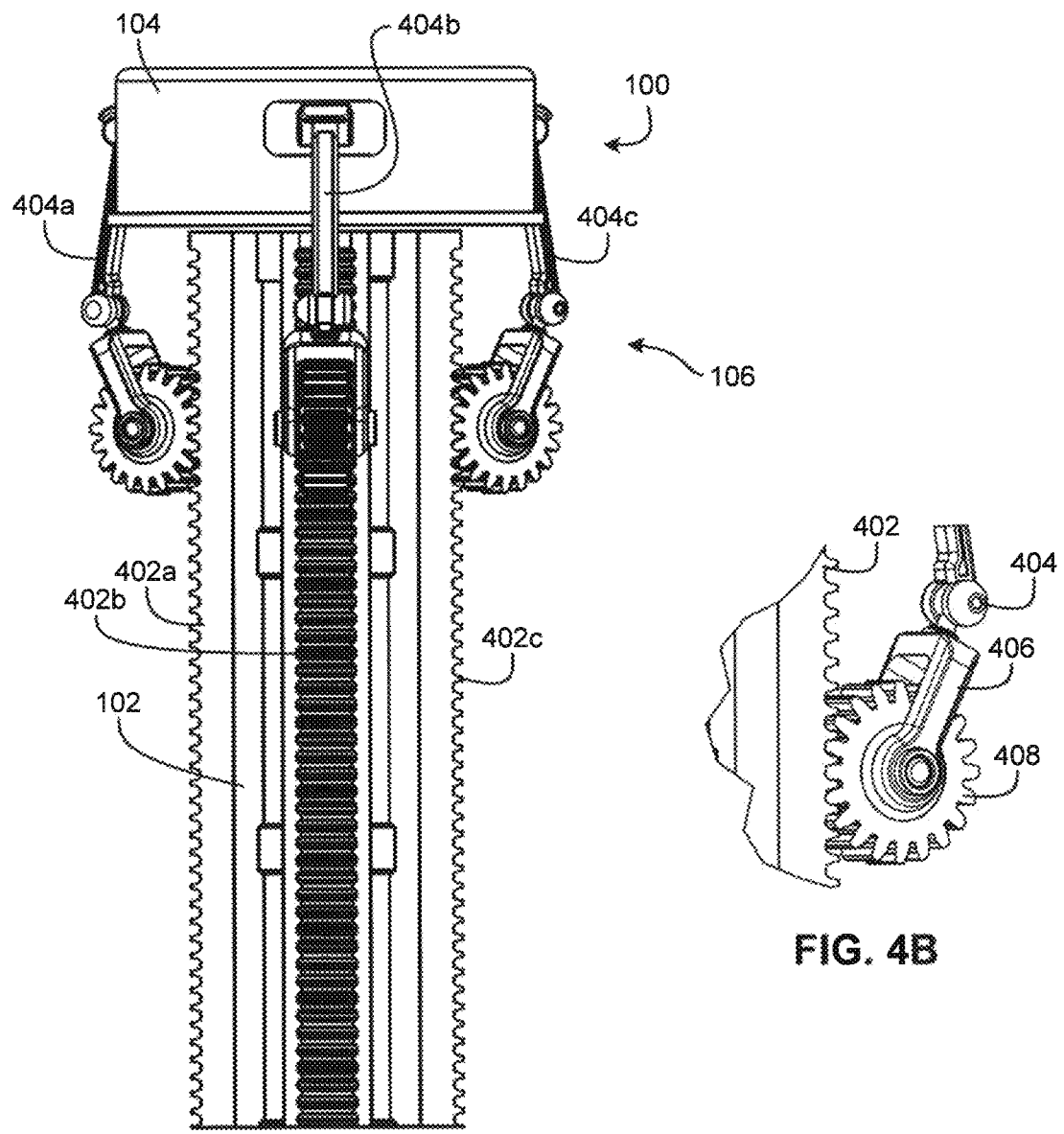
FIGS. 4A and 4B are views of an extended structure additive manufacturing device comprising geared wheels and producing a part having geared guide topography, according to an aspect of the present disclosure.
Figure 5:
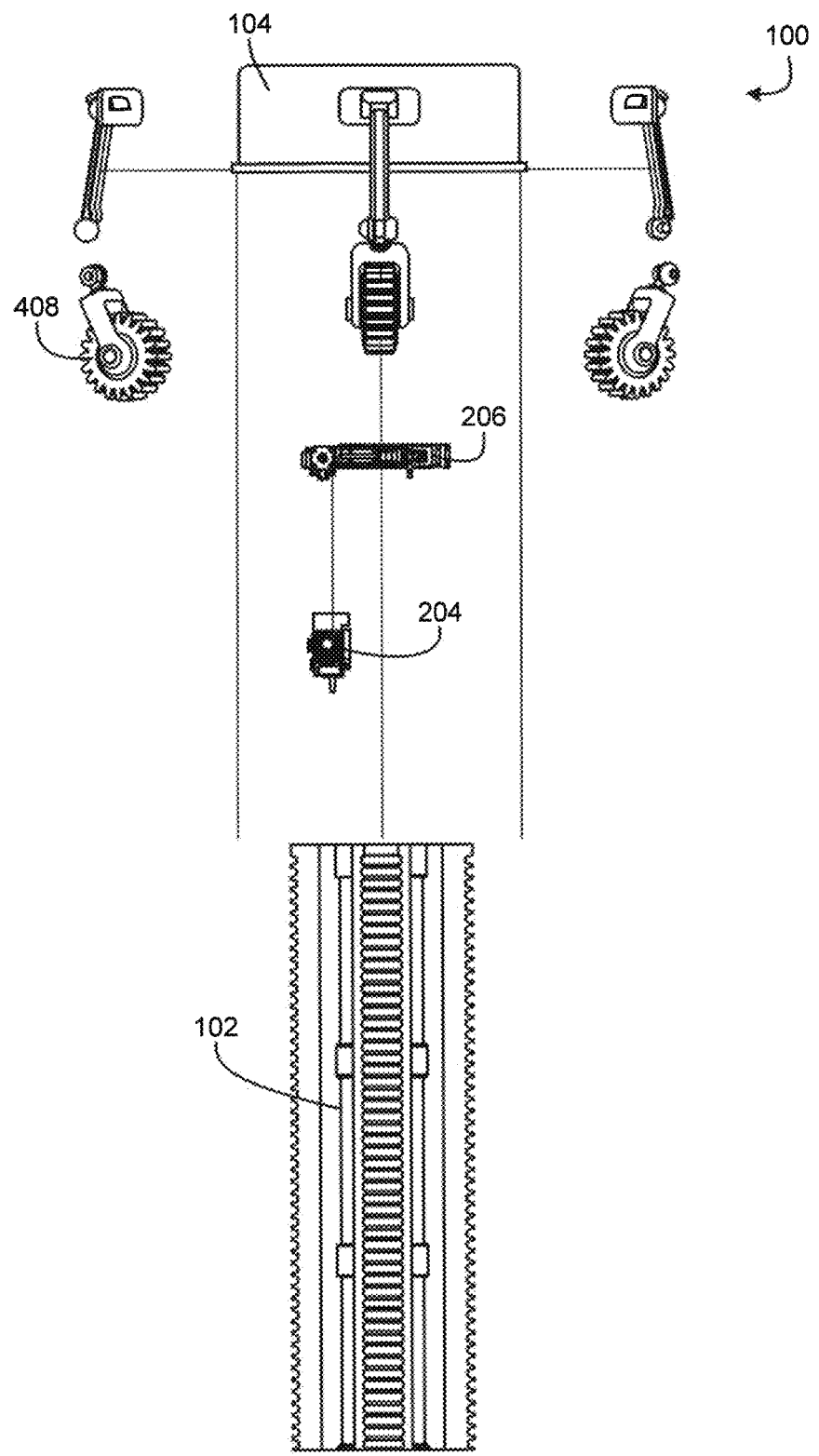
FIG. 5 is an exploded perspective view of an extended structure additive manufacturing device comprising geared wheels and producing an extended part having geared guide topography, according to an aspect of the present disclosure.
Figure 7:
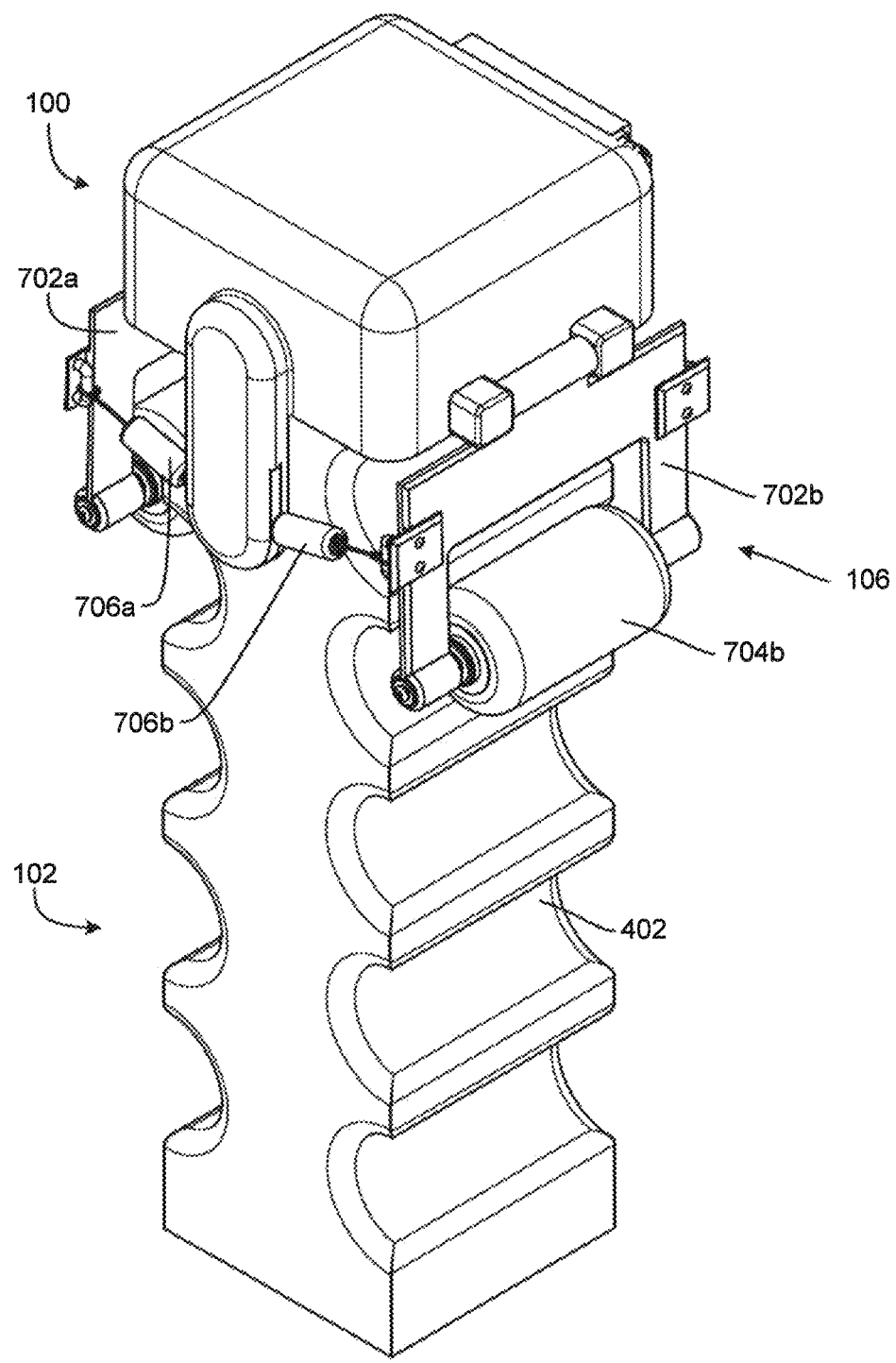
FIG. 7 is a perspective view of an extended structure additive manufacturing device comprising rollers and producing a part having guide topography, according to an aspect of the present disclosure.

Referring now to FIGS. 4A, 4B & 5, various views of extended structure additive manufacturing device 100 comprising geared wheel arms 404 having articulable wheels 408 held within axle 406, according to various aspects of the present disclosure, are shown. Wheel 408. In other aspects, device 100 includes additional portions of moving mechanism 106 which cause device to move relative to part 102. Device 100 may produce part 102 having guide topography 402, such as the columns of teeth shown in FIGS. 4A-B. Guide topography 402 is any structure created by device 100 which interfaces with movement mechanism 106 in order to assist in maintaining positioning between part 102 and device 100. Guide topography 402 may be integrated into part 102 or added to the desired design of part 102 before part production. Guide topography 402 may be continuous, as shown in FIGS. 4A-5, or created periodically. For example, a recessed annulus may be integrated into the surface structure of part 102 at defined intervals, providing a place for movement mechanism to grip part 102 as it is produced. Guide topography 402 may be one or more columns of spur teeth (as shown in FIG. 4), worm teeth (as shown in FIG. 11), helical teeth, or the like. Guide topography 402 may be a series of indentations (as shown in FIG. 7) or a series of protrusions. Guide topography 402 may include a roughened surface or other features which increase frictional forces between movement mechanism and part 102. As will be apparent to those skilled in the relevant art(s) after reading the description herein, guide topography 402 may be any regular or irregular surface treatment which facilitates guiding and positioning part 102. In various aspects, no guide topography 402 is created.

Wheel 408 includes a toothed surface enabling interaction with a flat gear surface topography 402 or a rack surface topography 42. In other aspects, wheel 408 has a spur gear or helical gear surface, enabling interaction with surface topography 408 configured to create a spur gear or helical gear.

Gear wheel arms 404 may or may not be spaced evenly around frame 104. In some aspects, gear wheel arms 404 can have up to 6 degrees of freedom with the help of electromechanical devices such as servo motors along each arm 404. At the base of each arm 404 is a motor and spur gear wheel 408 that locks into the part at surface topography 402. While the vertical translation is controlled primarily by arms 404, an adjustment mechanism ensures that the material bonding component 204 stays within an ideal range. Control electronics may rest on top of device, but can be moved, anywhere and/or housed within an enclosed structure, or could also be unenclosed.

Movement mechanism 106 configured as a multi-armed gear mechanism, which could have two, three, four, five six, or more arms, may provide three main benefits. First, by using gears and designing structures that incorporate teeth or without teeth and using another solution, a desired climbing rate is ensured (I to I, 2 to I, 3 to I, etc.). Second, the arms can move in and out easily to allow for a variety of diameters, even within the same structure. Finally, gear climbing rates can be adjusted to create curved structures, allowing movement beyond 1-axis creations.

Figure 6:
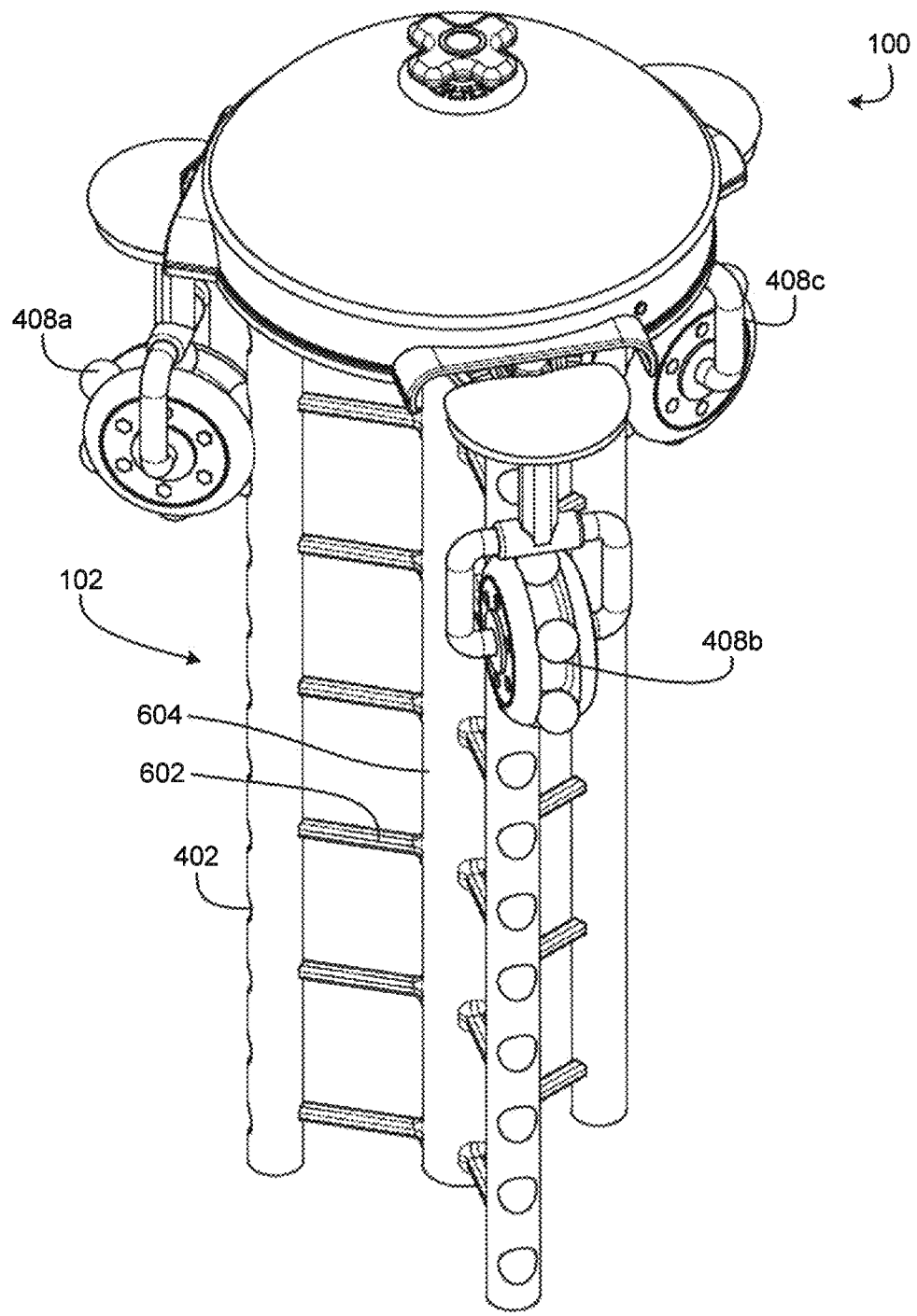
FIG. 6 is a perspective view of an extended structure additive manufacturing device comprising geared wheels with hemispherical teeth and producing a part having guide topography, according to an aspect of the present disclosure.

Referring briefly now to FIG. 6, extended structure additive manufacturing device 100 comprising geared wheels 408 with hemispherical teeth and producing part 102 having guide topography 402, according to an aspect of the present disclosure, is shown. Part 102 may be produced with outer guide portions housing guide topography 402. Such outer guide portions may be removable from the desired structure 604 via cross members 602. After creation of part 102, the outer guides and cross members 602 may be removed, leaving the desired portion 604 for utilization.

Figure 8:
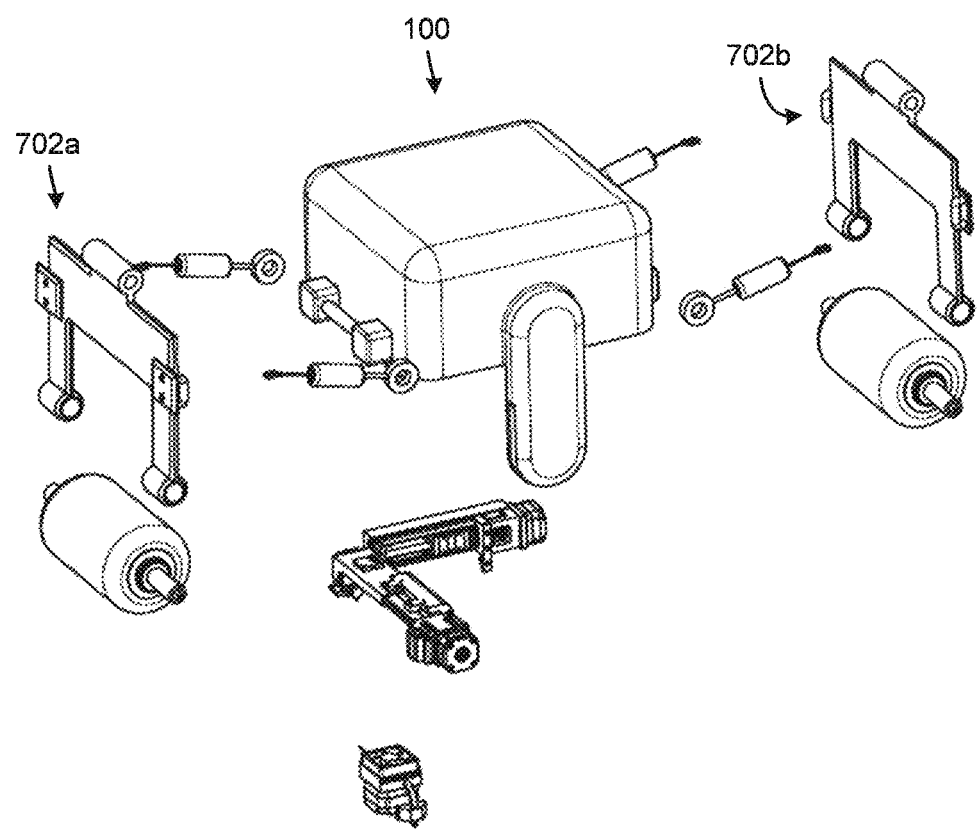
FIG. 8 is an exploded view an extended structure additive manufacturing device comprising rollers, according to an aspect of the present disclosure.

Referring now to FIGS. 7-8, various views of extended structure additive manufacturing device 100 comprising rollers and producing a part having guide topography In some aspects, moving mechanism 106 may include two of more roller arms 702. Each roller arm 702 includes a roller 704. In other aspects, roller arms 702 include rotating balls or other objects which may roll along a track containing indentations or along the smooth surface of part 102. Part 102 may include surface topography 402 which creates a series of indentations along a long axis of part 102. Roller arms 702 may be controlled by actuator 706, providing a variable force and allowing device 100 to accommodate parts 102 of varying cross sections. The force of roller arms 702 is variable to adjust for any sized contours without slipping. Rollers 704 can range in size, quantity (one, two, three or more), and position to achieve the same type of climbing movement along a manufactured part 102 and the materials used for the rolling mechanisms can range for any operational purposes (e.g. adhesive, high friction, soft).

Figure 9:
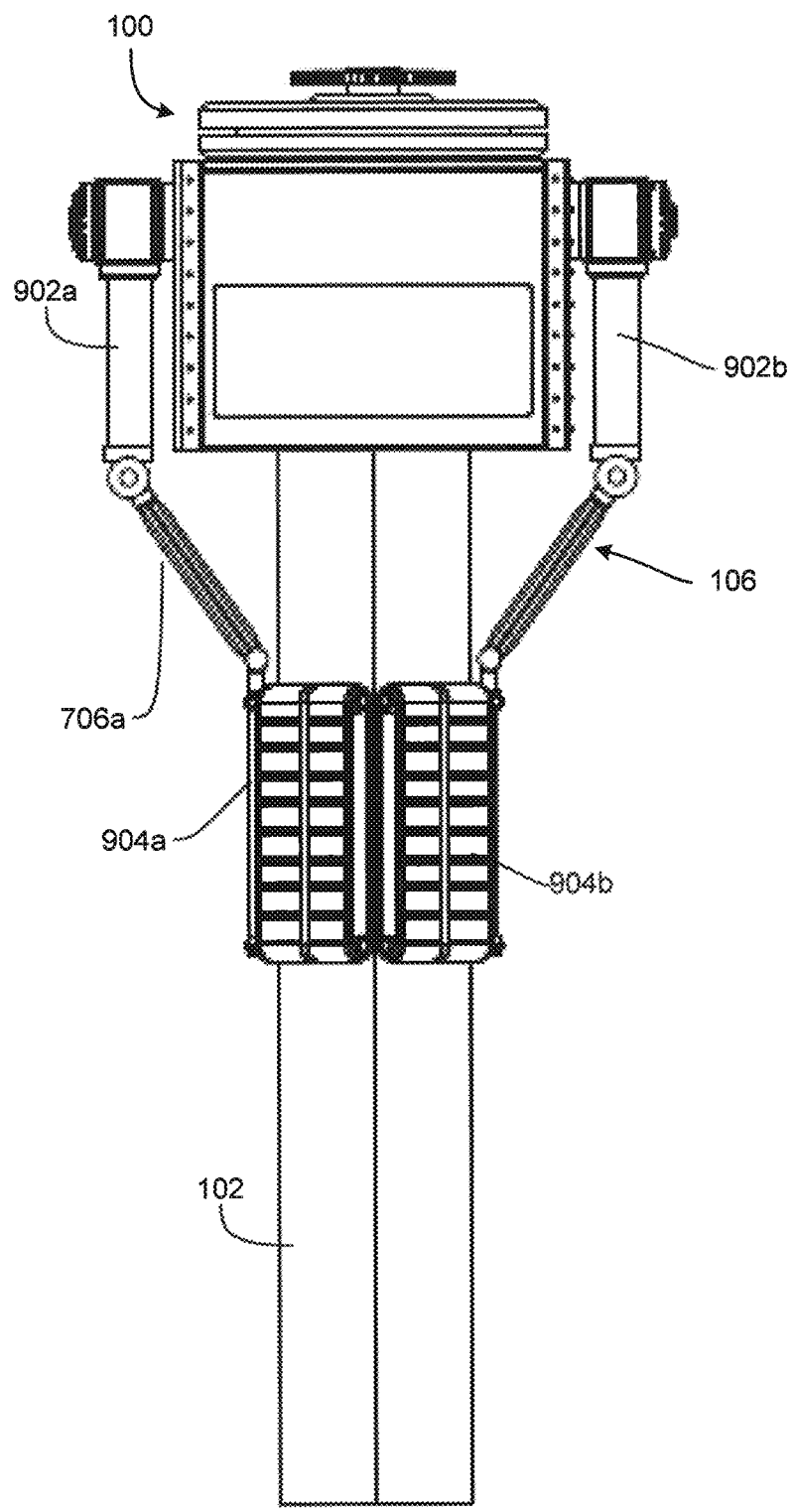
FIG. 9 is a side view of an extended structure additive manufacturing device comprising treads, according to an aspect of the present disclosure.
Figure 10:
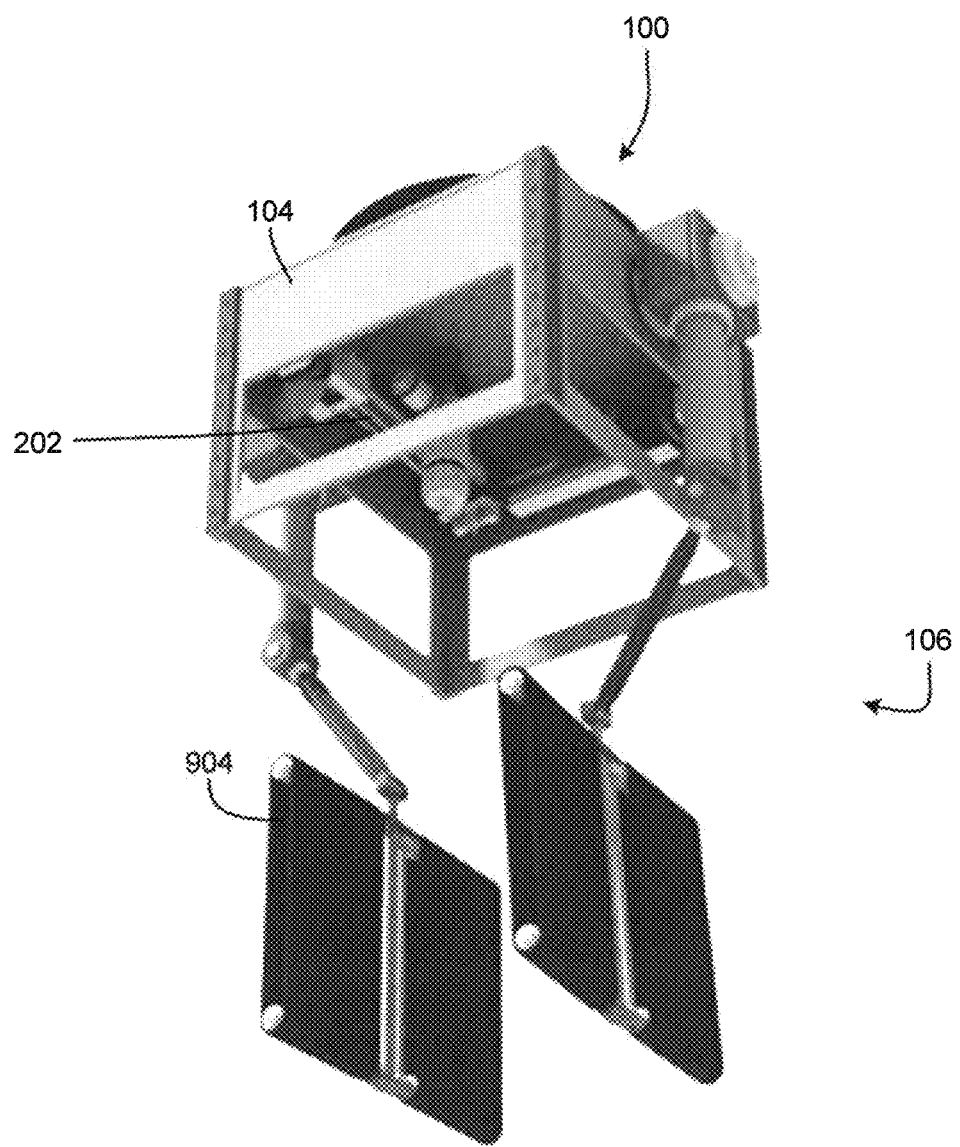
FIG. 10 is a bottom perspective view of an extended structure additive manufacturing device comprising treads, according to an aspect of the present disclosure.

Referring now to FIGS. 9-10, various views of extended structure additive manufacturing device 100 comprising treads arms 902, are shown.

Moving mechanism 106 may include tread arms 902. Each tread arm 902 may include two or more treads 904 which articulate, allowing treads 904 to contact sides of part 102. Treads 904 can swing in and out depending on the angle of contact with part 102. Like gear-based devices 102, devices including tread arms 902 have the ability to change diameters during a build, as well as from one part 102 to the next. Unlike the geared system, the structure does not have to be designed specifically to fit treads 904. As long as the treads can make consistent contact with the outer surface of part 102, positioning may be maintained.

Referring now to FIGS. 11A-B, views of extended structure additive manufacturing device 100 comprising worm gears 1102 and producing part 102 having guide topography 402, according to an aspect of the present disclosure, are shown.

In an aspect, device 100 may include two, three, four or more mobile or immobile worm gear arms 1102 each including a motorized worm gear. This gear will thread into the teeth of guide topography of part 102 during part creation.

Figure 12:
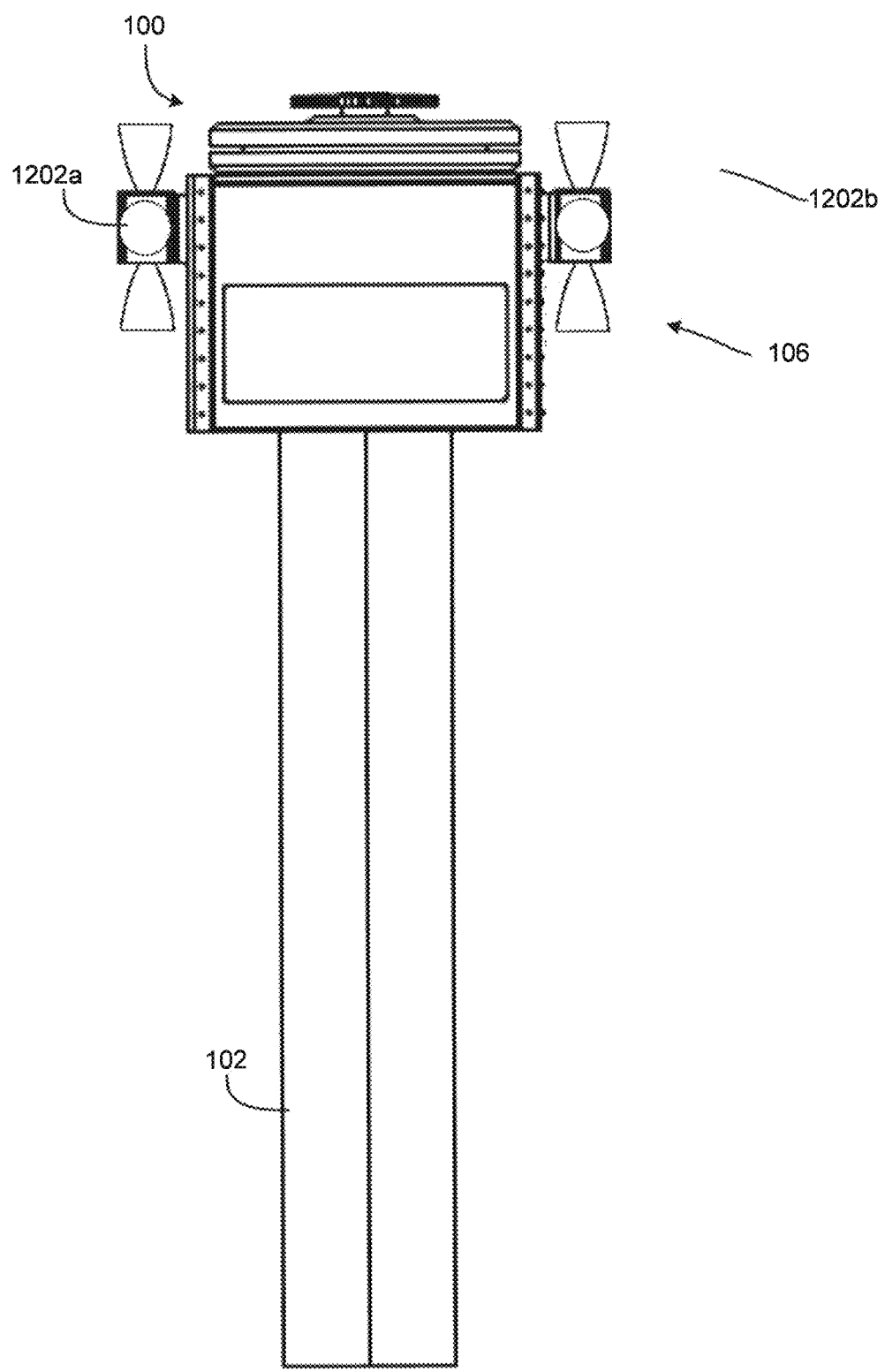
FIG. 12 is a side view of an extended structure additive manufacturing device comprising thrusters, according to an aspect of the present disclosure.

Referring now to FIG. 12, a side view of extended structure additive manufacturing device 100 comprising thrusters 1202, according to an aspect of the present disclosure, is shown.

In some aspects thrusters 1202 such as RCS thrusters or similar devices or thruster pods may be integrated into device 100 in lieu of or in addition to other portions of movement mechanism 106. Such a configuration allows device 100 to move along the part 102 being created without any direct contact.

Figure 13:
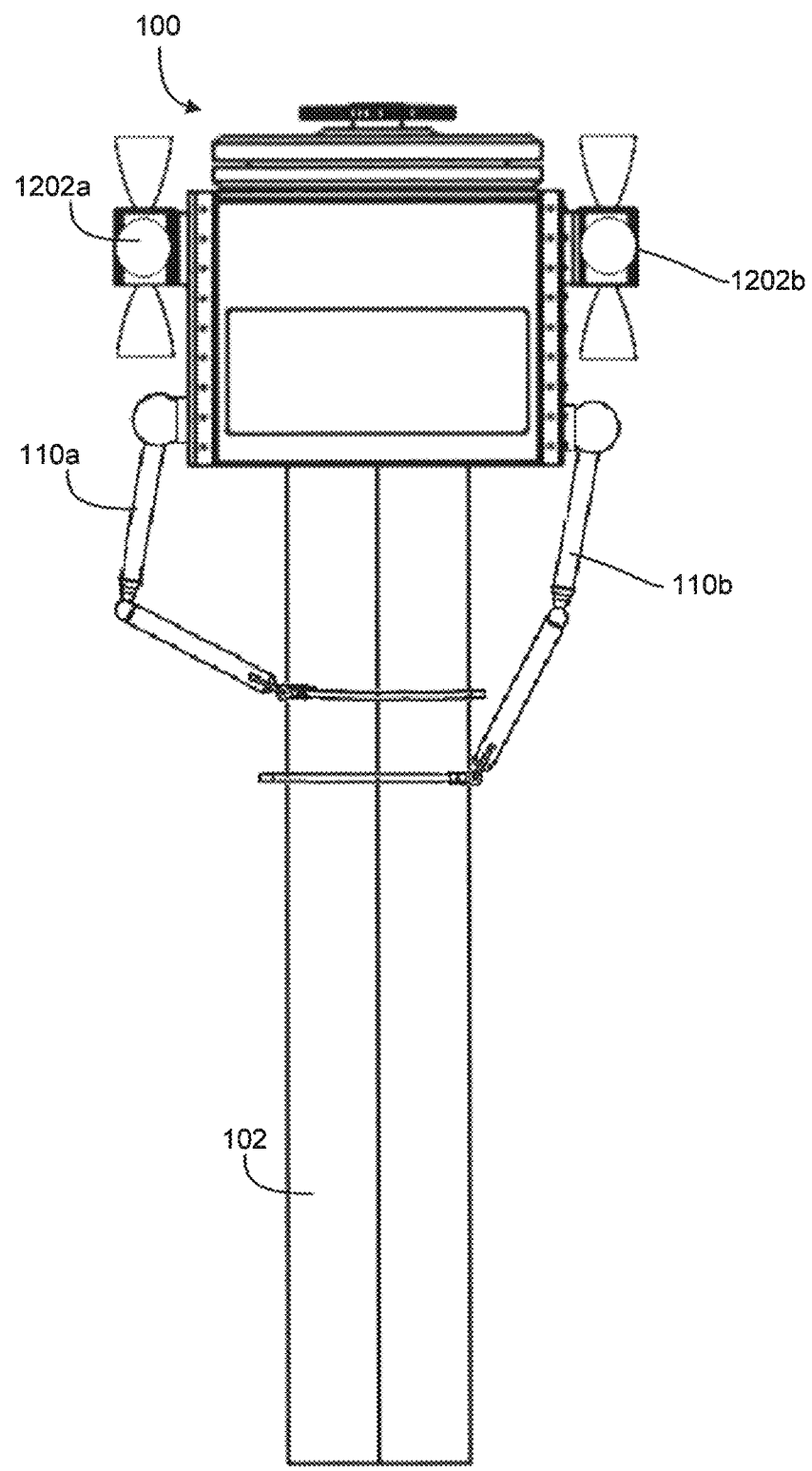
FIG. 13 is a side view of an extended structure additive manufacturing device comprising thrusters and grappling arms, according to an aspect of the present disclosure.

Referring now to FIG. 13, a side view of extended structure additive manufacturing device 100 comprising thrusters 1202 and grappling arms 110, according to an aspect of the present disclosure, is shown.

In various aspects, movement mechanism 106 includes fine movement control devices and gross movement control devices. Thruster 1202 may be an example of a gross movement control device, capable of moving device 100 large distances and not capable of precisely and quickly positioning device 100 over smaller distances. Thruster 1202 may also move device 100 from one area to another. For example, device 100 may produce a 100-meter long truss and transit, via thruster 1202 or similar propulsive device to a midpoint of the truss and begin creating a second truss connected and orthogonal to the first truss, thereby forming a more complex part 102. Fine movement devices include arm 110, roller arm 702, tread arm 902, gear arm 404 and the like. Fine movement devices grab onto or otherwise contact part 102 and stabilize device 100 relative part 102. Via such fine movement control devices, device 100 may travel "up" part 102 as it is created. Some fine movement control devices may be used to move or traverse device 100 along part 102.

Figure 14:
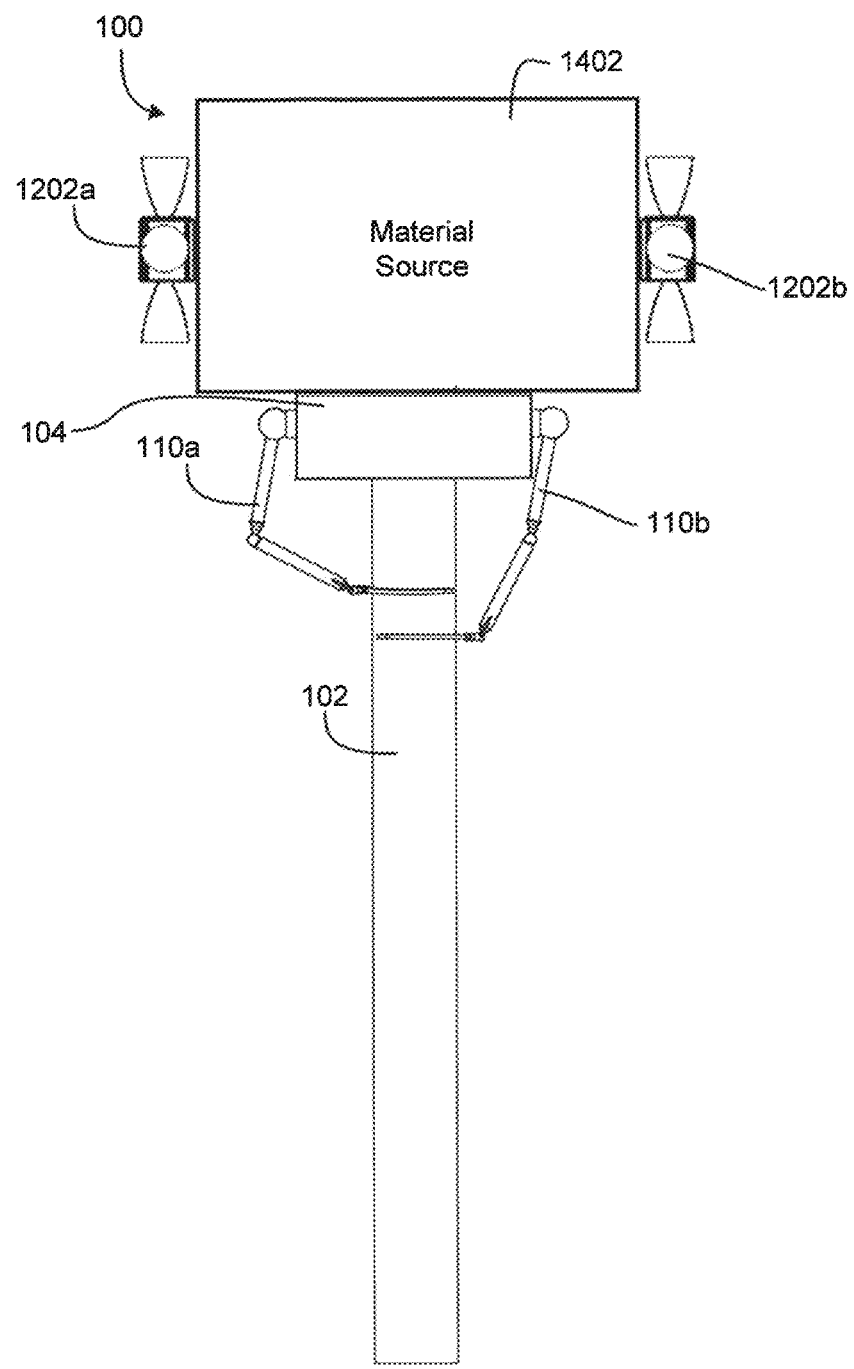
FIG. 14 is a side view of an extended structure additive manufacturing device comprising thrusters and grappling arms and depicting an exemplary material source, according to an aspect of the present disclosure.

Referring briefly now to FIG. 14, a side view of extended structure additive manufacturing device 100 comprising thrusters 1202, grappling arms 110 and a representative material or feedstock source 1402, according to an aspect of the present disclosure, is shown. Material source 1402 houses and/or produces feedstock. In some aspects, material source 1402 is integrated into device 100. In other aspects, material source 1402 is detachable, replaceable or refillable. In yet other aspects, material source 1402 is another device, vehicle, or body.

Figure 15:
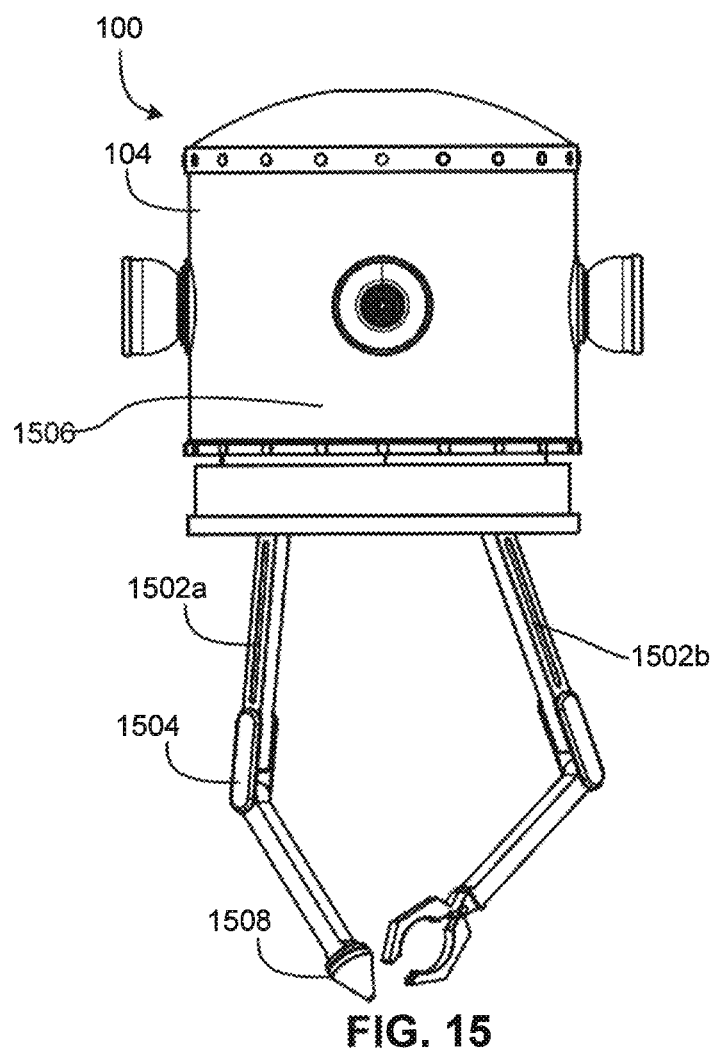
FIG. 15 is a perspective view of an extended structure additive manufacturing device having arms with fine and gross control elements, according to an aspect of the present disclosure.

Referring now to FIG. 15, a perspective view of extended structure additive manufacturing device 100 having arms 1502 with fine control elements and gross control elements, according to an aspect of the present disclosure, is shown.

In an aspect, movement mechanism 106 includes one or more combination arms 1502. Each combination arm 1502 has fine motors 1504 or other mechanisms or assemblies which allows small-scale movement (1 cm step size or less) of device 100. Each combination arm also includes gross motors (positioned within frame 104 in FIG. 15) or other mechanisms or assemblies which allow large-scale movement (e.g., 10 cm step size or more). Fine motor 1504 is a fine movement control device. Gross motor is a gross movement control device. Gross motor 1506 and/or other gross movement control devices may be high torque devices, capable of joining objects together or imparting significant force on an object or objects. Gross motor 1506 may also be used to push device 100 off a surface, providing propulsion.

In some aspects, device 100 may include additional additive manufacturing devices or portions thereof mounted on an arm 1502. For example, an arm-mounted extruder 1508 may be positioned on an end portion of arm 1502, thereby allowing structures or portions of structures to be created with extruder 1508. In some aspects, an entire additive manufacturing device may be mounted on the end of arm 1502 or, more generally, a portion of movement mechanism 106. In other aspects, only deposition or bonding portions of the additive manufacturing device are mounted on the end of arm 1502. In such cases, the deposition or bonding portion is operatively connected to a feedstock source and other portions necessary for the creation of structures. Arms 1502 may contain channels, pathways or other structures which connect extruder 1508, a print head or the like to a feedstock source housed within or connected to device 100. As will be apparent to those skilled in the relevant art(s) after reading the description herein, other constructing, repairing, inspection, and/or observation devices may be mounted on arms 1502.

Figure 16:
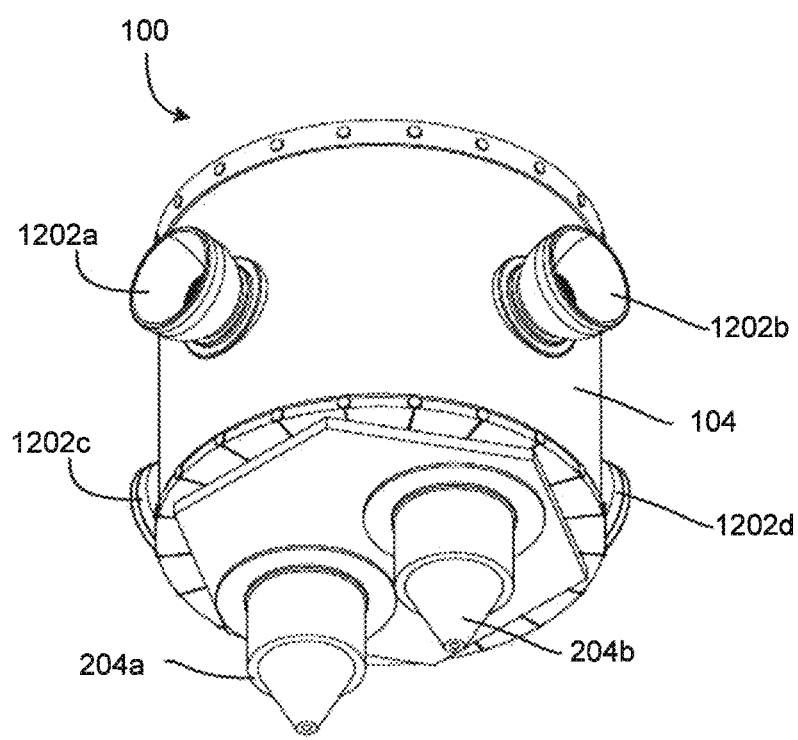
FIG. 16 is a perspective view of an extended structure additive manufacturing device having multiple material bonding components, according to an aspect of the present disclosure.

Referring now to FIG. 16, a perspective view of extended structure additive manufacturing device 100 having multiple material bonding components 204, according to an aspect of the present disclosure, is shown. Device 100 may include multiple material bonding components 204. Such bonding components 204 may be connected to frame 104, connected to the same or multiple traverses 206, connected to portions of movement mechanism. 106 connected for movement to manipulator arms, or have other connections apparent to those skilled in the relevant art(s) after reading the description herein. Material bonding components 204 may each bond different types of materials and/or bond material via different mechanisms (e.g., fused deposition modeling, welding, and the like). Device may include multiple movement devices including thrusters 1202, arms 1502 (not shown in FIG. 16), and the like. Bonding components 204 may create structures and portions thereof using the same materials or different types of materials.

Figure 17:
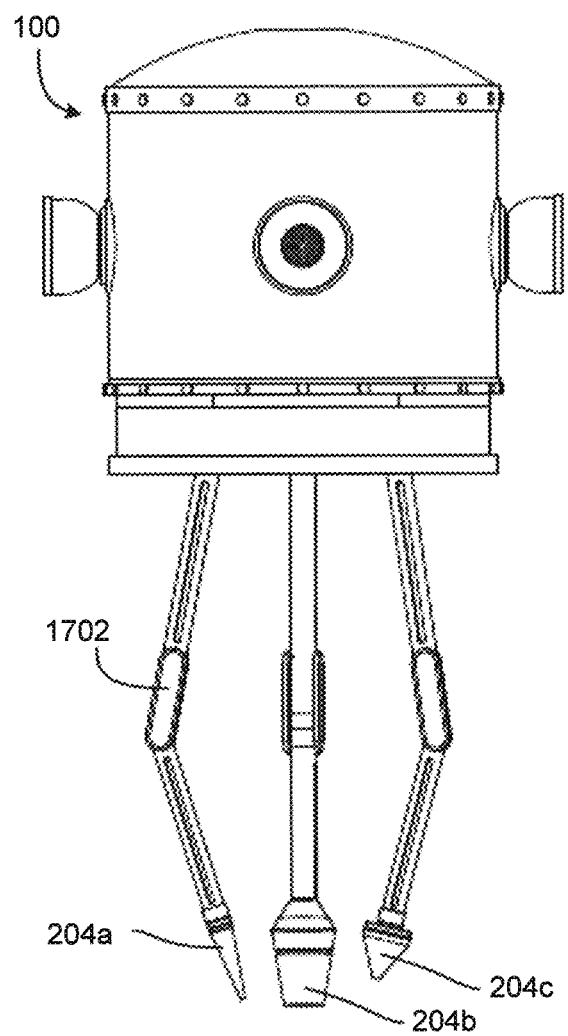
FIG. 17 is a side view of an extended structure additive manufacturing device having additional arms, each arm including an additional bonding component, according to an aspect of the present disclosure.

Referring now to FIG. 17, a perspective view of extended structure additive manufacturing device 100 having additional arms 1702, each arm including an additional bonding component 204, according to an aspect of the present disclosure, is shown. Device 100 may include multiple bonding components 204 configured for different materials, construction resolutions, and the like. For example, device 100 may include one bonding component 204a which produces high-resolution parts via extrusion of a thermoplastic and a second bonding component 204b which produces lower resolution parts via extrusion. In some aspects, arm 1702 comprise all or a portion of positioning system 206.

Figure 18:
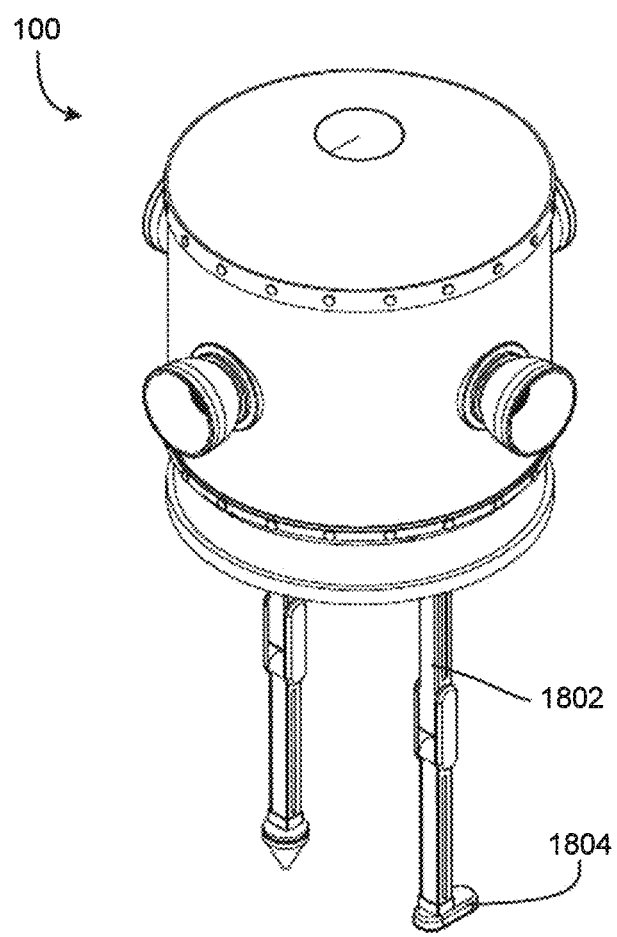
FIG. 18 is a perspective view of an extended structure additive manufacturing device having an articulating arm including a scanning device, according to an aspect of the present disclosure.

Referring now to FIG. 18, a perspective view of extended structure additive manufacturing device 100 having an articulating arm 1802 including an accessory 1804, namely a scanning device, according to an aspect of the present disclosure, is shown.

Device 100 may include one or more arms 1802 having accessories 1804. For example, accessory 1804 may be a scanner (as shown in FIG. 18), a camera, or other detection device. Accessory 1804 may also be a manipulator arm, claw or other device as shown in, for example, FIG. 15. As will be apparent to those skilled in the relevant art(s) after reading the description herein, accessory 1804 may be any mechanism which facilitates creating part 102, ensuring the quality of part 102, assists in joining part 102 to other objects, and the like.

Figure 19:
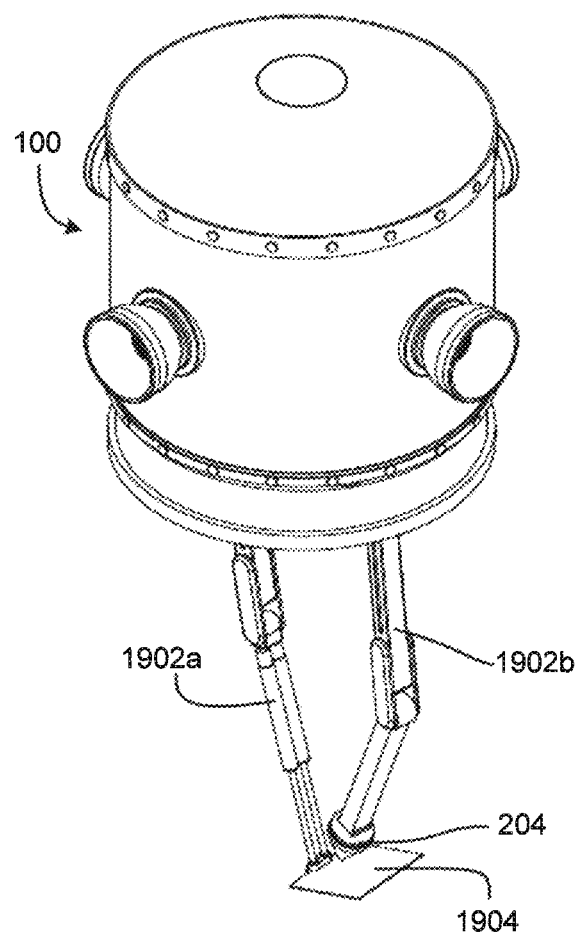
FIG. 19 is a perspective view of extended structure additive manufacturing device including a build tray, according to an aspect of the present disclosure.

Referring now to FIG. 19, a perspective view of extended structure additive manufacturing device 100 including a build tray 1904, according to an aspect of the present disclosure, is shown. Accessory 1804 may be build tray 1904, providing a surface for creating parts 102 and portions thereof.

Figure 20:
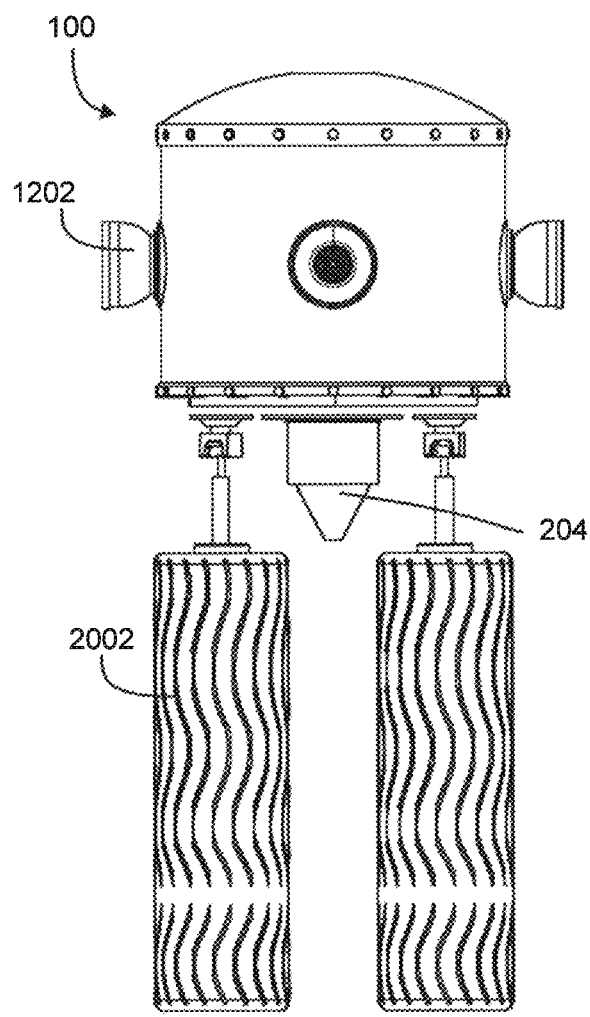
FIG. 20 is a side view of an extended structure additive manufacturing device having extended vertically oriented rollers, according to an aspect of the present disclosure.

Referring now to FIG. 20, a side view of extended structure additive manufacturing device 100 having extended vertically oriented rollers 2002, according to an aspect of the present disclosure, is shown. Roller 2002 facilitate movement of device 100 across structures including part 102 created by bonding component 204. Thrusters 1202 may be utilized to transit device 100 from one portion of part 102 to another or from one area to another.

Figure 21:
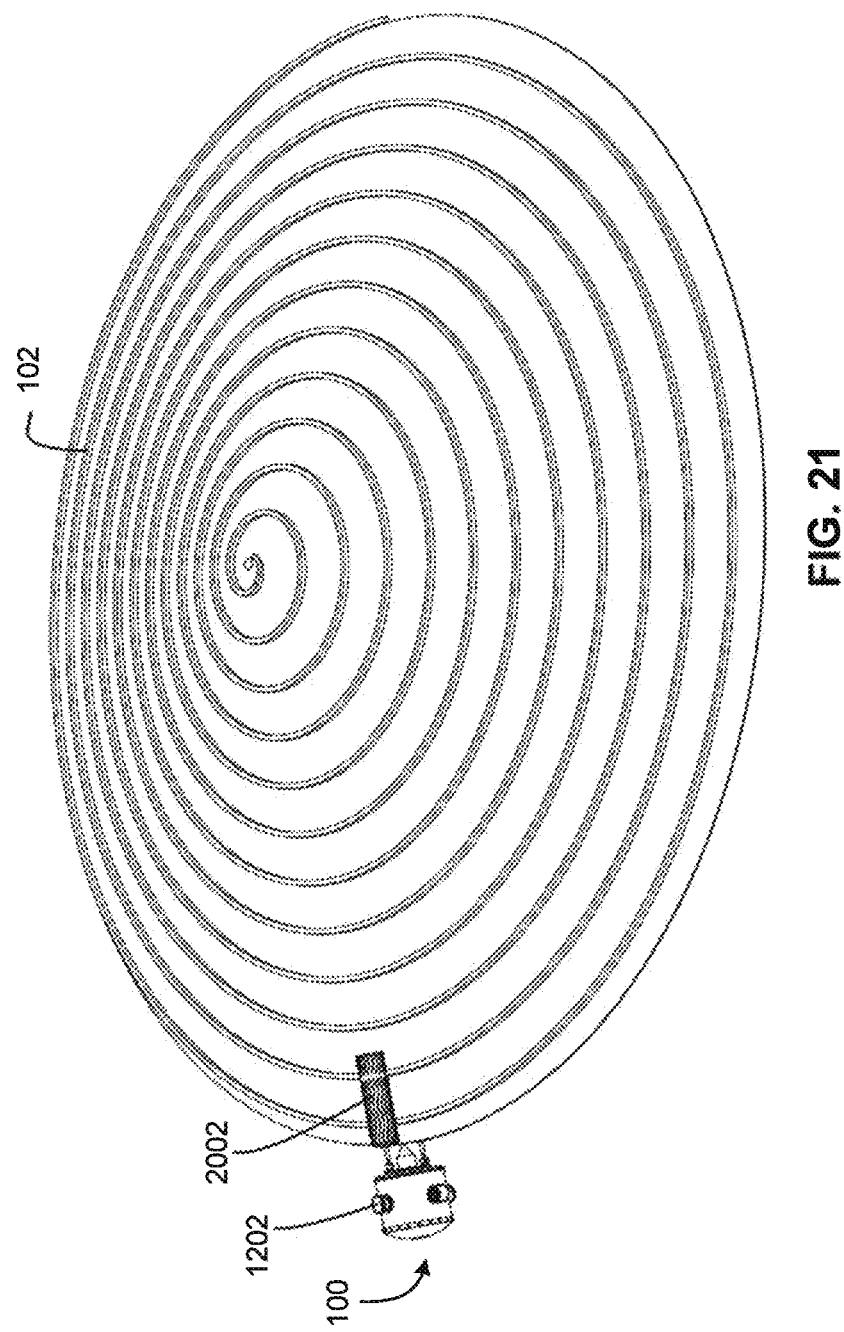
FIG. 21 is a perspective view of an extended structure additive manufacturing device creating a circular dish, according to an aspect of the present disclosure.
Figure 22:
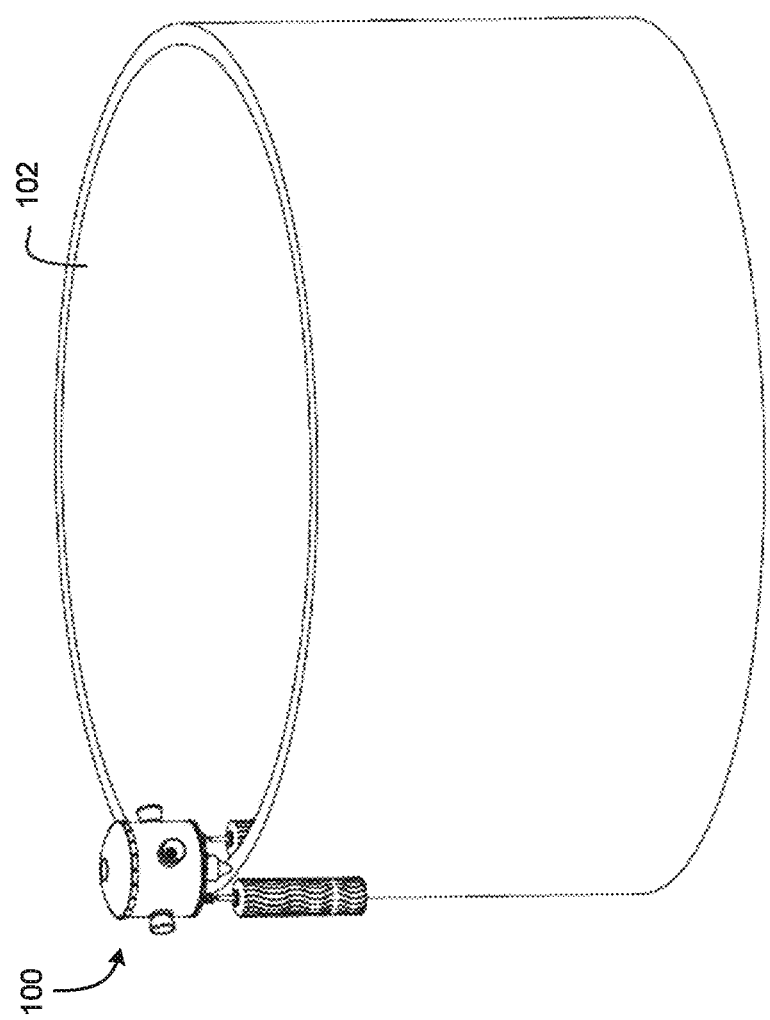
FIG. 22 is a perspective view of an extended structure additive manufacturing device creating a large cylinder, according to an aspect of the present disclosure.
Figure 23:
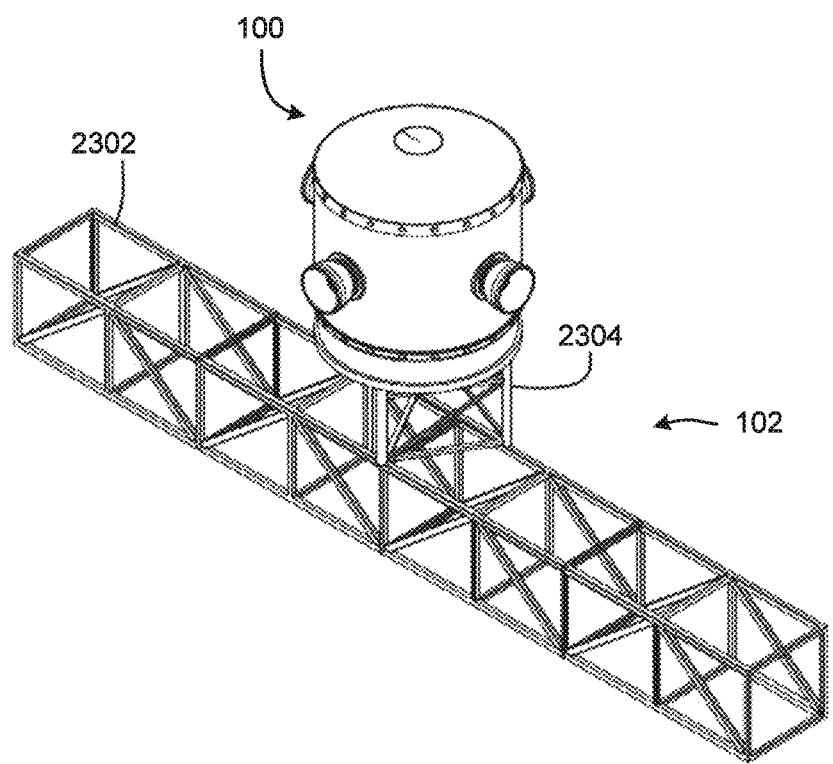
FIG. 23 is a perspective view of an extended structure additive manufacturing device creating a multi-truss structure, according to an aspect of the present disclosure.

Referring now to FIGS. 21-23, a perspective view of extended structure additive manufacturing device 100 creating non-linear structures 102, according to various aspects of the present disclosure, are shown.

Device 100 may create curved structures 102, such as a dish as shown in FIG. 21 or the large cylinder shown in FIG. 22. Various portions of movement mechanism 106 may be utilized to reorient device 100, enabling the creation of non-linear structures. For example, thrusters 1202 and rollers 2002 may be used to reorient and guide device 100 as structure is created. Movement mechanism 206 which positions bonding component 204 may also place bonding component 204 such that a complex structure may be created.

Device 100 may create a first portion of a structure 102, such as a first truss 2302 and then be reoriented and create additional portions of structure 102, such as a second truss 2304 connected to first truss 2302 and extending away from first truss 2302.

Figure 24:
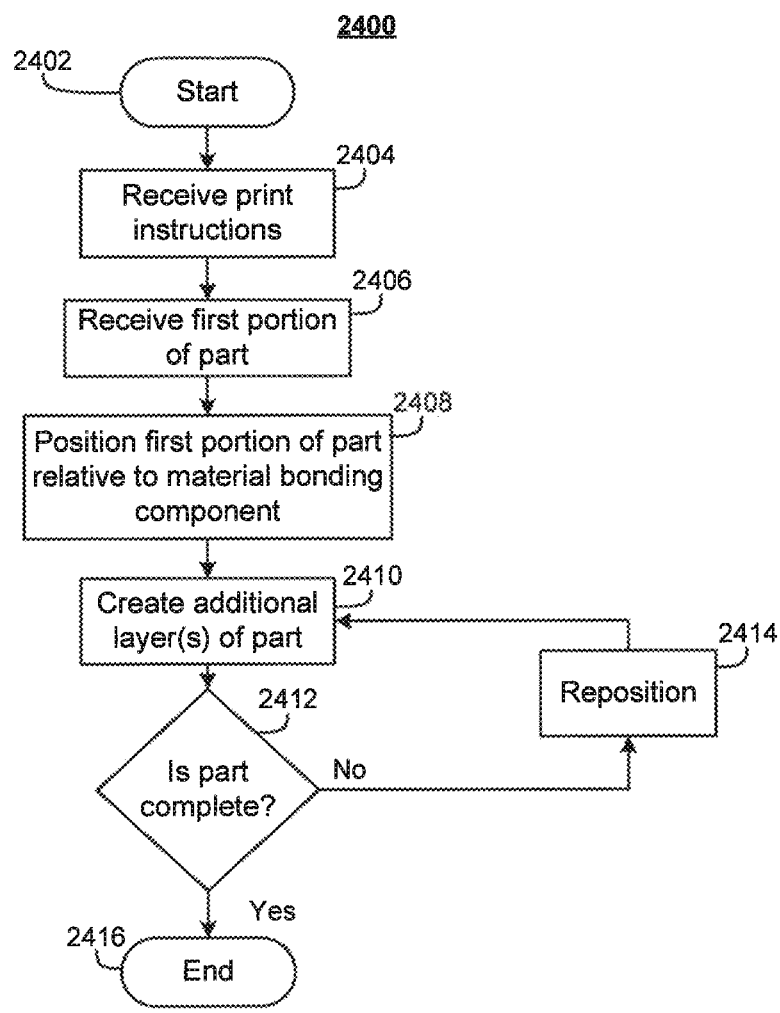
FIG. 24 is a flowchart illustrating an exemplary process for creating a part, namely an extended structure, using an extended structure additive manufacturing device, according to an aspect of the present disclosure.

Referring now to FIG. 24, a flowchart illustrating an exemplary process 2400 for creating part 102 using extended structure additive manufacturing device 100, according to an aspect of the present disclosure, is shown.

Process 2400 begins as step 2402 with control immediately passing to step 2404.

At step 2404, device 100 receives all or a portion of print instructions for part 102. In some aspects, control electronics adds guide topography 402 or other structures to part instructions in order to facilitate part 102 creation by device 100.

In various aspects, device 100 contains print instructions and step 2404 may be omitted.

At step 2406, a first portion of part 102 is received by device 100. The first portion may be produced by another additive manufacturing device, or supplied from another source (e.g., produced by other methods). The first portion serves as a based to create part 102. Other portion may be received and integrated into part 102 during the part creation process. For example, reinforcing rods may be periodically added.

In other aspects, the first portion has been previously created by device 100. For example, a first truss is provided. Process 2400 is utilized to create additional structure connected to the provided first truss.

At step 2408, the first portion of part 102 is positioned within device 100 in order to facilitate creation of part 102.

In various aspects, device 100 creates part 102 without utilizing a first portion provided by another source. Steps 2406 and 2408 may be omitted.

At step 2410, device 100 creates a portion of part 102 such as one or more layers. Where material bonding system 202 includes z-axis movement, multiple layers may be produced.

At step 2412, after device 100 can no longer produce layers of part 102 in the current position relative to part 102, it is determined if part 102 is complete. If part 102 is complete, step 2416 executes, ending process 2400. If part 102 is incomplete, moving mechanism 106 repositions device 100 and/or part 102 to enable creation of additional portions of part 102 by device 100.

In this manner, device 100 may create portions of part 102 as device 100 moves relative to the object or device 100 may create a portion, cease creation, reposition itself relative to part 102 and recommence creating portions of part 102. Device 100 may therefore form very long objects such as beams, pipes, and the like of essentially unlimited length.

FIG. 25A is a side view of an embodiment of an extended structure additive manufacturing (ESAMM) device 100' for manufacturing a spacecraft in space and FIG. 25B is a bottom view of the ESAMM device 100'. The ESAMM device 100' has a body or frame 2504 which is configured to fly in space while manufacturing using additive manufacturing techniques for a spacecraft (i.e., spacecraft 3800 of FIG. 38). The device 100' may include a plurality of robotic manipulators 2510 with end effectors 2512. The end effectors of each manipulator 2510 may be different or interchanged depending on the operation to be performed at each of the stages for spacecraft manufacturing and assembly.

The body or frame 2504 may include a main support bus 2530 having control systems for avionics, robotic manipulator control, power management and control, and other computing functions. The device 100' may include one or more computing devices (i.e., computing device 4150 for carrying out one or more functions described herein in detail.)

The device 100' may include solar panels 2505 integrated with or connected to the body or frame 2504 for powering the device 100' using solar energy from the sun. The body or frame 2504 include a surface 2504B to which manufactured parts are extruded through output port 2519. The output port 2519 may be in a center of the surface 2504B. The output port 2519 may have an axis which is aligned with a center axis of the body 2504. Surrounding the output port 2519 there may be at least one inspection system 2535. The inspection system 2535 may include X-ray detection, infrared imaging detection, ultrasound imaging, visual spectrum imaging or detection, or other inspection techniques for detecting the placement of a manufactured part, attachment of another part, integration of pre-fabricated component(s), robotic manipulator functions, the building process being carried out, and the like. The inspection system 2535 may include computer vision-enhanced processes for manufacturing and assembling parts of a spacecraft. In some embodiments, the inspection system 2535 may include a plurality of lenses optically connected to one or more imaging systems.

The body or frame 2504 is shown to have a generally octagonal configuration. Other shapes and configurations may be used. The body 2504 may include storage compartments for storing supplies for repairing the device 100' in space, prefabricated components for integration into a spacecraft or spacecraft system being built, or the like. The device 100' may include extra end effectors for interchanging end effectors depending on the manufacturing and assembly operation. The device 100' may include an ESAMM printer 2550 (within the body) for printing using additive manufacturing components such as three-dimensional (3D) components for creating structures to be assembled in space to form a spacecraft. The output of the printer 2550 being the output port 2519.

Figure 25:
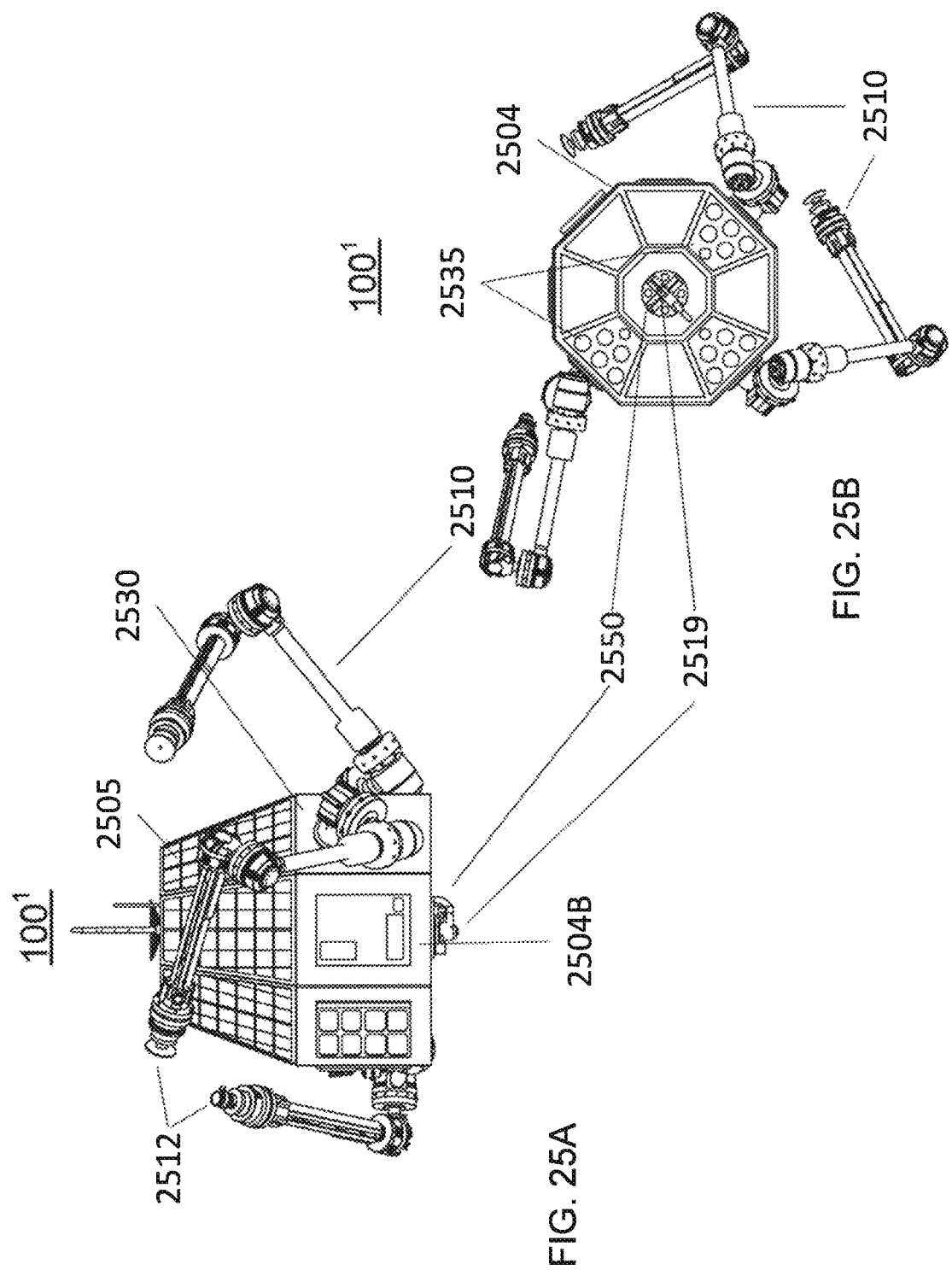
FIGS. 25A and 25B are views of an extended structure additive manufacturing device for manufacturing a spacecraft in space, according to an aspect of the present disclosure.
Figure 26:
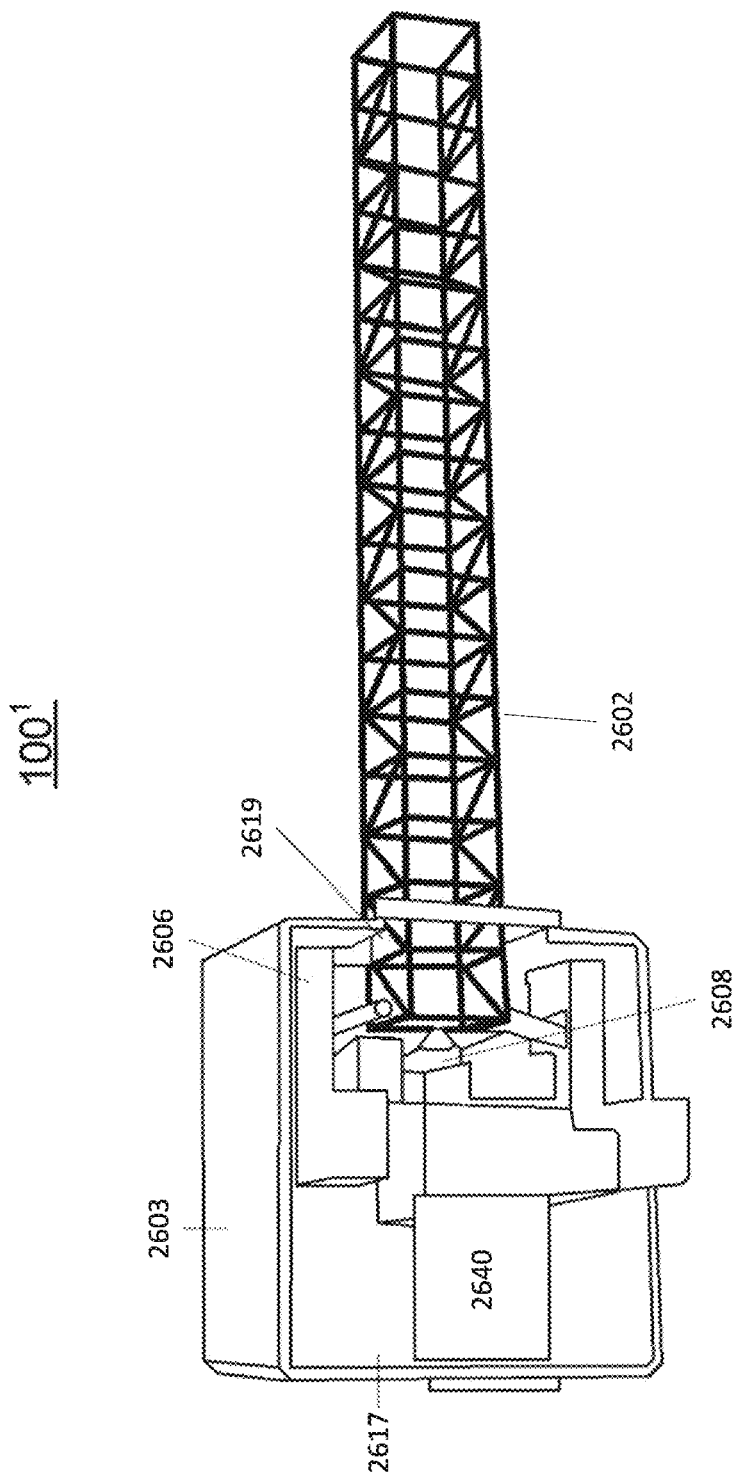
FIG. 26 is a partial view of an extended structure additive manufacturing device producing an extended part, according to an aspect of the present disclosure.

FIG. 26 is a partial view of an embodiment of an extended structure additive manufacturing device 100" producing an extended part 2602. The device 100" may include avionics 2640 which may include a computing device (i.e., computing device 4150 of FIG. 41) for controlling the orbit and flight of the device 100" and/or the functionality of components of device 100". The avionic 2640 may include the operation of and movement of the robotic manipulators, as shown in FIG. 25. The device 100" may include an extruder 2608 and a traverse system 2606 (i.e., a positioning system). The device 100" may further include a thermal control zone 2603 to control the environment around the additive manufacturing process in the extreme environment of space. By way of a non-limiting example, the part 2602 may be formed within the interior housing 2617 of the device 100' and extruded through the output port 2619 of the device 100". The part 2602 may include a complex structure such as a lattice, truss or other elongated structure.

FIGS. 27A-27D illustrate views of a printed structure 2705, the structure grabbed, locked in position and a close up of the locked position, according to aspects of the present disclosure. In FIG. 27A, a pre-fabricated part 2705 is provided. The pre-fabricated part may be printed by a device 100' or is pre-fabricated by another manufacturing technique. The pre-fabricated party 2705 is to be placed or attached to another part or structure 2703. This other structure 2703 may be a printed structure. The part 2705 is insulated with foil material. In FIG. 27B, the part is grabbed by the end effector 2710. The part is coupled via end effector 2710 which may grab the part, move the part and hold the part. The part 2705 is locked into position in FIG. 27C wherein an opposite side 2707 of the part is shown. A fastener 2709 is shown in FIG. 27D. The fastener 2709 may be manufactured by device 100' prior to installation shown in FIG. 27D. A connecting structure may be manufactured by the ESAMM, providing structure and arrangement to mount pre-fabricated parts 2705, such as solar arrays. The manufactured connecting structure includes connecting features which are designed to receive fastener 2709. Connecting features may be designed to reversibly connect with fastener 2709.

FIG. 28A-28E are perspective views of embodiments of connectable printed structures, being fitted together. In FIG. 28A, an end effector 2812 is a claw or gripper. The end effector 2812 is shown clamping a first part 2802A. In FIG. 2813, the first part 2802A is being removed and moved. In FIG. 28C, the first part 2802A is moved toward the second part 2802B by the robotic manipulator with end effector 2812. In FIG. 28I), the first part 2802A and second part 2802B are snapped or coupled together by the robotic manipulator. In FIG. 28E, the first part 2802A is released by the robotic manipulator after the first part 2802A is coupled or fastened to the second part 2802B.

Figure 29A:
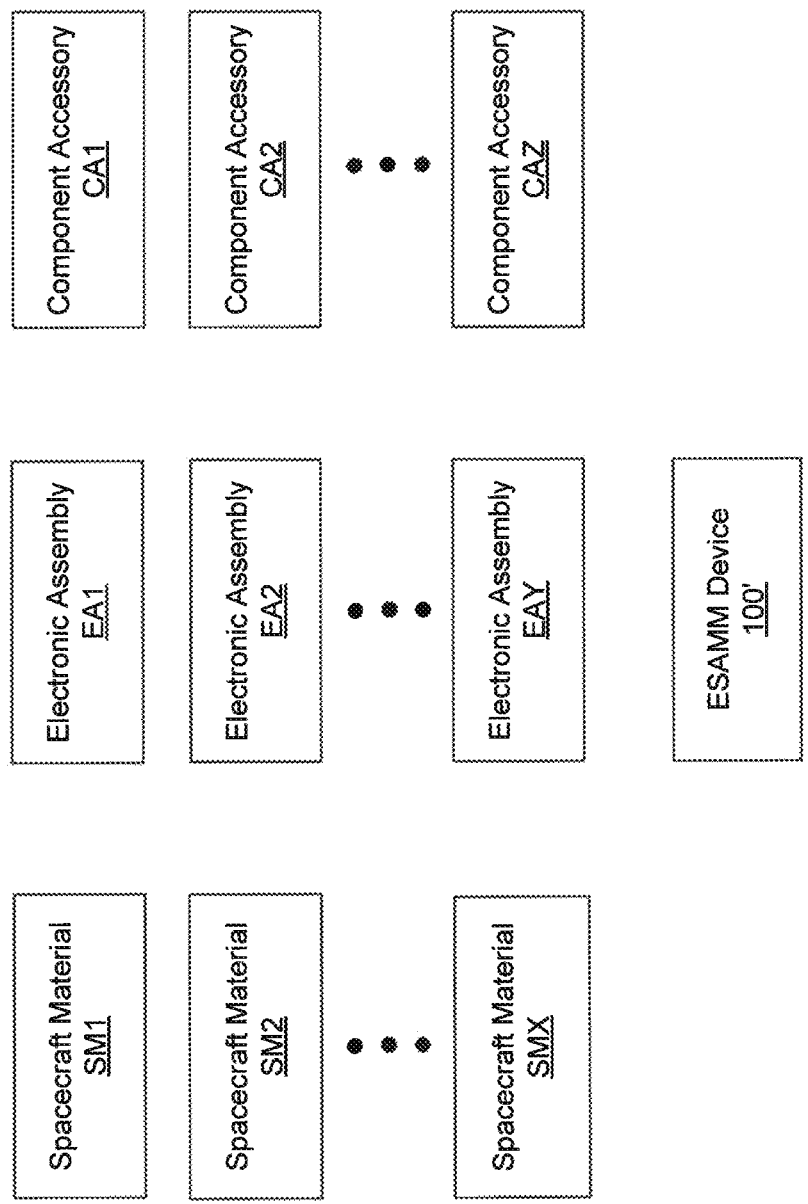
FIG. 29A is a block diagram of a spacecraft kit, according to an aspect of the present disclosure.

FIG. 29A is a block diagram of a spacecraft kit 2900A, according to an aspect of the present disclosure. The spacecraft kit 2900A may include at least one electronic assembly EA1, EA2, . . . EAY and at least one spacecraft material SM1, SM2, . . . SMX for manufacturing component parts in space using additive manufacturing techniques. The spacecraft kit 2900A may include at least one component accessory CA1, CA2, . . . CAZ. The plurality of electronic assemblies EA1, EA2, . . . EAY may include at least one computing device (i.e., computing device 4150 of FIG. 41). It should be recognized that in practical applications, the spacecraft kit 2900A may include many other components and features that have not been expressly illustrated in FIG. 29A, which are not included herein for sake of brevity.

The computing device (i.e., computing device 4150 of FIG. 39) may be pre-programmed with programs or software to control various operations of a functioning spacecraft. In an embodiment, the computing device is programmed prior to leaving earth or remotely from earth. The at least one electronic assemblies, assembly EA1, EA2, . . . EAY may include at least one electronic assembly to control an orbit of a spacecraft and to stabilize the spacecraft in space during flight. The at least one electronic assemblies, assembly EA1, EA2, . . . EAY, may include power management and control modules.

The at least one electronic assembly EA1, EA2, . . . EAY may include electronic assemblies for performing surveillance imaging. By way of non-limiting example, at least one electronic assembly EA1, EA2, . . . EAY may include an imaging sensor array system.

The at least one electronic assembly EA1, EA2, . . . EAY may include at least one communications system (i.e., communication system 3320 of FIG. 33) for transmitting and/or receiving communications. In an embodiment, the communications system may include systems for repeating communications from one satellite to another. Communication may include video communications, satellite/cellular communications, global positioning system coordinate communications, data communications, etc.

The at least one electronic assembly EA1, EA2, . . . EAY may include one or more weather detection modules for detecting and reporting weather conditions.

Figure 33:
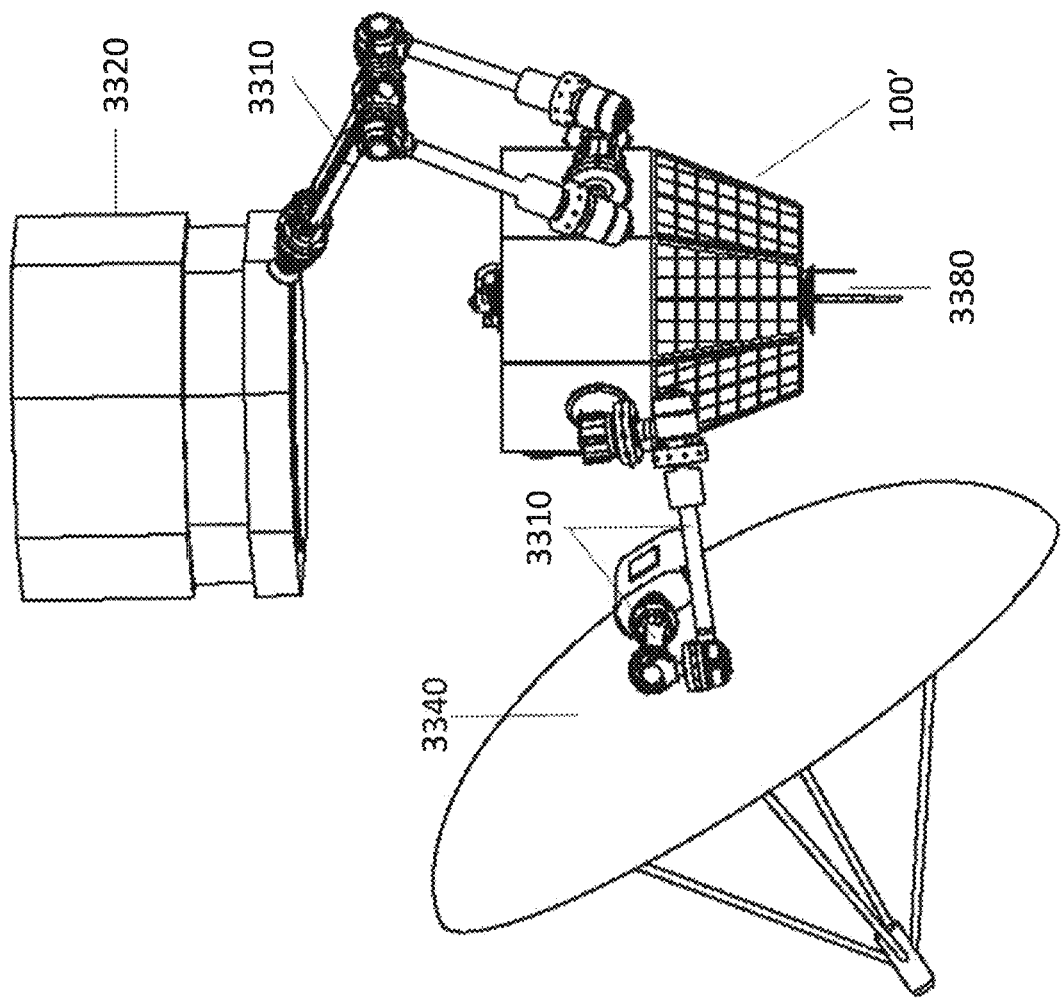
FIG. 33 is yet another view of an extended structure additive manufacturing device assembling/manufacturing parts for a spacecraft in space, according to aspects of the present disclosure.

The spacecraft kit 2900A may include materials (i.e., spacecraft material SM1, SM2, . . . SMX) for creating in space at least one antenna 3340 using additive manufacturing for use in communications. The antenna 3340 once formed is electrically coupled to at least one electronic assembly (i.e., communications system 3320). By way of a non-limiting example, the at least one antenna 3340 may include a parabolic antenna as shown in FIG. 33. However, parabolic antennas can have a parabolic reflector of various forms and not limited to a circular dish configuration. The antenna 3340 may be constructed of metal to form a metal antenna or other materials for antenna configured to space installation and operation. The antenna may be a metal sheet type parabolic antenna or metal grid parabolic antennas.

The at least one component accessory CA1, CA2, . . . CAZ may include solar panels (i.e., solar panels 3115 of FIG. 31), power storage devices or storage batteries, and other components necessary for the assembly and/or operation of the spacecraft (i.e., spacecraft 3800 in FIG. 38). In an embodiment, structures (i.e., structure 3123 of FIG. 31) may be made using additive manufacturing for creating the satellite arms. The solar panels are coupled to the satellite arms and electrically connected to the power storage devices for powering the spacecraft in space. The kit 2900A may include an ESAMM device 100'. In some instances, the kit 2900A may omit an ESAMM device 100'. The ESAMM device 100' may be substituted with device 100 or other variations described herein.

Figure 29B:
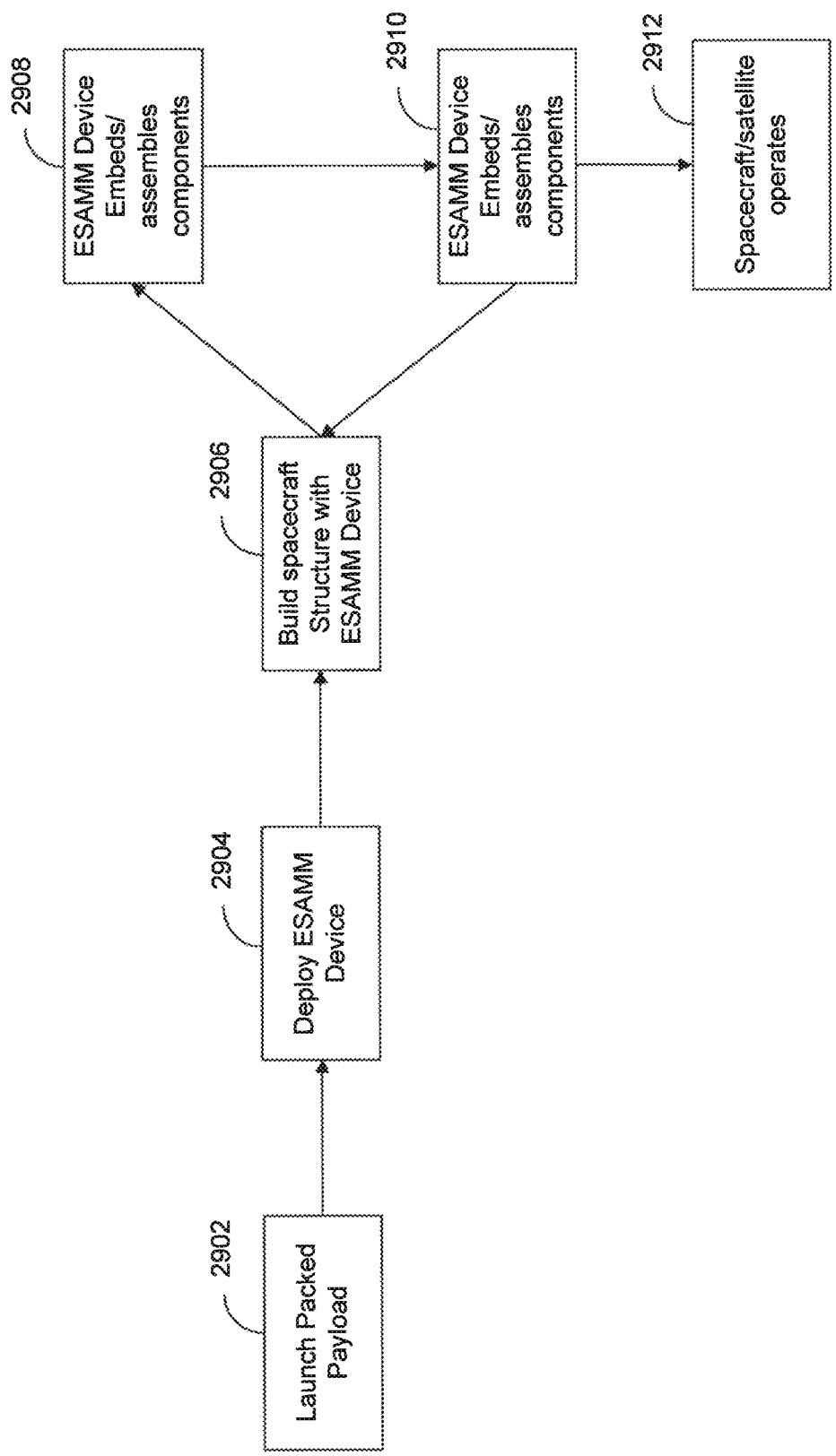
FIG. 29B is a flowchart of a process for manufacturing a spacecraft or satellite in space, according to aspects of the present disclosure.

FIG. 29B is a flowchart showing an embodiment of a process 2900B for manufacturing a spacecraft or satellite in space. At block 2902 of the process 2900B, a packed payload with the spacecraft kit 2900A is launched. At block 2904, the ESAMM device 100' is deployed. At block 2906, the ESAMM device 100'. At block 2908, the ESAMM device 100' may assemble at least one resultant system, the at least one resultant system may include a manufactured part assembled with at least one of a component accessory and an electronic assembly. When the manufactured part is assembled, the manufactured part may be coupled mechanically, electrically, or using a combination of mechanical and electrical couplings. At block 2910, the ESAMM device 100' inspects the resultant system. Block 2910 may loop back to block 2906 for the next structure to be made such that blocks 2906, 2908 and 2910 are repeated for each resultant system that needs to be manufactured and/or assembled in space to complete the spacecraft. In some instances, accessories are integrated into manufactured parts or assembled system. In some instances, parts, accessories and electronic assemblies are coupled together or integrated according to a schematic or plan. At block 2912, after the components, structures and resultant systems are manufactured and assembled, the spacecraft is placed into operation in space.

Figure 30A:
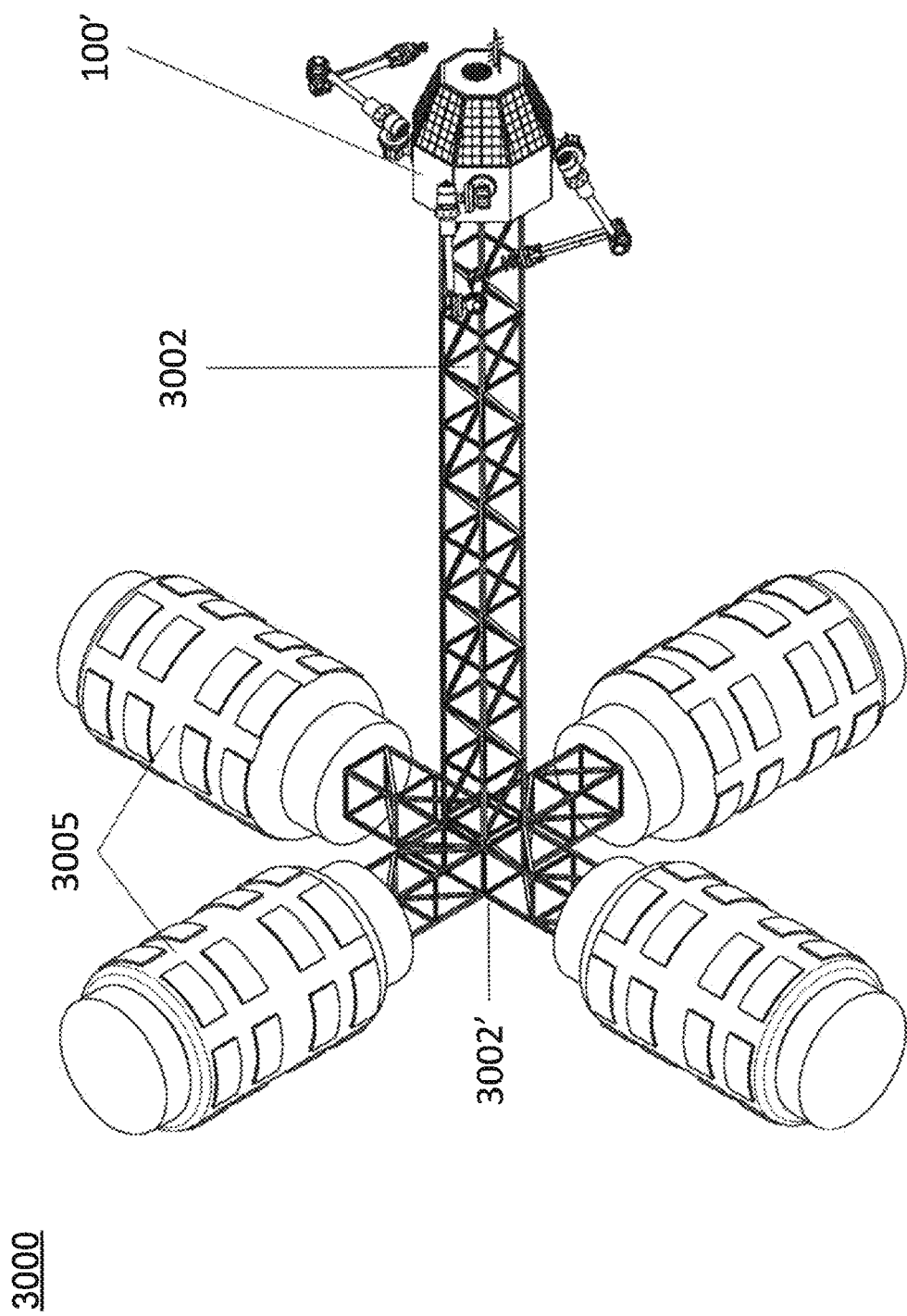
FIGS. 30A and 30B are views of a spacecraft being assembled, according to aspects of the present disclosure.
Figure 30B:
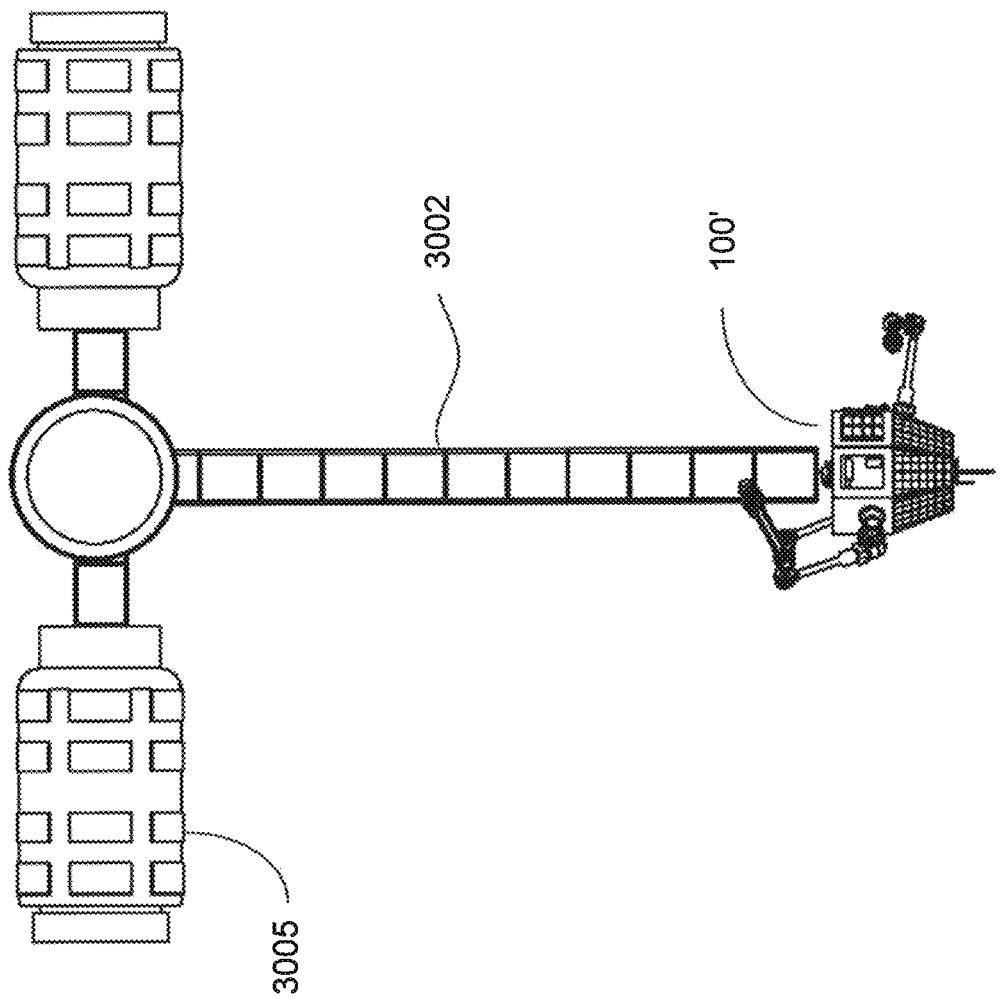

FIG. 30A is a perspective view of an embodiment of a spacecraft 3000 being assembled and FIG. 30B is a side view. The ESAMM device 100' may build an extended structure 3002' which has a lattice or truss configuration and a second extended structure 3002 which extends away from the hub of the spacecraft 3000. The lattice or truss configuration has four arms having a center hub. Each arm has coupled thereto a spacecraft housing 3005. The spacecraft housing 3005 may be part of the kit such that the housing 3005 are pre-fabricated on earth. In an alternate embodiment, the spacecraft housings 3005 may be manufactured in space using additive manufacturing. In yet another embodiment, the spacecraft housings 3005 are repurposed spacecraft launched by a third party.

Figure 31:
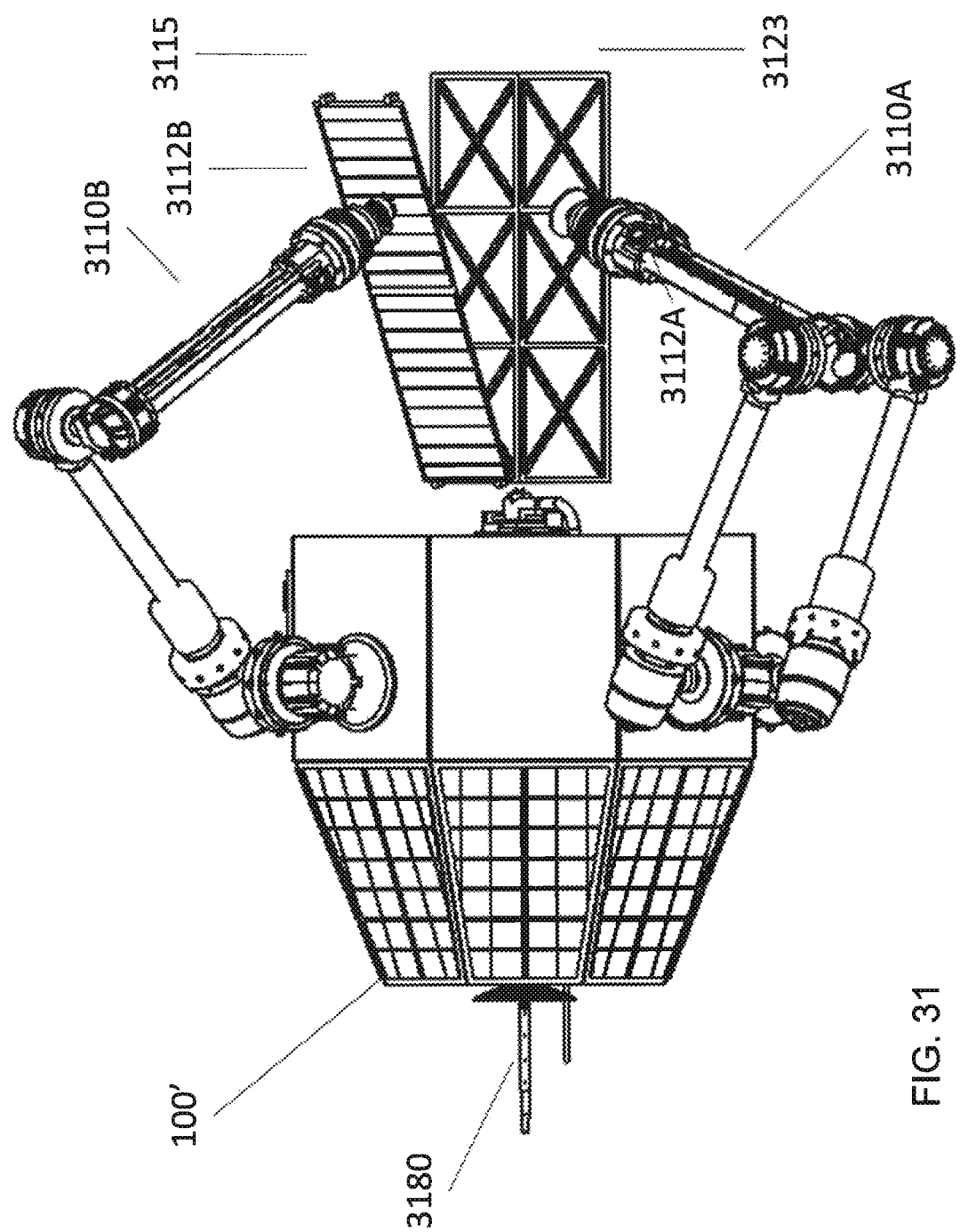
FIG. 31 is a view of an extended structure additive manufacturing device assembling parts for a spacecraft in space, according to aspects of the present disclosure.

FIG. 31 is a view of an embodiment of an extended structure additive manufacturing device 100' assembling parts for a spacecraft in space. The spacecraft (i.e., spacecraft 3800) may need solar panels 3115 for powering the spacecraft. The solar panels 3115 may need to be attached to structure 3123 of the spacecraft such as, but not limited to, with spacecraft arms. Here, the device 100' is shown with a first end effector 3112A at the end of the robotic manipulator 3110A for holding the truss framework of the structure 3123. The end effector 3112B is on a different robotic manipulator 311013. The device 100' holds and installs the solar panel 3115 onto the structure 3123.

The device 100' may also connect the solar panel 3115 to a power storage devices or storage batteries, and other components necessary for the assembly and/or operation of the spacecraft (i.e., spacecraft 3800 in FIG. 38).

The device 100' may also include communications system 3180 coupled to the body or frame of device 100'. The communications system 3180 may allow the device 100' to be remotely controlled for modifying the one or more manufacturing processes or operations. The communication system 3180 may allow the device 100' to be reprogrammed and/or reconfigured for continued use in space. The device 100' may be programmed with other schematics for other spacecraft.

By way of a non-limiting example, the antenna of the communication system 3180 may be manufactured in space.

Figure 32:
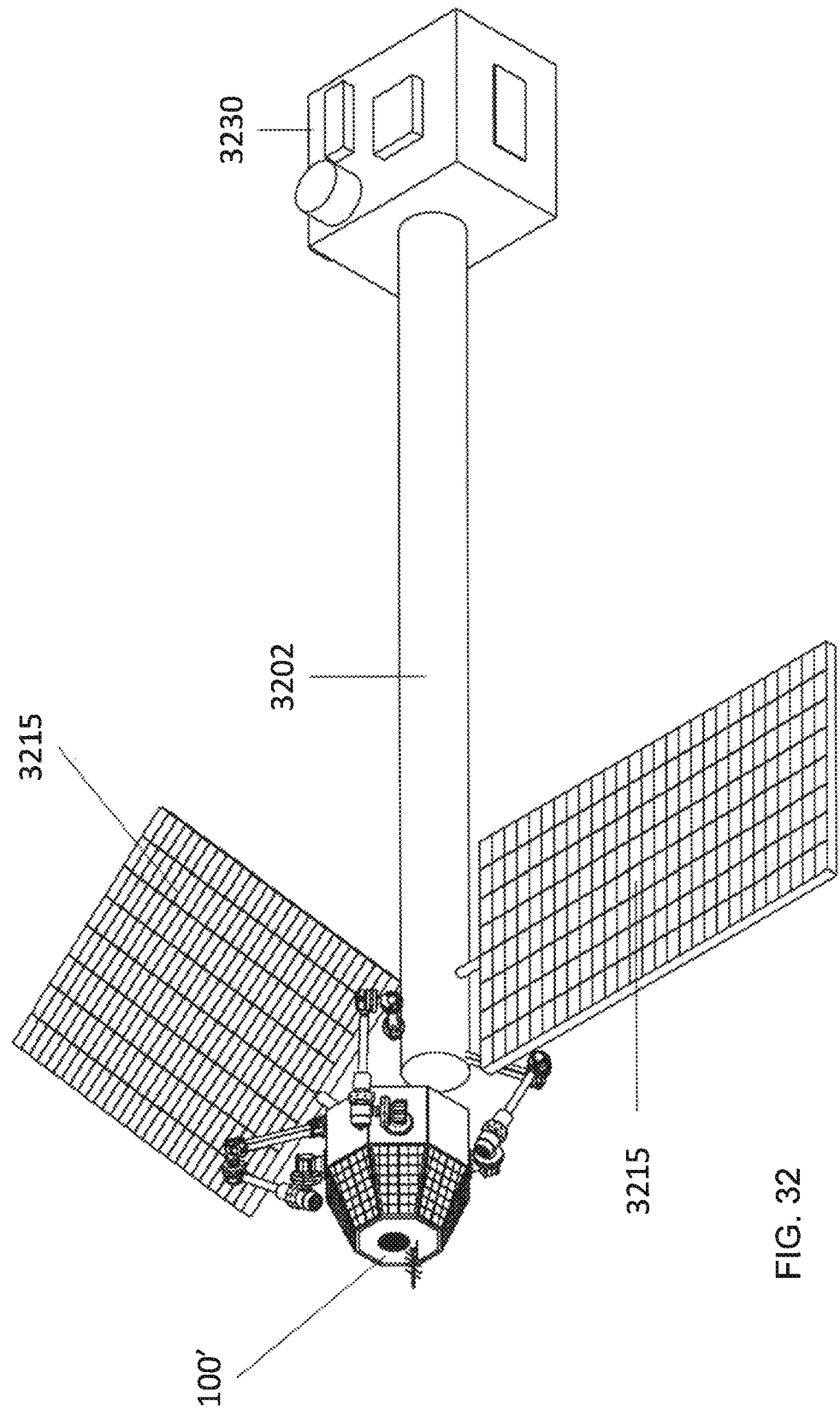
FIG. 32 is another view of an extended structure additive manufacturing device assembling/manufacturing parts for a spacecraft in space, according to aspects of the present disclosure.

FIG. 32 is another view of an embodiment of an extended structure additive manufacturing device 100' assembling/manufacturing parts for a spacecraft in space. The device 100' is shown holding an extended structural part 3202 which has a generally cylindrical structure configuration. One end of the structural part 3202 is shown coupled to a robotic manipulator. The other end of the structural part 3202 is attached to an electronic assembly and/or component accessory for the spacecraft. As a non-limiting example, the solar panels 3215 may be coupled to a power management and control unit 3230 which when coupled mechanically, electrically or using a combination of mechanical and electrical couplings, a resultant system would serve to manage the power of the spacecraft.

The plurality of robotic manipulators allows the device 100' to handle multiple structures and components simultaneously so that a resultant system may be configured and formed.

FIG. 33 is yet another view of an embodiment of an extended structure additive manufacturing device 100' assembling/manufacturing parts for a spacecraft in space. The at least one electronic assembly EA1, EA2, . . . EAY (FIG. 29) may include at least one communications system (i.e., communication system 3320 for transmitting and/or receiving communications signals. In an embodiment, the communications system 3320 is shown being supported and carried by one of the robotic manipulators 3310. The device 100' may include a communications system 3380 as well. The device 100' is shown holding antenna 3340 using another robotic manipulator 3310. The antenna 3340 may be manufactured in space using additive manufacturing. The antenna 3340 once formed is electrically coupled to at least one electronic assembly (i.e., communications system 3320'. Another robotic manipulator 3310 may be used to electrically connect communications system 3320 and antenna 3340 together.

FIG. 34A is perspective view of an embodiment of a part 3402 manufactured in space and FIG. 34B is a side view of the part 3402 manufactured in space. Another embodiment of the device 100" is shown. The part 3402 is shown being held by a material bonding component positioning system 3406 associated with the extruder 3408. The material bonding component positioning system 3406 and the extruder 3408 may be supported by a frame 3404A.

The extruder 3408 is part of a printer of another production device 2550. The material may be in cartridge form that may be swapped, refilled, and/or replaced. Cartridges may be robotically inserted through direct placement or rendezvous and docking such as that performed through common berthing mechanisms and feedstock fed through a common connector. As a non-limiting example, the production device 2550 can be interchanged with another production device specific for another type of material or another extruder. In another non-limiting example, the device 100" may function as a standalone space vehicle, but for some construction needs, another spacecraft may dock with the device 100" and material may be fed through a berthing mechanism directly to the production device 2550 or the cartridge may be swapped, refilled or replaced.

FIG. 34C is another embodiment of the part 3402 manufactured in space from a perspective view and FIG. 34D is a side view. The part 3402 is shown being held by a material bonding component positioning system 3406 associated with the extruder 3408. The material bonding component position system 3406 comprises grippers 3411. In FIGS. 34A and 34B only two grippers 3411 are shown as part of the material bonding component positioning system 3406. With FIGS. 34C and 34D, a third gripper 3411 is shown. The third gripper 3411 is provided for additional stabilization. Though three grippers are shown, additional grippers may also be used. Thus, the grippers may clamp or hold the structure 3402 while the other arms are used to "climb." The grippers 3411 may also be used as additional structural support once the structure build is completed.

The grippers 3411 can also be heated or cooled to function as either heat sinks or cold sinks. As such, a radiator may be thermally coupled at least one gripper. The grippers may also be used to dissipate electrical charges that may build up in the structure or the grippers. Due to the nature of the manufacturing environment, temperature may be a factor in producing the part 3402 as determined by material being used and environment where the build is occurring. As a non-limiting example, if the part being constructed is made out of metal, in space, the metal would be a good conductor of heat. The grippers 3411 closest to the extruder 3408 could be heated to ensure that the metal closest to the extruder is at an appropriate temperature whereas the grippers further away could be at a colder temperature to minimize heating producing a gradient in the part. From an electrical perspective, if the part is plastic, an electrical potential builds up over time in which a cloud of static electricity builds up. At least one gripper 3411 may provide an electrical path to dissipate these electrical charges. Thus, the grippers may be used to insulate electrical components, such as those on the device 100' or a spacecraft to which the part 3402 is attached to. By using as either a heat or cold sink, the grippers may also be used to prevent the part 3402 from shearing or cracking either during manufacture or after manufacture due to the manufacturing process.

Figure 35:
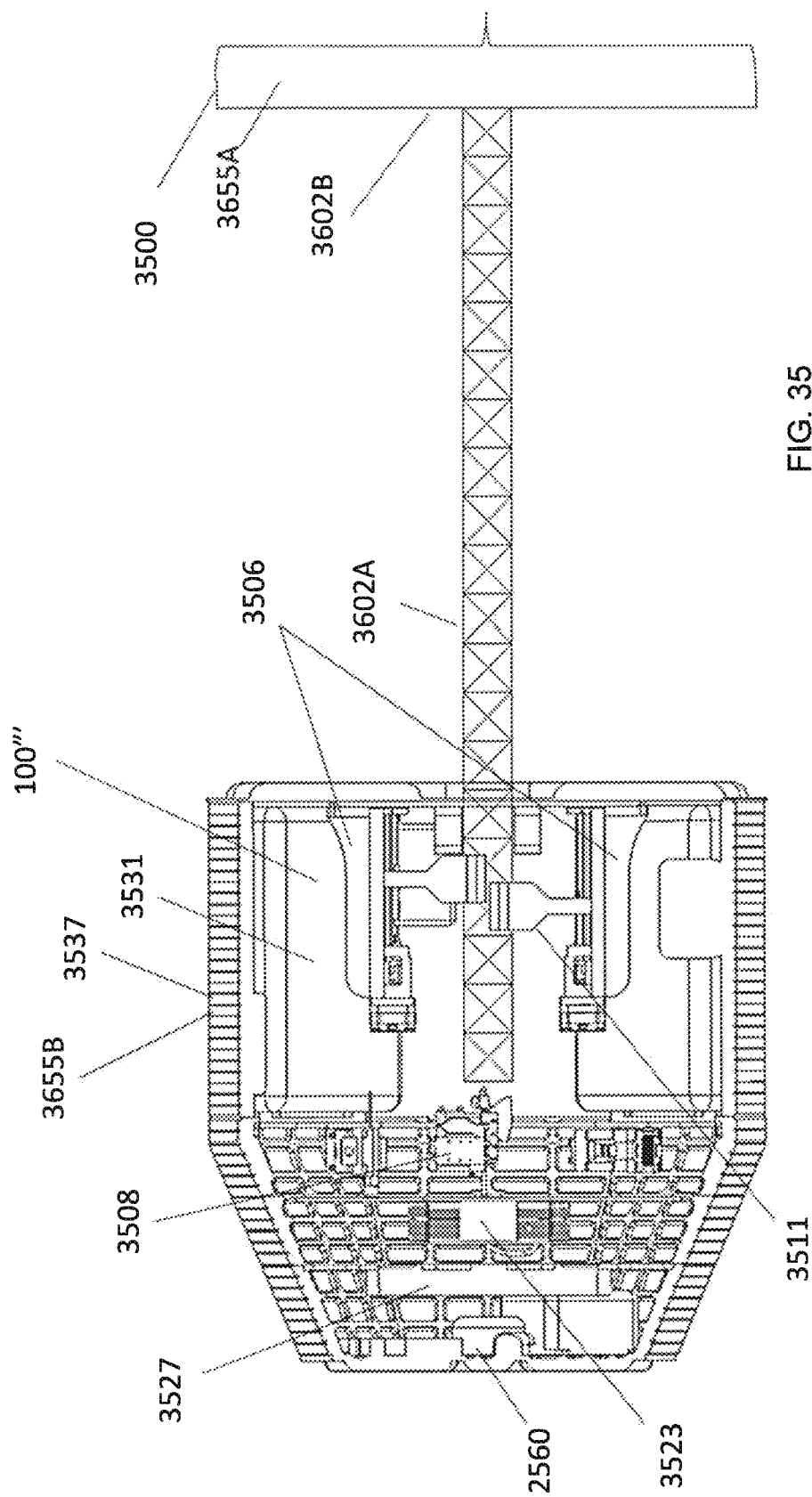
FIG. 35 is yet another view of an extended structure additive manufacturing device assembling/manufacturing parts for a spacecraft in space, according to aspects of the present disclosure.

FIG. 35 is yet another view of an embodiment of an extended structure additive manufacturing device 100''' assembling/manufacturing parts for a spacecraft in space. The device 100''' is similar to ESAMM device shown without the robotic manipulators. However, robotic manipulators, or grippers 3411 are provide with device 100'''. The grippers 3411 are a part of the z-axis traversing mechanism, or a z-traverse system 3506. The extruder 3508 is within the device 100'''. Also shown are avionics 2560 on the device 100''', feedstock material 3523, and a traverse dampening mechanism 3527. An energy storage system 3531 or device and photovoltaics 3537 are also shown. In FIG. 35, the part 3602A is shown with a spacecraft body 3655A at a distant end from the part and device 100''' which may have been manufactured in accordance with the processed described herein for additive manufacturing. Though not shown, the spacecraft 3500 may have installed a communications system with antenna 3540. Though not shown, the spacecraft 3500 may include solar panels 3515 coupled to solar panel arms 3527.

As further shown, the grippers 3511, are shielded within a body of the device 100'''. Being within may assist the grips when used as either a heat sink and/or a cold sink as disclosed herein.

Once the spacecraft 3500 is released and made operational, the device 100''' may be released or separated from the spacecraft 3500. In an embodiment, the device 100''' may include functional elements (e.g., feedhorns, sensors, solar arrays) which work with components on other portions of spacecraft 3500, creating a functioning unit.

Figure 36:
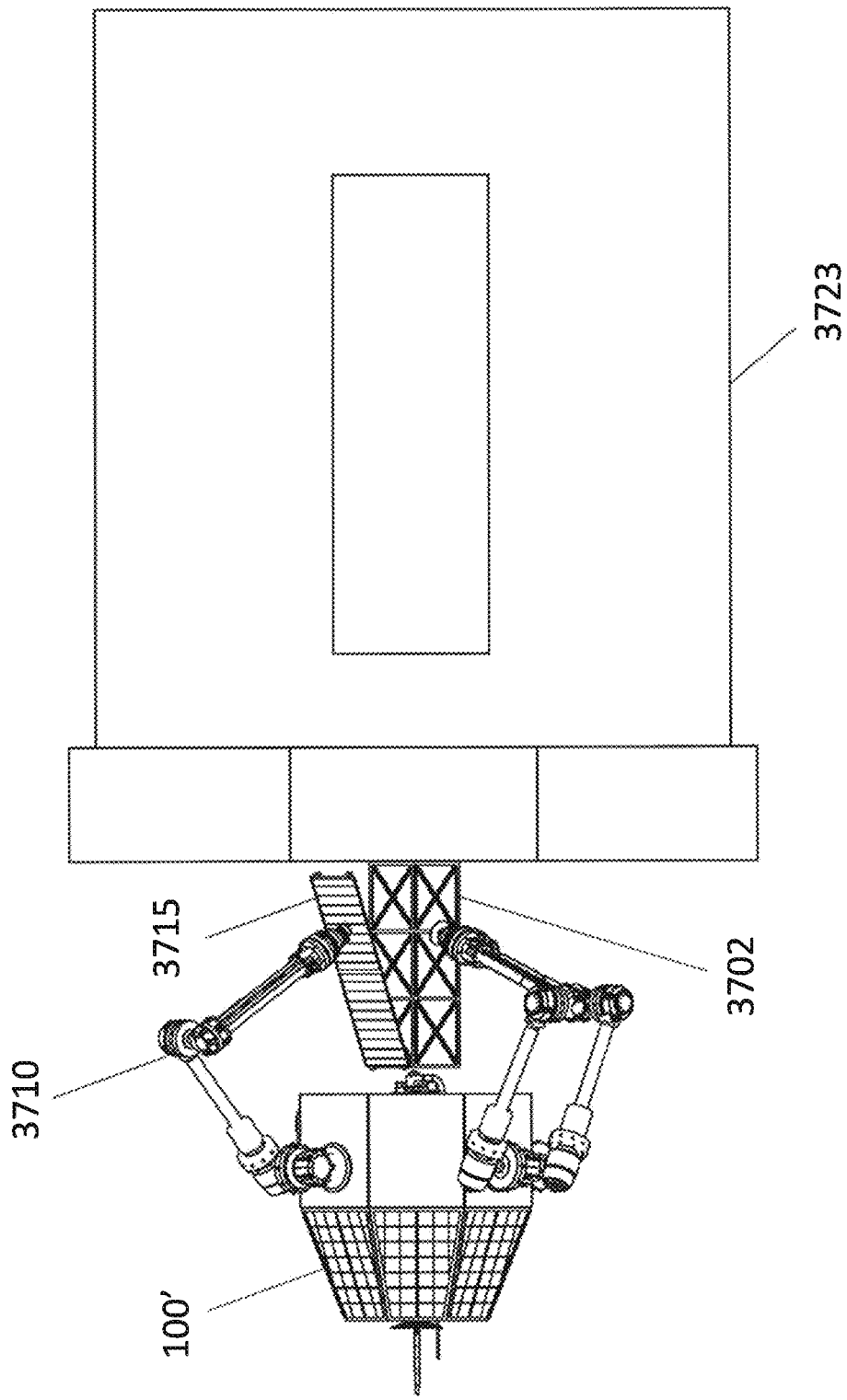
FIG. 36 is yet another view of an extended structure additive manufacturing device assembling/manufacturing parts for a spacecraft in space, according to aspects of the present disclosure.

FIG. 36 is yet another view of an embodiment of an extended structure additive manufacturing device assembling/manufacturing parts for a spacecraft in space. The device 100' is shown with a spacecraft body 3723 fully assembled/manufactured. However, the component accessories such as solar panels 3715 are not installed. In the illustration, the spacecraft body 3723 is shown attached to the in-space manufactured extended part 3702. The extended part 3702 is extruded to a length which allows at least one robotic manipulator 3710 (the manipulator holding solar panels 3715) to reach connection points on the spacecraft body 3723 such as to install the solar panels with arms.

In an embodiment, the device 100' may include at least one robotic manipulator 3710 for holding the solar panels and at least one robotic manipulator 3710 for performing intricate mechanical and/or electrical connections of the solar panels to arms or body of the spacecraft.

In an embodiment, there may be four robotic manipulators 3710, two for holding the solar panels and two for performing installation activities. In other embodiments, there may be one three robotic manipulators 3710, two for holding the solar panels and one for performing installation activities. In some embodiments, the part 3702 coupled to the device 100' may be rotated or moved in relation to device 100' to orient structures (i.e., spacecraft body 3723) attached to the part in proximity to a robotic manipulator for performing intricate installation activities such as mechanical fastening or electrical connections.

In some embodiments, there may be two robotic manipulators with one used for holding and another for performing intricate installation activities such as mechanical fastening or electrical connections.

In some embodiments, there may be at least one main robotic manipulator which can install additional robotic manipulators in space for one or more manufacturing tasks. Alternately, the end effectors at the end of the robotic manipulator may be interchanged in space with different types of end effector.

Figure 37:
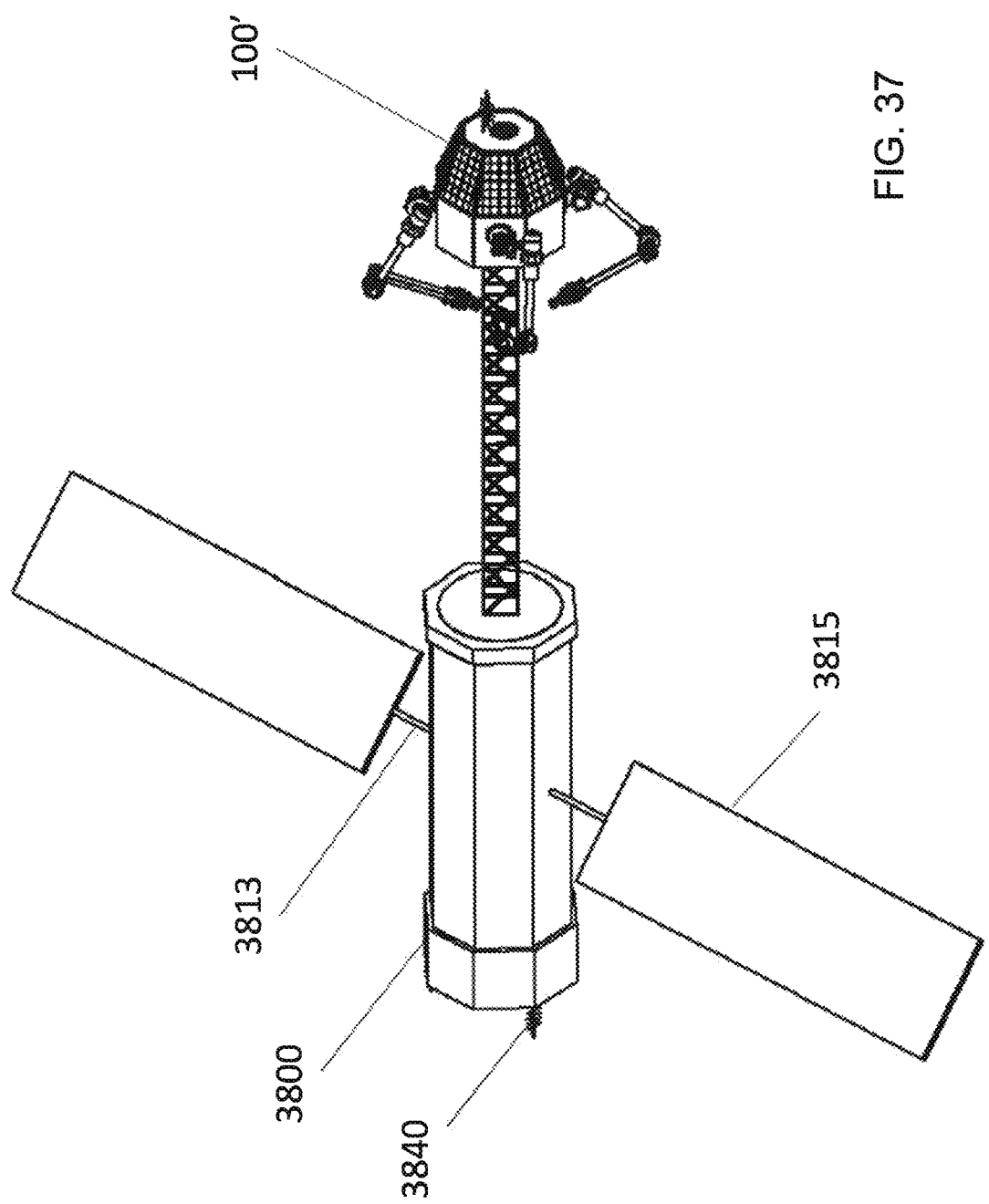
FIG. 37 is an extended structure additive manufacturing device assembling/manufacturing a spacecraft in space, according to aspects of the present disclosure.

FIG. 37 is an embodiment of an extended structure additive manufacturing device assembling/manufacturing a spacecraft 3800 in space. The illustration of FIG. 37 may be a continuation of steps for the manufacture of spacecraft or satellites in space shown in FIG. 36. The spacecraft 3800 includes a spacecraft body 3823 for supporting therein various electronic assemblies (not shown) for the operation and flight of the spacecraft 3800 such as without limitation a satellite. Satellites can have various shapes and geometric configurations. In an embodiment, the spacecraft body 3823 may have a polygon shape such as a hexagonal shape.

The spacecraft 3800 configured as a satellite requires systems for power management and control of the spacecraft. Hence, the spacecraft 3800 may include arms 3813 from which solar panels 3815 are attached. The arms 3813 may be configured to move or rotate such as for the obit and flight control of the spacecraft body and/or for capturing solar energy from the sun during flight.

The assembled spacecraft 3800 further includes antenna 3840 coupled to the spacecraft body 3823. However, the antenna 3840 being electrically coupled to a communications system (i.e., communication system 3320). Once the spacecraft 3800 is completely assembled in space, the spacecraft 3800 may be released from device 100' and placed into orbit. The device 100' being configured to support and orbit in space itself and the spacecraft 3800 until the spacecraft 3800 is released. The extended part 3802 serves to distance the assembled spacecraft 3800 and the device 100' so that when the spacecraft 3800 is released the operation and flight of the device 100' is not affected.

In comparison to the length of the extended part 3702, the length of the extended part 3802 has grown or extended further. Thus, the extended part 3802 being increased in real time to distance the spacecraft 3800 from the device 100' such that when the spacecraft 3800 is released, the device and spacecraft do not collide.

The device 100' may be configured to extend or grow the length of the extended part 3802, in real time, for various stages of the manufacturing process carried out in space and including a launch of a spacecraft once completely assembled and made operational for functioning independent of the device 100'.

FIGS. 38A-38C is an internal view of an embodiment of an extended structure additive manufacturing device 3900. The device 3900 may include one or more robotic manipulators 3910 to form a robotic arm with hinged joints. The manipulator 3910 includes a mount 3909 for mounting one end of the manipulator 3910 to a structure or body. The other end of the manipulator 3910 may have attached thereto an end effector 3912 such as a gripper or other attachments.

The device 3900 includes a reversible assembly area RAA. The device 100, 100', 100" or 100''' have an external assembly area. The device 3900 may include a reversible assembly area RAA which is internal to a body but in space. The reversible assembly area RAA includes cameras or imaging devices of at least one inspection system 3935. The device 3900 includes an avionics 3940 system in an avionics bay. The device 3900 includes build area BA and at least one assembly area AA.

The device 3900 may include an extruder 3908 and build surfaces in proximity to the one or more robotic manipulators 3910. The device 3900 may be configured for additive manufacturing using one or more materials for building a spacecraft or other components.

Figure 39:
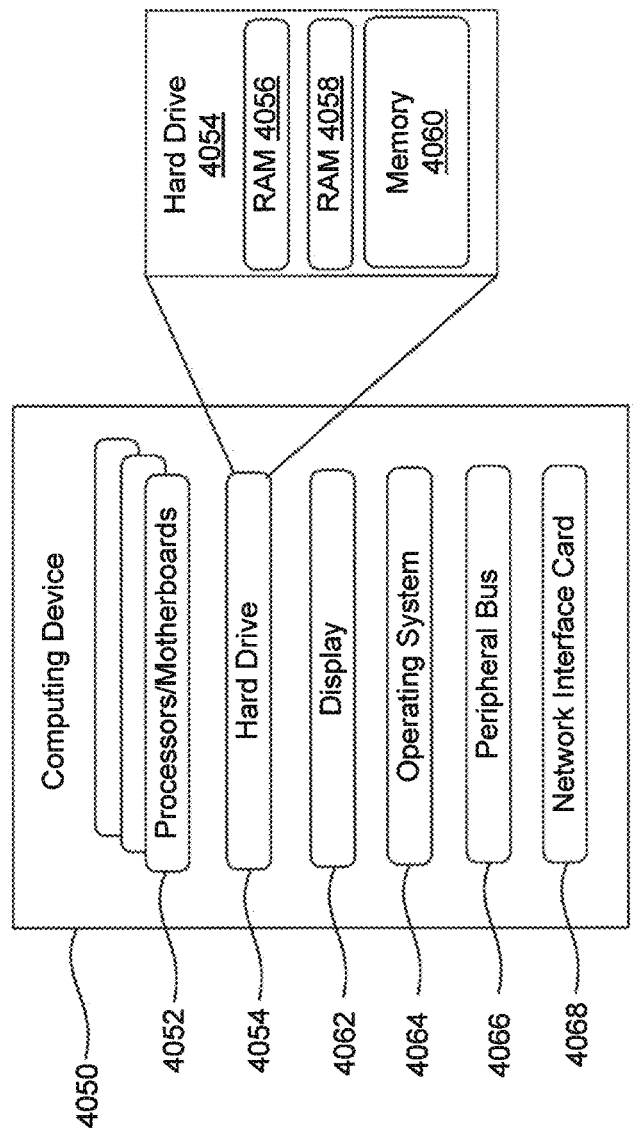
FIG. 39 is a view of a block diagram of a computing system, according to an aspect of the present invention.

Referring now to FIG. 39, in a basic configuration, the computing device 4050 may include any type of stationary computing device or a mobile computing device. Computing device 4050 may include one or more processors 4052 and system memory in hard drive 4054. Depending on the exact configuration and type of computing device, system memory may be volatile (such as RAM 4056), non-volatile (such as read only memory (ROM 4058), flash memory 4060, and the like) or some combination of the two. System memory may store operating system 4064, one or more applications, and may include program data for performing flight, navigation, avionics, power managements operations such as for space operations.

The computing device 4050 may carry out one or more blocks of the process 2900B and or the additive manufacturing processes described herein. Computing device 4050 may also have additional features or functionality. For example, computing device 4050 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 4050 may also include or have interfaces for input device(s) (not shown) such as a keyboard, mouse, pen, voice input device, touch input device, etc. The computing device 4050 may include or have interfaces for connection to output device(s) such as a display 4062, speakers, etc. The computing device 4050 may include a peripheral bus 4066 for connecting to peripherals. Computing device 4050 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 4050 may include a network interface card 4068 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

Figure 40A:
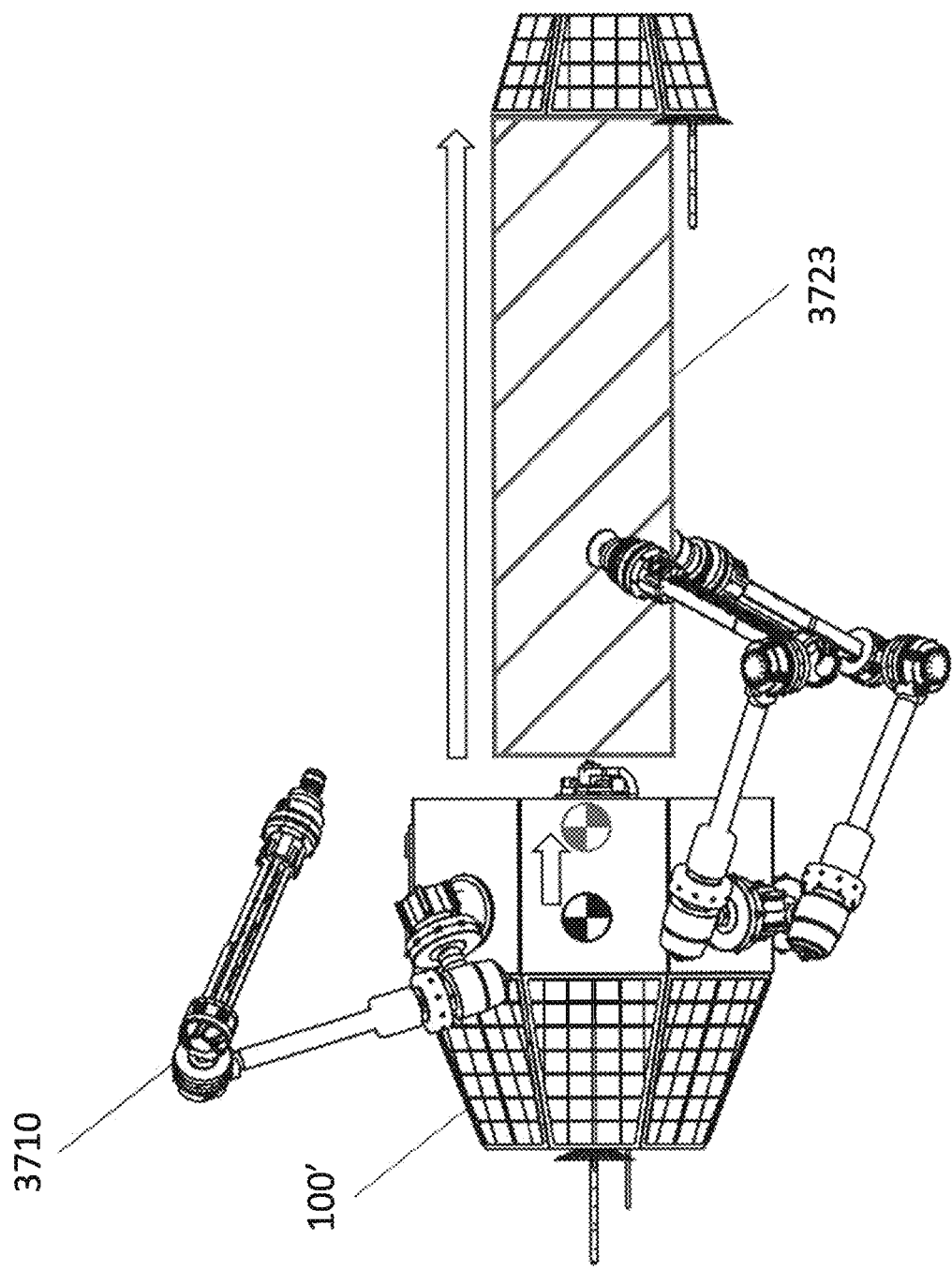
FIGS. 40A and 40B are views of a device and part which may have a shifting center of gravity.
Figure 40B:
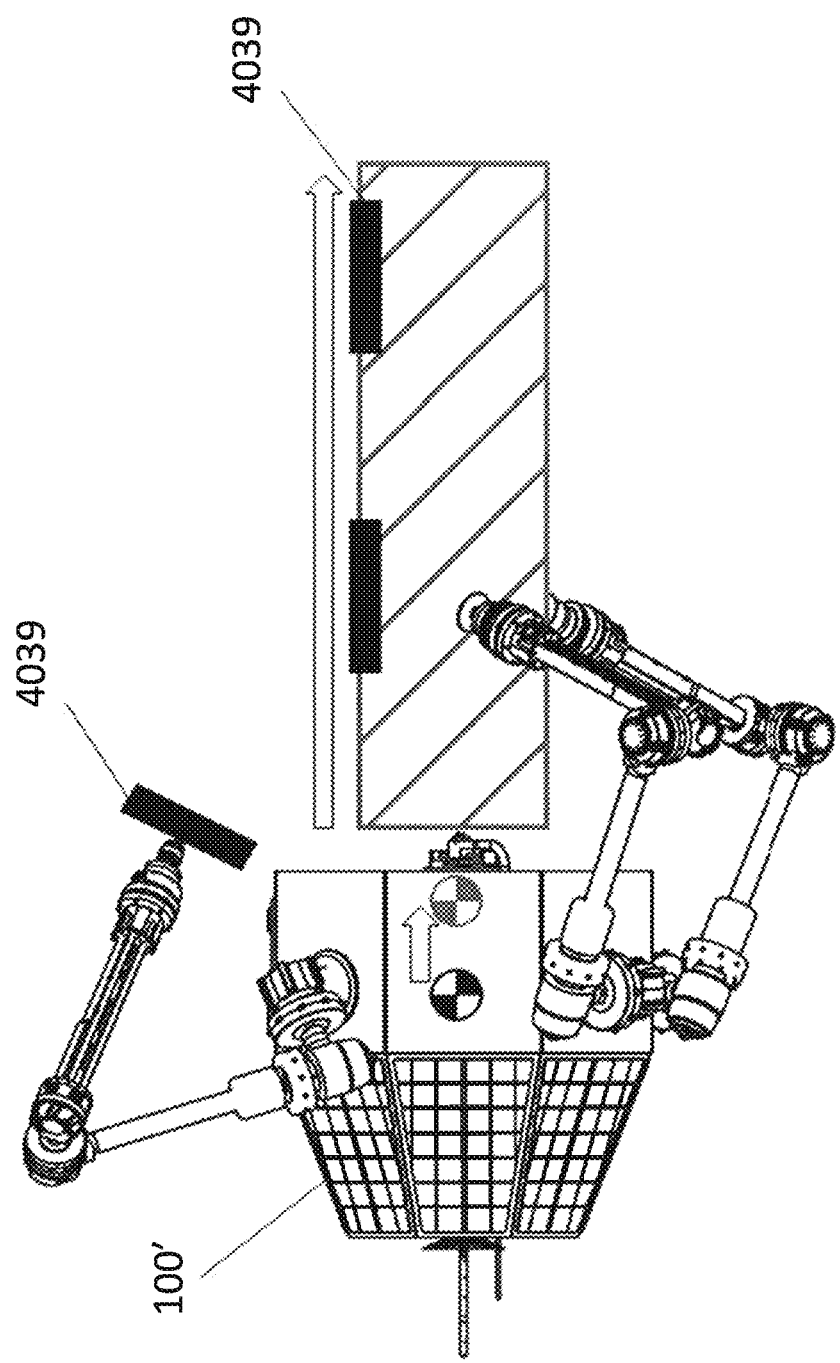

FIGS. 40A and 40B are embodiments of a device and part which may have a shifting center of gravity. Manufacturing structures, unlike traditional deployment, is not a two state (packed and deployed) deployment method. There exists a significant gradient in between the initial and final state in which perturbations can occur and effect the integrity of the system or part which may result in a shift of the center of gravity. The Shift of center of gravity may actually shifts from the spacecraft of device 100' and onto the part 3723, as the part grows or expands. The manufacturing process also takes an indeterminable amount of time since it can be stopped, restarted, or modified for changing mission needs. In general, large structure need to be dampened and perturbations that happen need to be corrected, as such effects, due to multiple environmental and directed causes, may interfere with the structural integrity of the structure. During manufacturing the needed for dampening mechanisms may be required for manufacturing-related perturbations to be mitigated or corrected for. Internal devices for cancelling out movement of the traversing elements of a part may be used. This could consist of counter weights and motion platforms that change position and velocity based on the traversing platform motion and the location of the center of gravity (CG).

Another approach to reduce vibrations and perturbations is with reverse layer deposition. More specifically, a first layer may be applied right to left. A next or later layer of the part may be applied left to right. If the deposition is circular, clockwise and counter-clockwise layering may be implemented. Thus, during the manufacturing, or production, process a tool path for one layer of building may be accomplished and to counter the perturbations caused by that movement, motion in a toolpath in opposition may be performed.

The CG is constantly shifting during manufacturing. This shift can be predicted and monitored through the use of feedstock, or material, flow from the feedstock, or material, source, such as, but not limited to a canister, to the structure 3723 being manufactured. Though not shown, a sensor may be used. This shift can be communicated to an external system or an external system can be programmed to automatically dissipate perturbations, such as, but not limited to, with a piezoelectric actuator, counter weights/balances, etc. This external system may comprise the computing device 4050 disclosed herein.

FIG. 40B is an embodiment of a device 100' and part with dampening devices 4039 as part of or attached to the part. The dampening mechanisms 4039 may be embedded during construction at predetermined or responsive locations. A computing device, as disclosed herein, may be used to determine the responsive locations. As shown, the arms 3750 may place the dampening mechanisms 4039. Both passive and active mechanisms or devices for vibration dampening may be applied. The devices 4039 may be communicated to wired or wirelessly or can function as an independent system or component. In an embodiment, a first dampening device 4039 is at a first end of a part of the structure 3723 and a second dampening device 4039 may be located at an opposite end which may both work together to dampen the structure 3723 or part.

Figure 41B:
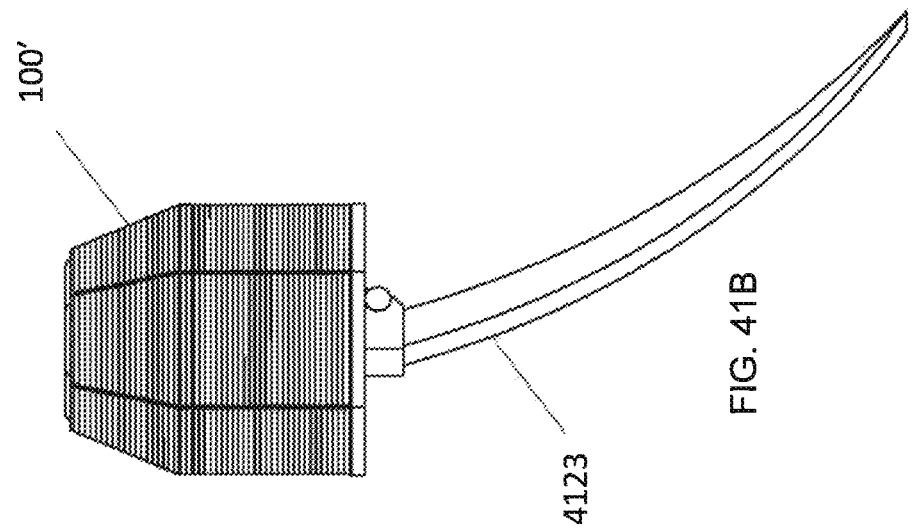
FIGS. 41A and 41B are views of a structure that may be produced in space.
Figure 41A:
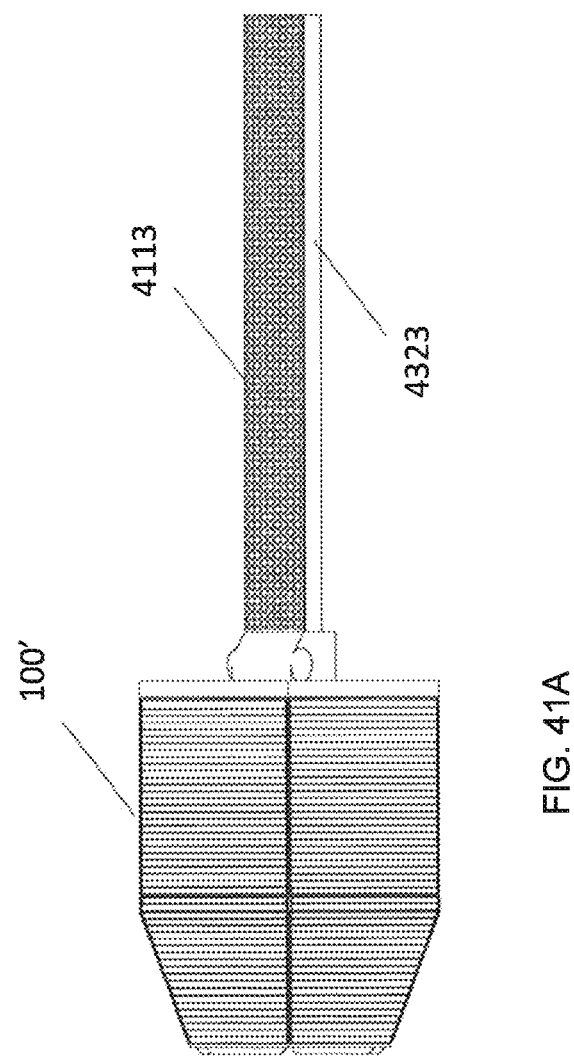

FIG. 41A is an embodiment of a structure that may be produced in space. During the production a flexible conductive mesh 4113 may be attached either before, during or after manufacturing begins of a structure or part, as disclosed herein. The mesh 4113 may be stretched upon the surface or connected to specific locations on the structure 4123 or part so that the material is fully deployed after production is complete. In an embodiment, the mesh 4113 may also be manufactured in association with the manufacturing of the part or structure 4123.

The structure 4123 may take many shapes including, but not limited to, a uniform cross section, curved, and angled structures and a tapered configuration. FIG. 41B is an embodiment of a structure 4123 having a curved shape that tapers at a distant end from the device 100'. As shown the part or structure 4123 with a variable cross section may be made or manufactured, as disclosed herein.

Figure 42:
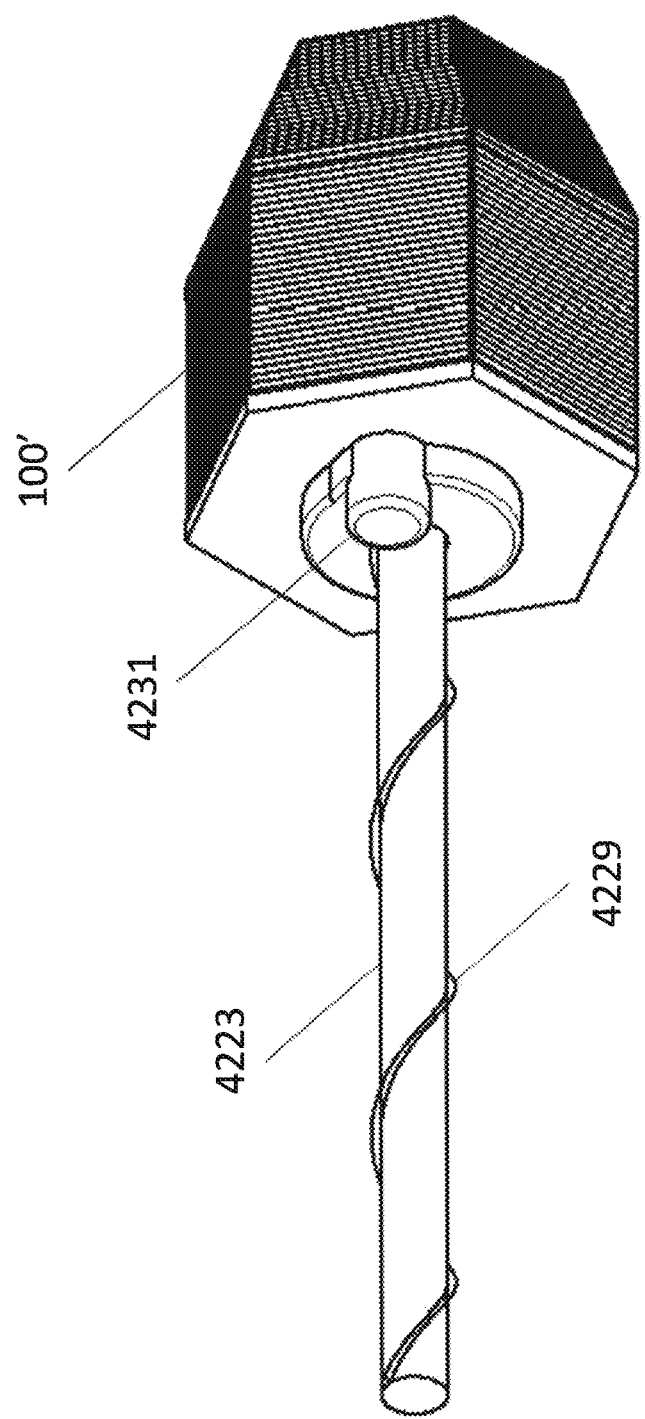
FIG. 42 is an embodiment of a structure that may be produced in space.

FIG. 42 is an embodiment of a structure that may be produced in space. The structure 4224, or part, is produced and while it is manufactured antennae elements 4229, such as, but not limited to, wire, may be attached, embedded, or traditionally deployed. In an embodiment, the antennae elements 4229 may be manufactured in conjunction with the structure 4224, such as but not limited to by the same printer that is used to manufacture the structure. The elements 4229 may be placed directly in a linear fashion or may traverse in an independent matter around the structure 4224 to ensure proper shape is created at the end of production. A wire, or antennae element, release mechanism 4231 may be attached to or a part of the device 100'. In an embodiment the wire release mechanism 4231 may spin to extrude the wire. Depending on the configuration desired of the antennae element 4229, other release approaches may be utilized, such as, but not limited to a direct pull release, etc.

Figure 43:
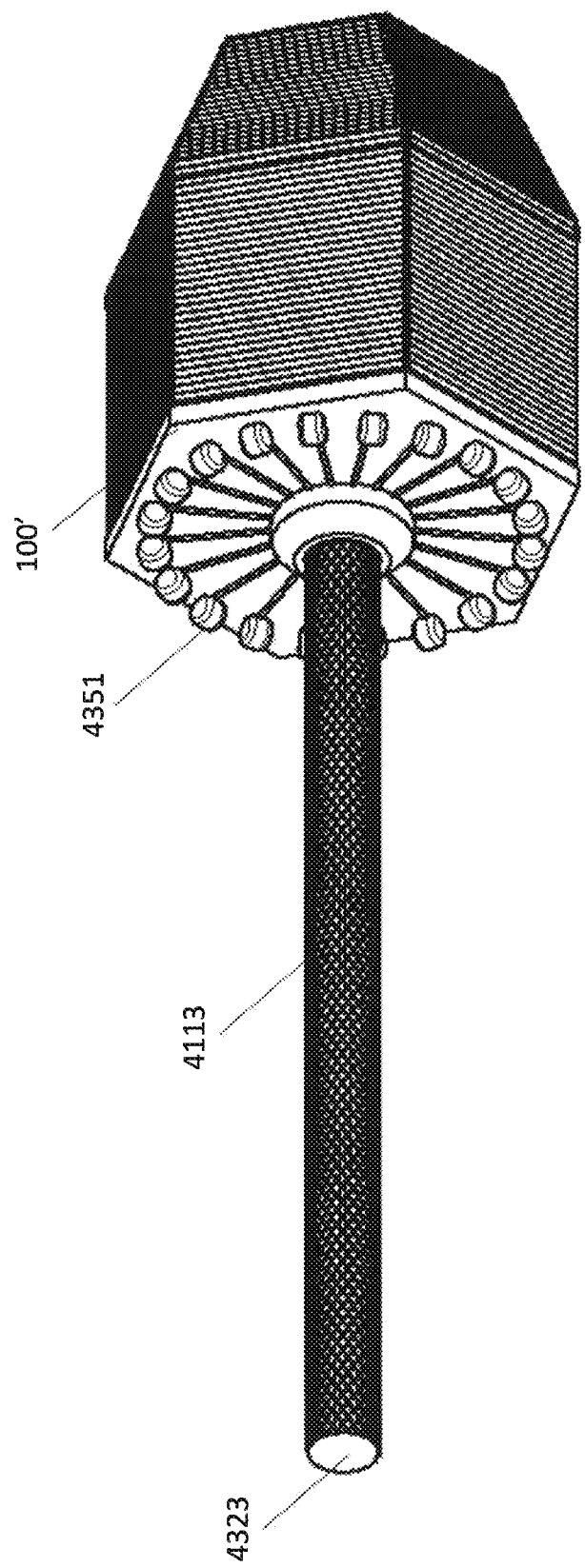
FIG. 43 is an embodiment of a structure that may be produced in space.

FIG. 43 is an embodiment of a structure that may be produced in space. The structure 4323 or part is created and as a mesh 4113 is directly woven and attached as the structure 4323 is produced. The mesh 4113 may be created with a weaving system, or component, 4351 that may be attached to the device 100' wherein flexible materials such as wire, plastic and/or composite fibers may be used to create the mesh 4113.

As disclosed above with respect to FIG. 41, the mesh 4113 may be put in place once the structure 4323 is constructed. The mesh 4113 may be stored within the device 100' and then put in place with at least one of the arms 3710 disclosed herein.

Once a structure is produced, the device 100' may be repositioned and manufacturing in a different orientation may occur. As a non-limiting example, the device 100' may produce an indefinitely long beam in the "z" direction and then maneuver and reposition to make an indefinitely long beam in the "x" direction, relative to the structure. This enables not just indefinite linear structures but indefinite structures in all directions.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but her the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited, by any of the above explicitly described embodiments. Rather, the scope of the embodiments should be defined in accordance with the following claims and their equivalents.

The invention claimed is:

1. A system for producing an object, the system comprising:
   a build device having a build area and a material bonding component to receive portions of a material that are used to produce the object;
   at least one gripper within the build area to contact the object to provide support and to provide for at least one of a heat sink for the object, a cold sink for the object, and an electrical dissipation path from the object;
   a movement mechanism to move the build device relative to the object to position the build device at a position to further produce the object; and
   a weaving component attached to the build device to create a mesh over the object as the object is produced.

2. The system according to claim 1, wherein the build area is an unlimited build area in at least one axis where the object is produced.

3. The system according to claim 1, further comprising radiators thermally coupled to the at least one gripper to provide the at least one gripper as at least one of the heat sink and cold sink for the object.

4. The system according to claim 1, further comprising an antennae element release mechanism attached to the build device to extrude an antennae element from the build device for engagement with the object at least one of as the object is produced and once the object is produced.

5. The system according to claim 1, wherein the weaving component is a flexible conductive mesh.

6. The system according to claim 1, wherein a portion of the build area and the at least one gripper are within the build device.

7. The system according to claim 1, further comprising at least one robotic arm and manipulator attached to the build device to at least reach a distal part of the object already produced.

8. The system according to claim 7, wherein the at least one robotic arm and manipulator are further configured to provide for the build device to climb the object to position the build device to further produce the object.

9. The system according to claim 1, wherein by the movement mechanism configured to move the build device relative to the object to position the build device at a position to further produce the object, the object is built to a dimensional size greater than the build device.

10. The system according to claim 1, wherein the object is separated from the build device after the object is completed.

11. The system according to claim 1, wherein the build device remains attached to the object and provides functional elements for the object once the object is completed.

12. The system according to claim 1, further comprising a z-traverse system attached to the build device to which the at least one gripper is a part of.

13. The system according to claim 1, wherein the material comprises feedstock material.

14. The system according to claim 1, wherein the at least one gripper positions a dampening mechanism at the object as the object is produced.

15. A system for producing an object in the space environment, the system comprising:
   a build device having a build area and a material bonding component to receive portions of a material that are used to produce the object;
   at least one contacting device in physical contact with the object during at least a portion of object production, the contracting device providing for at least one of a heat sink for the object, a cold sink for the object, and an electrical dissipation path from the object;
   a movement mechanism to move the build device relative to the object to position the build device at a position to further produce the object; and
   a weaving component attached to the build device to create a mesh over the object as the object is produced.

16. The system according to claim 15, wherein the at least one contacting device is a gripper to provide support to the object.

17. The system according to claim 15, wherein the build area is an unlimited build area in at least one axis where the object is produced.

18. The system according to claim 15, further comprising radiators thermally coupled to the at least one gripper to provide the at least one gripper as at least one of the heat sink and cold sink for the object.

19. The system according to claim 15, further comprising an antennae element release mechanism attached to the build device to extrude an antennae element from the build device for engagement with the object at least one of as the object is produced and once the object is produced.

20. The system according to claim 15, wherein the weaving component is a flexible conductive mesh.

21. The system according to claim 15, wherein a portion of the build area and the at least one contacting device are within the build device.

22. The system according to claim 21, wherein the at least one robotic arm and manipulator are further configured to provide for the build device to climb the object to position the build device to further produce the object.

23. The system according to claim 15, further comprising at least one robotic arm and manipulator attached to the build device to at least reach a distal part of the object already produced.

24. The system according to claim 15, wherein by the movement mechanism is configured to move the build device relative to the object to position the build device at a position to further produce the object, the object is built to a dimensional size greater than the build device.

25. The system according to claim 15, wherein the object is separated from the build device after the object is completed.

26. The system according to claim 15, wherein the build device remains attached to the object and provides functional elements for the object once the object is completed.

27. The system according to claim 15, further comprising a z-traverse system attached to the build device to which the at least one contacting device is a part of.

28. The system according to claim 15, wherein the material comprises feedstock material.

29. The system according to claim 15, wherein the at least one contacting device positions a dampening mechanism at the object as the object is produced.

* * * * *